(12) United States Patent
Balwani

(10) Patent No.: US 10,800,588 B2
(45) Date of Patent: Oct. 13, 2020

(54) METHODS, DEVICES, AND SYSTEMS FOR SECURE TRANSPORT OF MATERIALS

(71) Applicant: Theranos, Inc., Palo Alto, CA (US)

(72) Inventor: Sunny Balwani, Palo Alto, CA (US)

(73) Assignee: Labrador Diagnostics LLC, Wilmington, DE (US)

( * ) Notice: Subject to any disclaimer, the term of this patent is extended or adjusted under 35 U.S.C. 154(b) by 298 days.

(21) Appl. No.: 14/865,603

(22) Filed: Sep. 25, 2015

(65) Prior Publication Data

US 2016/0185503 A1 Jun. 30, 2016

Related U.S. Application Data

(63) Continuation of application No. PCT/US2014/035050, filed on Apr. 22, 2014.
(Continued)

(51) Int. Cl.
*B65D 81/18* (2006.01)
*G06Q 10/08* (2012.01)
(Continued)

(52) U.S. Cl.
CPC ............ *B65D 81/18* (2013.01); *B65D 81/38* (2013.01); *G06Q 10/0832* (2013.01); *G06Q 30/018* (2013.01)

(58) Field of Classification Search
CPC ..... B65D 81/18; B65D 81/38; G06Q 10/0832
(Continued)

(56) References Cited

U.S. PATENT DOCUMENTS

| 5,255,183 A | 10/1993 | Katz |
| 5,815,557 A | 9/1998 | Larson |

(Continued)

FOREIGN PATENT DOCUMENTS

| CN | 101388086 A | 3/2009 |
| CN | 102622685 A | 8/2012 |

(Continued)

OTHER PUBLICATIONS

Advisory Action dated Jan. 26, 2015 for U.S. Appl. No. 14/259,105.
(Continued)

*Primary Examiner* — John A Tweel, Jr.

(57) ABSTRACT

Methods, devices, and systems for the secure transport of material are provided. A transported material may be a biological material, such as a biological sample. Material is only transferred to a courier having a unique, single-use authorization code. Authorization codes are provided to a courier only upon arrival at a proper location and at a designated time. Courier identification or code confirmation or authorization may also be required. Identification or other confirmation regarding a custodian, material to be transferred, or both, may be required. Courier images, custodian images, or both, may be required. An authorization code may include a bar code, a number, a letter, or other symbol or code. An authorization code, an image, route information, and other information may be communicated by cell-phone, WiFi, Bluetooth, or other link. Transport containers with temperature sensors and communication links, and storage containers with light sensors, memory, and communication links are provided.

12 Claims, 24 Drawing Sheets

Related U.S. Application Data

(60) Provisional application No. 61/814,799, filed on Apr. 22, 2013, provisional application No. 61/864,505, filed on Aug. 9, 2013.

(51) Int. Cl.
  *B65D 81/38* (2006.01)
  *G06Q 30/00* (2012.01)

(58) Field of Classification Search
  USPC ........................................................ 340/540
  See application file for complete search history.

(56) References Cited

U.S. PATENT DOCUMENTS

| | | | |
|---|---|---|---|
| 6,384,709 B2 | 5/2002 | Mellen et al. | |
| 6,535,129 B1 | 3/2003 | Petrick | |
| 6,656,428 B1 | 12/2003 | Clark et al. | |
| 6,975,202 B1 | 12/2005 | Rodriguez et al. | |
| 7,587,201 B2 | 9/2009 | Ohara | |
| 7,650,395 B2 | 1/2010 | Johnson et al. | |
| 7,714,708 B2* | 5/2010 | Brackmann | B60P 3/14 180/290 |
| 8,333,717 B1 | 12/2012 | Shaanan et al. | |
| 8,353,167 B2* | 1/2013 | McGann | F25B 21/02 62/3.62 |
| 8,643,487 B2 | 2/2014 | Roatis et al. | |
| 2001/0056361 A1 | 12/2001 | Sendouda | |
| 2002/0032583 A1 | 3/2002 | Joao | |
| 2002/0067261 A1 | 6/2002 | Kucharczyk et al. | |
| 2002/0111914 A1 | 8/2002 | Terada et al. | |
| 2002/0138352 A1 | 9/2002 | Demaggio | |
| 2002/0144187 A1 | 10/2002 | Morgan et al. | |
| 2002/0161606 A1 | 10/2002 | Bennett et al. | |
| 2003/0217037 A1 | 11/2003 | Bicker et al. | |
| 2003/0231103 A1 | 12/2003 | Fisher | |
| 2005/0011163 A1 | 1/2005 | Ehrensvard et al. | |
| 2005/0068972 A1 | 3/2005 | Burns et al. | |
| 2005/0075543 A1 | 4/2005 | Calabrese | |
| 2005/0116821 A1* | 6/2005 | Wilsey | G06K 7/10079 340/539.13 |
| 2005/0246192 A1 | 11/2005 | Jauffred et al. | |
| 2005/0254435 A1 | 11/2005 | Moakley et al. | |
| 2006/0097843 A1 | 5/2006 | Libin | |
| 2006/0117021 A1 | 6/2006 | Sidney et al. | |
| 2008/0141377 A1 | 6/2008 | Dunagan et al. | |
| 2008/0162355 A1 | 7/2008 | Lee et al. | |
| 2009/0216663 A1 | 8/2009 | White | |
| 2010/0176919 A1 | 7/2010 | Myers et al. | |
| 2011/0047092 A1 | 2/2011 | Taylor | |
| 2011/0053557 A1 | 3/2011 | Despain et al. | |
| 2011/0059693 A1 | 3/2011 | O'Sullivan | |
| 2011/0173023 A1* | 7/2011 | LeClair | G06Q 10/08 705/2 |
| 2011/0238457 A1 | 9/2011 | Mason et al. | |
| 2011/0288891 A1 | 11/2011 | Zaid et al. | |
| 2011/0295517 A1 | 12/2011 | Otvos et al. | |
| 2012/0173448 A1 | 7/2012 | Rademaker | |
| 2012/0299700 A1 | 11/2012 | Davis et al. | |
| 2013/0109106 A1 | 5/2013 | Klunder et al. | |
| 2013/0146656 A1 | 6/2013 | Wilke et al. | |
| 2014/0317005 A1 | 10/2014 | Balwani | |
| 2015/0060440 A1* | 3/2015 | Lippold | B65D 81/3811 220/1.5 |

FOREIGN PATENT DOCUMENTS

| | | |
|---|---|---|
| CN | 102708477 A | 10/2012 |
| JP | 2003030294 A | 1/2003 |
| RU | 2461878 C2 | 9/2012 |
| WO | 2000074313 A1 | 12/2000 |
| WO | 2005109238 A2 | 11/2005 |
| WO | 2007099414 A1 | 9/2007 |
| WO | 2010112059 A1 | 10/2010 |
| WO | 2011088110 A2 | 7/2011 |

OTHER PUBLICATIONS

International Search Report and Written Opinion dated Dec. 18, 2014 for PCT/US2014/035050.
Office Action dated Nov. 5, 2014 for U.S. Appl. No. 14/259,105.
Office Action dated Jul. 10, 2014 for U.S. Appl. No. 14/259,105.
Office Action dated Aug. 20, 2015 for U.S. Appl. No. 14/259,105.
Office Action dated Feb. 23, 2016 for U.S. Appl. No. 14/259,105.
Advisory Action dated Apr. 29, 2016 for U.S. Appl. No. 14/259,105.
Office Action dated Apr. 6, 2017 for U.S. Appl. No. 14/259,105.
Office Action dated Nov. 4, 2018 for U.S. Appl. No. 14/259,105.

* cited by examiner

METHODS, DEVICES, AND SYSTEMS FOR SECURE TRANSPORT OF MATERIALS

CROSS-REFERENCE TO RELATED APPLICATIONS

This application is a U.S. national stage application under 35 U.S.C. § 371 which claims priority to, and the benefit of, International Application PCT/US2014/035050, filed on Apr. 22, 2014, and published as WO 2014/176289 on Oct. 30, 2014, which International Application claims priority to, and the benefit of, U.S. Application Ser. No. 61/814,799, filed Apr. 22, 2013 and U.S. Application Ser. No. 61/864,505, filed Aug. 9, 2013, the entire contents of all of which applications are hereby incorporated by reference in their entireties.

BACKGROUND

Transport of materials is a necessary part of commerce and other social interactions, including playing important roles in scientific collaborations and in clinical diagnosis and treatment. However, the time and expense required to prepare and ship materials adds to the overhead associated with the production, sale, and use of such materials. In addition, transport exposes materials to potential loss, damage, or degradation, and delays encountered during shipment may reduce or eliminate their suitability, utility or effectiveness for a time-sensitive intended purpose.

Such problems are compounded for materials that are fragile, perishable, or which require special handling. Biological materials, such as biological specimens (e.g., blood samples, tissue samples, organs for transplant, and the like), are particularly susceptible to degradation during transport, and often require special handling procedures, both to maintain their integrity and viability, and in order to comply with legal and safety requirements. Transport of such materials may require care to ensure that the materials do not degrade, or are not damaged, lost, or stolen during transit.

Accordingly, improved methods, devices, and systems for transport of materials, such as biological or other materials, including improved methods, devices, and systems for transport of biological samples, are required.

INCORPORATION BY REFERENCE

All publications, patents, and patent applications mentioned in this specification are herein incorporated by reference to the same extent as if each individual publication, patent, or patent application was specifically and individually indicated to be incorporated by reference.

SUMMARY

Methods, devices, and systems for the secure transport of materials are provided. In embodiments, methods, devices, and systems for the secure transport of biological or other perishable materials are provided. In embodiments, methods, devices, and systems for the secure transport of rare, valuable, or dangerous materials are provided. In embodiments, such methods, devices, and systems for the secure transport of materials are particularly suited for the secure transport of biological materials, including, for example, specimens, and organs or tissues for transplantation or transfusion. The methods, devices, and systems disclosed herein provide advantages including verified and secure transport of materials, timely transport of materials, temperature-controlled transport of materials, and monitored containers for storing materials at a desired temperature.

Materials, such as biological materials including blood samples, urine samples, cheek swabs, throat swabs, tissue samples, biopsy specimens, bone marrow, organs (e.g., organs for transplantation), and other materials derived from animals, plants, and other organisms, may be present (e.g., may be collected) at one location yet need to be transported to another location (e.g., for processing, analysis, or use). The location at which the material is initially found (and from which the material will be transferred to a courier for transport) may be termed a transfer location, and the location to which the material is transported may be termed a destination (or, equivalently, a destination location). The material may be collected or held at a transfer location by a custodian.

A material may be placed in a transport container for transport to a destination. In embodiments, a material may be held in a storage container at a transfer location prior to transport, may be placed in a storage container at a destination, or both.

Unauthorized transfer or transport of materials could lead to loss or misplacement of the material; damage to, or degradation of, the material; improper or unauthorized use of the material; theft of the material; or other undesirable result.

Accordingly, a method is disclosed herein for providing an authorization code to a courier, wherein the method for providing an authorization code to a courier comprises:
Verifying that a courier is present:
  i) at a designated location, and
  ii) at a time within a designated time period; and then
Providing said courier with an authorization code.

An authorization code may comprise a numerical code, an alphabetic code, an alphanumeric code, a symbol, or other code or code element. An authorization code may comprise two or more codes, and may comprise two or more code types. In embodiments, an authorization code, or plurality of codes, may comprise visual elements, audio elements, magnetic elements, electromagnetic elements, mechanical elements, and other elements, and combinations thereof. In embodiments, an authorization code may comprise a numerical code, an alphabetic code, an alphanumeric code, a symbol code, a visual code, an audio code, a magnetic code, an electromagnetic code, a mechanical code, and combinations thereof.

A custodian (e.g., a person, device, or facility holding material) may require an authorization code. In further embodiments, a custodian may be provided with an authorization code. Such an authorization code may be provided to a custodian prior to the arrival of a courier at a designated location, or concurrently with the arrival of a courier at a designated location, or after the arrival of a courier at a designated location.

In embodiments, verifying that a courier is present at a location may comprise an action by the courier at a designated location (e.g., may require that the courier sign a register, present identification, provide a thumbprint, submit to a biometric inspection, or other action). In embodiments, verifying that a courier is present at a location at a time within a designated time period may comprise use of a Global Positioning System (GPS) device or element, where such GPS device or element comprises a position signal and a clock or time-signal; may comprise use of a computer, tablet computer, cell phone, and/or a cell phone system comprising a clock or time-signal; may comprise use WiFi, and position and/or time information derived from such use;

may comprise an action by the courier at a designated location (e.g., may require that the courier sign a register, present identification, provide a thumbprint, submit to a biometric inspection, or other action) at a time within a designated time period.

In embodiments, verifying that a courier is present at a location at a designated time comprises verifying that a courier is present within a designated period of time (also termed a time period). In embodiments, a period of time may comprise a time that is within a few minutes before, and a few minutes after, a designated time, where a few minutes may be 1, 2, 3, 4, 5, 6, or more minutes, or may be 10, 20, or 30 minutes, or may be 1 or 2 hours, or other time. The amount of time comprising a few minutes is typically determined prior to the arrival of a courier. For example, in embodiments, a designated period of time for arrival of a courier is designated prior to arrival of a courier at a designated location. In embodiments where such a designated period of time is not designated prior to arrival of a courier at a designated location, a designated period of time for arrival of a courier may comprise a a time that is within a few minutes before, and a few minutes after, a designated arrival time, where a few minutes may be 1, 2, 3, 4, 5, 6, or more minutes.

In embodiments, an authorization code may be provided to a courier via a communication link, e.g., a wireless communication link, such as, for example, a cell phone or cell phone system; WiFi; a radio-frequency or microwave frequency communication link; Bluetooth, infrared, or other communication linkage, which may comprise a computer, a router, an internet node, a network, or other intermediate device, element, or system, or a combination thereof. In embodiments, an authorization code may be provided to a courier by a means comprising a physical linkage via telephone, ethernet, firewire, universal serial bus (USB) or other physical connection, or a combination thereof. In embodiments, an authorization code may be provided to a courier by a means comprising a dedicated device, a dedicated communication device, a dedicated communication system, or a combination thereof. It will be understood that an authorization code may be provided to a courier via any combination of such communication links, or any communication means or combination of means known in the art. In embodiments, an authorization code may be provided as an encrypted authorization code.

Verification of an identity may be required. In embodiments, the identity of a courier, or of a custodian, or both, may be verified. In embodiments, the identity of a device, or a vehicle, or other machine or object, may be verified (e.g., by identifying serial number, markings, bar code, quick response code (QR code), radio-frequency identification (RFID) device or system, or other means). Verification of the identity of a courier, or of a custodian, or both, may comprise presentation of identification documents; may comprise use of biometric identification means and techniques; may comprise use of photographic or other imaging means; may comprise disclosure or presentation of a badge, card, identifying markings, or insignia; may comprise other means, and combinations of any or all of these. In embodiments, verification of an identity may comprise using a RFID device or system. In embodiments, verification of identity may comprise using a processor in a network, e.g., using a processor running cloud-based software. In embodiments, verification of identity may comprise using a cell phone, tablet, or other computer, e.g., obtaining an image of the courier by cell phone, tablet or other computer camera, transmission of that image for verification at a remote location, and identification, comparison, or other analysis.

In embodiments, methods of providing a courier with an authorization code may further comprise verifying the identity of the courier prior to providing an authorization code. In embodiments, the identity of a courier may be verified concurrently with, or following, the provision of an authorization code. Identification of a courier may be verified, for example, by any means disclosed herein.

Similarly, a custodian may be provided with an authorization code as disclosed herein with regard to providing a courier with an authorization code. A custodian may also be required to provide identification or to otherwise verify their identity, as disclosed herein with regard to identifying a courier.

In embodiments, possession of an authorization code, or presentation of an authorization code, may be sufficient to authorize transfer of a material, e.g., may provide sufficient authorization for a custodian to transfer material to a courier. In embodiments, verification of an authorization code may be required in order to authorize transfer of a material, e.g., in order to provide sufficient authorization for a custodian to transfer material to a courier. In embodiments, identification of a courier as well as verification of an authorization code may be required in order to authorize transfer of a material, e.g., in order to provide sufficient authorization for a custodian to transfer material to a courier. In embodiments, identification of a courier, and identification of a custodian, as well as verification of an authorization code may be required in order to authorize transfer of a material, e.g., in order to provide sufficient authorization for a custodian to transfer material to a courier and for a courier to accept the material from the custodian. It will be understood that arrival of a courier at a proper location and at a proper time (e.g., within a designated time period) are pre-requisites for such verification, and for such verification and identification.

In embodiments, verification of an authorization code may comprise comparison of an authorization code possessed or presented by a courier with an authorization code possessed or obtained by a custodian; may comprise use of a check digit, parity bit, checksum, fingerprint, cryptographic hash function, or other code characteristic that allows the verification of an authorization code possessed or presented by a courier; may comprise observation of the delivery of an authorization code to a courier by a custodian (e.g., observation by a custodian of the appearance of an authorization code on a courier display, such as a tablet or cell-phone display), or by other means. The information for such verification procedures may be included (at least in part) in the authorization code itself may be provided in a separate communication, e.g., to a custodian; or a combination thereof. In embodiments, such verification may comprise photographic or biometric identification of the courier, the custodian, or both.

Accordingly, a method is disclosed herein for providing an authorization code to a courier, wherein the method for providing an authorization code to a courier comprises:
    Verifying the identity of a courier;
    Verifying that the courier is present:
        iii) at a designated location, and
        iv) at a time within a designated time period; and then
    Providing said courier with an authorization code.

Material at a transfer location may be under the custody of a custodian. In embodiments, the custodian will not transfer the material to a courier without authorization. In embodiments, the custodian will not transfer the material to a courier without authorization or without identification of the courier, i.e., confirmation that the courier is a proper courier.

In embodiments, presenting an authorization code to a custodian may comprise communication between the courier and the custodian; may comprise communication between the courier and a device operated by the custodian; may comprise communication between a device operated by the courier and the custodian; or may comprise communication between a device operated by the courier and a device operated by the custodian, or a combination thereof.

Thus, in embodiments, a courier must present an authorization code to a custodian prior to the transfer of material from custodian to courier, in order to verify the authorization of the transfer to the custodian. In embodiments, a courier must present an authorization code and identification to a custodian prior to the transfer of material, in order to verify to verify the authorization of the transfer and the identity of the courier to the custodian.

A custodian may transfer material to a courier for transport of the material to a destination upon receipt of a valid authorization code. An authorization code may be deemed valid by a custodian according to its appearance, length, mode of presentation, or other characteristic. In embodiments, an authorization code may be deemed valid by a custodian following verification of the authorization code (as disclosed herein), identification of the courier, or both.

Accordingly, a method is disclosed herein for authorizing transfer of a material from a custodian at a transfer location to a courier, comprising:
  Providing said courier with an authorization code location when:
    i) The courier is present at said transfer location,
    ii) Within a period of time designated for the transfer of said material; and
  Presenting said authorization code to the custodian at the transfer location;
  Whereby transfer of the material from the custodian to the courier is authorized.

In embodiments, providing an authorization code may require verifying the identity of the courier, in addition to verifying the presence of the courier at a transfer location within a designated time period.

Accordingly, a method is disclosed herein for authorizing transfer of a material from a custodian at a transfer location to a courier, comprising:
  Providing said courier with an authorization code when:
    i) The courier is present at said transfer location,
    ii) Within a period of time designated for the transfer of said material;
  Presenting said authorization code to the custodian at the transfer location; and
  Presenting courier identifying information effective to identify the courier as a proper courier;
  Whereby transfer of the material from the custodian to the courier is authorized.

Accordingly, a method is disclosed herein for authorizing transfer of a material from a custodian at a transfer location to a courier, comprising:
  Providing said courier with an authorization code when:
    iii) The courier is present at said transfer location,
    iv) Within a period of time designated for the transfer of said material;
  Presenting said authorization code to the custodian at the transfer location; and
  Presenting courier identifying information effective to identify the courier as a proper courier;
  Verifying the authorization code at the transfer location; and
  Verifying the identity of the courier at the transfer location;
  Whereby transfer of the material from the custodian to the courier is authorized.

In embodiments, an authorization code may be provided from a remote location different than said transfer location. In embodiments, providing an authorization code from a remote location may comprise using a processor in a network, e.g., using a processor running cloud-based software.

An authorization code may be used to confirm that a transfer of material, e.g., a transfer of material from a custodian at a transfer location to a courier, is authorized. Upon authorization, material may be transferred; for example, material may be transferred from a custodian at a transfer location to a courier that has arrived at a transfer location within a designated time period, where the courier possesses or presents a valid authorization code. In embodiments, material may be transferred from a custodian at a transfer location to a courier that has arrived at a transfer location within a designated time period, where the courier is identified as a proper courier and possesses or presents a valid authorization code.

Thus, in embodiments, upon proper authorization, a material may be transferred by a custodian to a courier. In embodiments, upon proper authorization and proper identification of a courier, a material may be transferred by a custodian to a courier. In embodiments, upon proper authorization and proper identification of a courier, including verification of the authorization code, a material may be transferred by a custodian to a courier.

Accordingly, a method is disclosed herein for transferring material from a custodian at a transfer location to a courier, comprising:
  Providing said courier with an authorization code location when:
    i) The courier is present at said transfer location,
    ii) Within a period of time designated for the transfer of said material;
  Presenting said authorization code to the custodian at the transfer location, whereby transfer of the material from the custodian to the courier is authorized; and
  Transferring said material from said custodian to said courier.

In embodiments, providing an authorization code may require verifying the identity of the courier, in addition to verifying the presence of the courier at a transfer location within a designated time period.

Thus, in embodiments, a further method for transferring material from a custodian at a transfer location to a courier comprises:
  Presenting courier identifying information effective to identify the courier as a proper courier;
  Providing said courier with an authorization code when:
    i) The courier is present at said transfer location,
    ii) Within a period of time designated for the transfer of said material;
  Presenting said authorization code to the custodian at the transfer location, whereby the custodian authorizes transfer of the material to the courier; and
  Transferring said material from said custodian to said courier.

In embodiments, an authorization code may be provided from a remote location different than said transfer location. In embodiments, providing an authorization code from a remote location may comprise using a processor in a network, e.g., using a processor running cloud-based software.

In embodiments, presenting identifying information effective to identify the courier as a proper courier may comprise possessing or presenting documentation, insignia, or identifying characteristics sufficient to confirm the identity of the courier.

In embodiments, an authorization code may be provided from a remote location different than said transfer location.

In embodiments, a courier may accept transfer of the material from a custodian only upon confirming the identity of the custodian, or only upon presentation of an authorization code by the custodian to the courier, or both. In embodiments, a courier may accept transfer of the material from a custodian (following presentation of the authorization code by the courier to the custodian) only upon presentation or inspection of information identifying the material, confirming the authenticity of the material, or confirming its suitability.

Thus, in embodiments, a further method for transferring material from a custodian at a transfer location to a courier comprises:
Presenting courier identifying information effective to identify the courier as a proper courier;
Providing said courier with an authorization code when:
i) The courier is present at said transfer location,
ii) Within a period of time designated for the transfer of said material;
Presenting said authorization code to the custodian at the transfer location, whereby the custodian authorizes transfer of the material to the courier;
Identifying the custodian, or identifying the material, or both; and
Transferring said material from said custodian to said courier.

Thus, in further embodiments, a further method for transferring material from a custodian at a transfer location to a courier comprises:
Presenting courier identifying information effective to identify the courier as a proper courier;
Providing said courier with an authorization code when:
i) The courier is present at said transfer location,
ii) Within a period of time designated for the transfer of said material;
Presenting said authorization code to the custodian at the transfer location, whereby the custodian authorizes transfer of the material to the courier;
Confirming authorization of the custodian, or confirming authorization of the material, or both; and
Transferring said material from said custodian to said courier.

Transfer of material is not authorized in the absence of an authorization code, or if an authorization code is not valid, or if a courier is not properly identified as a proper courier, or if the courier is not present at a designated time. In embodiments, a custodian will not transfer material in the absence of an authorization code, or if the authorization code is not valid. In embodiments, a custodian will not transfer material in the absence of proper identification of a courier. In embodiments, a custodian will not transfer material to a courier if the courier is present at a time outside a designated time period. In embodiments, a courier will not accept material in the absence of proper identification or authorization of a custodian. In embodiments, a custodian will not transfer material to a courier if the courier is present at a time outside a designated time period. In embodiments, a courier will not accept material in the absence of proper identification or authorization of the material.

In embodiments, the custodian may fail to confirm the authenticity of the authorization code, and the custodian will then prevent the transfer of the material to the courier. In embodiments, a method for preventing the unauthorized transport of material from a transfer location to a destination further comprises verifying the identity of the courier. Verification of the identity of the courier may comprise, for example, presentation of identification documents; identity verification using biometric means; identity verification by photographic or other imaging means; or other means. For example, verification of the identity of the courier may comprise obtaining a photograph or other image with a cell phone, transmission of the photograph or image, and verification of the identity of the courier.

Accordingly, in embodiments, a method for preventing the unauthorized transfer of material comprises:
Presenting an authorization code to a custodian at the transfer location, wherein said authorization code is presented by a courier, wherein said courier arrived at said transfer location at a courier arrival time;
Failing to confirm the authenticity of the authorization code, failing to confirm the identity of the courier, failure of the arrival time to be a time within a designated time period, or a combination thereof; and
Preventing the transfer of the material to the courier,
Whereby the unauthorized transfer of material is prevented.

In embodiments, the courier may fail to confirm the identity or authorization of the custodian. In embodiments, the courier may fail to confirm the identity or authorization of the material. In embodiments, the courier may fail to confirm the suitability of the material. In the event of such failures, the courier may not accept material from the custodian, thereby preventing the transfer of the material to the courier. In embodiments, a method for preventing the unauthorized transport of material from a transfer location to a destination thus further comprises verifying the identity or authorization of the custodian. In embodiments, a method for preventing the unauthorized transport of material from a transfer location to a destination thus further comprises verifying the identity or authorization of the material. Verification of the identity or authorization of the custodian may comprise, for example, presentation of identification documents; identity verification using biometric means; identity verification by photographic or other imaging means; or other means. For example, verification of the identity or authorization of a custodian may comprise obtaining a photograph or other image with a cell phone, transmission of the photograph or image, and verification of the identity or authorization of the custodian. Verification of the identity or authorization of the material may comprise, for example, presentation of material identification documents; signature of material identification or transport documents; verification of a serial number, an insignia, or other markings; verification using automatic (e.g., bar code, RFID or other means); identity verification by photographic or other imaging means; or other means.

Accordingly, in embodiments, a method for preventing the unauthorized transfer of material comprises:
Presenting an authorization code to a custodian at the transfer location, wherein said authorization code is presented by a courier, wherein said courier arrived at said transfer location at a courier arrival time;
Attempting to confirm the identity or authorization of a custodian;

Attempting to confirm the identity or authorization of a material;

Failing to confirm the authenticity of the authorization code, failing to confirm the identity of the courier, failure of the arrival time to be a time within a designated time period, failing to confirm the identity or authorization of a custodian, failing to confirm the identity or authorization of a material, or a combination thereof; and Preventing the transfer of the material to the courier, Whereby the unauthorized transfer of material is prevented.

A courier may transport a material from a transfer location to a destination. A courier may transport a plurality of materials from a plurality of transfer locations to a destination. A courier may transport a plurality of materials from a plurality of transfer locations to a plurality of destinations. A courier may travel along a route, e.g., a route to a transfer location; a route from one transfer location to another; a route from a transfer location to a destination; a route from one destination to another destination. A courier may be provided with a route (e.g., a route to be followed when traveling to a transfer location, between transfer locations, to a destination, between destinations, or to other locations, or combinations thereof).

In embodiments, a route may be determined according to factors comprising distance between a transfer location and a destination; distance between a first transfer location and a second transfer location; traffic conditions; road conditions; environmental conditions (e.g., weather); type of material to be transported; source of material to be transported; time-sensitivity of the transport; perishability of the material to be transported; fragility of the material to be transported; availability of air conditioning/heating in transport vehicle; and other factors.

Accordingly, in embodiments, Applicants disclose a method for transporting a material from a transfer location to a destination, comprising:

Providing a courier with a route to a transfer location and a destination;

Providing a courier with an authorization code at said transfer location;

Transferring a material to said courier upon presentation of said authorization code to a custodian at said transfer location; and Transporting said material to said destination.

Accordingly, in embodiments, Applicants disclose a method for transporting a material from a transfer location to a destination, comprising:

Providing a courier with a route to a transfer location and a destination;

Providing a courier with an authorization code at said transfer location;

Verifying the authorization code;

Verifying the identity of the courier;

Transferring a material to said courier upon presentation of said authorization code to a custodian at said transfer location; and Transporting said material to said destination.

In further embodiments, a method for transporting a material from a transfer location to a destination comprises:

Providing a courier with a route to a transfer location and a destination;

Providing a courier with an authorization code at said transfer location;

Verifying the authenticity of said authorization code;

Transferring a material to said courier upon presentation of said authorization code to a custodian at said transfer location; and Transporting said material to said destination.

In embodiments, a courier is only provided with an authorization code upon being present at a transfer location at a time within a designated time period. In embodiments, a courier is only provided with an authorization code upon presentation of identification, and being present at a transfer location at a time within a designated time period.

Accordingly, in embodiments, Applicants disclose a method for transporting a plurality of materials from a plurality of transfer locations to a destination, comprising:

Providing a courier with a route to a first transfer location, to one or more subsequent transfer locations, and to a destination;

Providing a courier with a first authorization code at said first transfer location;

Transferring a first material to said courier upon presentation of said first authorization code to a custodian at said first transfer location;

Providing a courier with a subsequent authorization code at one or more subsequent transfer locations;

Transferring a subsequent material to said courier upon presentation of said subsequent authorization code to a custodian at one or more subsequent transfer locations; and Transporting said first material and each of said subsequent materials to said destination.

In embodiments, such methods comprise providing a courier with a subsequent authorization code at each of said one or more subsequent transfer locations. In embodiments, such methods comprise transferring a subsequent material to said courier upon presentation of said subsequent authorization code to a custodian at each of said one or more subsequent transfer locations.

In embodiments, such methods further comprise verifying the authenticity of an authorization code at a transfer location. In embodiments, such methods further comprise verifying the authenticity of each authorization code at one or more transfer locations. In embodiments, such methods further comprise verifying the authenticity of each authorization code at each transfer location.

In embodiments, a courier is only provided with an authorization code upon being present at a transfer location at a time within a designated time period. In embodiments, a courier is only provided with an authorization code upon presentation of identification, and being present at a transfer location at a time within a designated time period.

Providing a courier with a route to a first transfer location, to one or more subsequent transfer locations, and to a destination;

Providing a courier with a first authorization code at said first transfer location;

Verifying the authorization code at said first transfer location;

Verifying the identity of the courier at said first transfer location;

Transferring a first material to said courier upon verification of said first authorization code to a custodian at said first transfer location;

Providing a courier with a subsequent authorization code at each of said one or more subsequent transfer locations;

Verifying the authorization code at each of said subsequent transfer locations;

Verifying the identity of the courier at each of said subsequent transfer locations;

Transferring a subsequent material to said courier upon presentation of said subsequent authorization code to a custodian at one or more subsequent transfer locations; and Transporting said first material and each of said subsequent materials to said destination.

Accordingly, in embodiments, Applicants disclose a method for transporting a plurality of materials from a transfer location to a plurality of destinations, comprising:

Providing a courier with a route to a transfer location and to a plurality of destinations, wherein said plurality of destinations comprises a first destination and one or more subsequent destinations;

Providing a courier with an authorization code at said transfer location;

Transferring said plurality of materials to said courier upon presentation of said authorization code to a custodian at said transfer location, wherein said plurality of materials comprises a first material to be delivered to a first destination, and one or more subsequent materials to be delivered to one or more subsequent destinations;

Transporting said first materials to said first destination; and

Transporting each of said subsequent materials to each of said subsequent destinations.

In embodiments, such methods further comprise verifying the authenticity of an authorization code at a transfer location.

In embodiments, a courier is only provided with an authorization code upon being present at a transfer location at a time within a designated time period. In embodiments, a courier is only provided with an authorization code upon presentation of identification, and being present at a transfer location at a time within a designated time period.

Accordingly, in embodiments, Applicants disclose a method for transporting a material or a plurality of materials from a plurality of transfer locations to a plurality of destinations, comprising:

Providing a courier with a route to a first transfer location, to one or more subsequent transfer locations, to a first destination, and to one or more subsequent destinations;

Providing a courier with an authorization code at said first transfer location;

Transferring said first material to said courier upon presentation of said authorization code to a custodian at said first transfer location, wherein said first material comprises a material or plurality of materials to be transported to a first destination, or to a first destination and one or more subsequent destinations;

Providing a courier with a subsequent authorization code at one or more subsequent transfer locations;

Transferring a subsequent material or plurality of materials to said courier upon presentation of said subsequent authorization code to a custodian at one or more subsequent transfer locations, wherein said subsequent material comprises a material or plurality of materials to be transported to a first destination, or to a first destination and one or more subsequent destinations; and Transporting said materials to said first destination or to said first destination and said subsequent destination or destinations.

In embodiments, such methods comprise providing a courier with a subsequent authorization code at each of said one or more subsequent transfer locations. In embodiments, such methods comprise transferring a subsequent material or plurality of materials to said courier upon presentation of said subsequent authorization code to a custodian at each of said one or more subsequent transfer locations.

In embodiments, such methods further comprise verifying the authenticity of an authorization code at a transfer location. In embodiments, such methods further comprise verifying the authenticity of each authorization code at one or more transfer locations. In embodiments, such methods further comprise verifying the authenticity of each authorization code at each transfer location.

In embodiments, a courier is only provided with an authorization code upon being present at a transfer location at a time within a designated time period. In embodiments, a courier is only provided with an authorization code upon presentation of identification, and being present at a transfer location at a time within a designated time period.

Accordingly, in embodiments, Applicants disclose a method for transporting a material or a plurality of materials from a plurality of transfer locations to a plurality of destinations, comprising:

Providing a courier with a route to a first transfer location, to one or more subsequent transfer locations, to a first destination, and to one or more subsequent destinations;

Providing a courier with an authorization code at said first transfer location;

Verifying the authorization code at said first transfer location;

Verifying the identity of the courier at said first transfer location;

Transferring said first material to said courier upon verification of said authorization code and identification of said courier at said first transfer location, wherein said first material comprises a material or plurality of materials to be transported to a first destination, or to a first destination and one or more subsequent destinations;

Providing a courier with a subsequent authorization code at one or more subsequent transfer locations;

Verifying the authorization code at said one or more subsequent transfer locations;

Verifying the identity of the courier at said one or more subsequent transfer locations;

Transferring a subsequent material or plurality of materials to said courier upon presentation of said subsequent authorization code or codes and identification of the courier at one or more subsequent transfer locations, wherein said subsequent material comprises a material or plurality of materials to be transported to a first destination, or to a first destination and one or more subsequent destinations; and Transporting said materials to said first destination or to said first destination and said subsequent destination or destinations.

In embodiments, the courier may require the confirmation of the identity or authorization of the custodian. In embodiments, the courier may require the confirmation of the identity or authorization of the material. Thus, embodiments of methods for transporting material or materials to a destination or destinations may comprise confirmation of the identity or authorization of the custodian. Thus, embodiments of methods for transporting material or materials to a destination or destinations may comprise confirmation of the identity or authorization of the material. In the event of failure of such confirmations, the courier may not accept material from the custodian, thereby preventing the transfer of the material to the courier, so that the materials are not transported to a destination.

Accordingly, embodiments of methods for transporting a material from a transfer location to a destination may further comprise confirmation of the identity or authorization of the custodian. In embodiments, methods for transporting a material from a transfer location to a destination may further comprise confirmation of the identity or authorization of the material.

Accordingly, embodiments of methods for transporting a plurality of materials from a plurality of transfer locations to a destination may further comprise confirmation of the identity or authorization of the custodian. In embodiments, methods for transporting a plurality of materials from a plurality of transfer locations to a destination may further comprise confirmation of the identity or authorization of the material.

Accordingly, embodiments of methods for transporting a plurality of materials from a transfer location to a plurality of destinations may further comprise confirmation of the identity or authorization of the custodian. In embodiments, methods for transporting a plurality of materials from a transfer location to a plurality of destinations may further comprise confirmation of the identity or authorization of the material.

Accordingly, embodiments of methods for transporting a material or a plurality of materials from a plurality of transfer locations to a plurality of destinations may further comprise confirmation of the identity or authorization of the custodian. In embodiments, methods for transporting a material or a plurality of materials from a plurality of transfer locations to a plurality of destinations may further comprise confirmation of the identity or authorization of the material.

A courier may travel in a vehicle. Transport by courier may comprise transport in a vehicle. In embodiments, a vehicle may be a bicycle, a car, a truck, a van, a trailer, a train, a driverless vehicle, an airplane, a helicopter, a pilotless aircraft, a boat, or other vehicle. A material to be transported may be transported in a vehicle. A material transported in a vehicle may be placed in a container.

Accordingly, materials may be placed in a container for transport; in embodiments, materials may be placed in a transport container. A transport container may be thermally insulated. In embodiments, a transport container may be temperature controlled; for example, a transport container may comprise a cooling apparatus. For example, a transport container may comprise a fan, or other cooling means (e.g., ice, dry ice, other cooling material, evaporative cooling, refrigerant, or other cooling apparatus or cooling elements), and may comprise a refrigerator. In embodiments, a transport container may comprise a heater.

In embodiments, a transport container may comprise a temperature sensor; a transport container may comprise a display or a communication link for communicating a sensed temperature; a transport container may comprise a communication link for receiving information and for receiving instructions, which information and instructions may relate to a sensed temperature, and to other factors.

Thus, in embodiments, a transport container may comprise an enclosure, a lid, a temperature sensor, and a communication link. In embodiments, an enclosure may comprise thermal insulation, e.g., a material that provides thermal insulation, a design that provides thermal insulation. In embodiments, a transport container may comprise a cooling apparatus. In embodiments, cooling apparatus may include, e.g., a refrigerant, a refrigerator coil, a pump, a fan, an evaporation or heat exchange element, and other elements.

Accordingly, a method for containing material comprises:
Placing a material in a transport container, wherein said transport container comprises a temperature sensor, and a communications link or display for communicating a sensed temperature;
Sensing a temperature; and
Displaying said sensed temperature, communicating said sensed temperature by said communications link, or both.

In embodiments, a courier may alter a designated route in order to optimize the transport of materials in view of the temperature in a transport container, or in view of information or instructions communicated via a communication link of a transport container.

Accordingly, a method for the transport of material comprises:
Placing a material in a transport container, wherein said transport container comprises a temperature sensor, and a communications link or display for communicating a sensed temperature;
Transporting said material in said transport container;
Sensing a temperature; and
Displaying said sensed temperature, communicating said sensed temperature by said communications link, or both.

In embodiments, a method for the transport of material further comprises transport by a courier, wherein said material was transferred to said courier upon presentation of an authorization code to a custodian.

An alert may be triggered, and an alert may be communicated, if the temperature is sensed to be outside a desired range, e.g., above a maximum level. Accordingly, a method for the transport of a material along a route to a destination comprises:
Placing a material in a transport container, wherein said transport container comprises a temperature sensor, and a display for communicating a sensed temperature;
Transporting said material in said transport container;
Sensing a temperature;
Displaying an alert when said sensed temperature exceeds an alarm limit; and
Altering said route to said destination.

In embodiments, a method for the transport of material along a route to a destination further comprises transport by a courier, wherein said material was transferred to said courier upon presentation of an authorization code to a custodian.

A courier, or an operator monitoring a communication link, or others, may monitor the sensed temperature, and respond if the temperature falls outside a desired range. An alert may be communicated if the temperature falls outside a desired range. In embodiments, a temperature may fall outside a desired range if the temperature rises above an upper limit. In embodiments, a temperature may fall outside a desired range if the temperature falls below a lower limit.

In further embodiments, a method for the transport of a material along a route to a destination comprises:
Placing a material in a transport container, wherein said transport container comprises a temperature sensor, and a communication link configured to communicate a sensed temperature;
Transporting said material in said transport container;
Sensing a temperature;

Communicating said sensed temperature; and

Altering said route to said destination.

In embodiments, such a method for the transport of material along a route to a destination further comprises transport by a courier, wherein said material was transferred to said courier upon presentation of an authorization code to a custodian. In embodiments, such methods (e.g., methods for the transport of material, and methods for the transport of material along a route) may further comprise confirming the identity of the custodian, confirming the authorization of the custodian to transfer the material, or both. In embodiments, such methods may further comprise confirming the identity of the custodian, confirming the authorization of the custodian to transfer the material, or both, at each transfer location.

In embodiments, communicating comprises providing a signal to a remote location, e.g., providing a signal to an operator situated at a remote location, or to a processor situated at a remote location. In embodiments, communicating comprises providing a signal to a processor linked to a network, such as, e.g., a cloud network. In embodiments, communicating said sensed temperature comprises communicating a temperature that exceeds an alarm limit.

Materials may be placed in a storage container for storage; for example, materials may be placed in a temperature-controlled storage container for storage. In embodiments, a temperature-controlled storage container may comprise a cooling apparatus, e.g., a refrigerator. Materials may be placed in a storage container following transport to a destination. A storage container may comprise a temperature-controlled internal volume. A temperature-controlled storage container may comprise an enclosure and a portal through which materials may be placed in the container, and through which materials may be removed from the container; in embodiments, a portal may be a door, lid, hatch, or other aperture which may, in one configuration, be covered, and in another configuration, provides access to the interior of the container. A portal may be configured to make a tight seal with the enclosure when closed; a tight seal may comprise a water-tight seal, or may comprise an air-tight seal. In embodiments, a tight seal may comprise a light-tight seal.

A storage container configured to store material and to maintain the material in a condition suitable for its later use or further transport is provided herein. In embodiments, a storage container as disclosed herein may include an enclosure, a portal, a display or communication link, and a light sensor; in further embodiments, such a storage container may comprise a temperature sensor. For example, an enclosure of a storage container may be thermally insulated or otherwise configured for maintaining a desired internal temperature. A storage container portal may include, for example, an aperture allowing access to the interior of the enclosure; e.g., a portal may comprise a lid, door, or other element allowing access to the interior of the enclosure when open, and preventing such access when closed. In embodiments, a light sensor may be placed within a storage container and configured to detect when a portal may be open (e.g., when light may enter via a portal). In embodiments, a light sensor may be suitable to detect the opening of a portal; the incomplete closure of a portal; the number of times a portal is opened; and other events and time-periods when light may enter a storage container. In embodiments, a storage container may comprise a memory element configured to record light levels, e.g., may be configured to record the opening of a portal; the incomplete closure of a portal; the number of times a portal is opened; and other events and time-periods when light may enter a storage container.

Accordingly, a method for the storage of a material comprises:

Placing a material in a storage container having an interior space, wherein said storage container comprises a portal providing access to said interior space and configured to open, a light sensor configured to sense a light level in said interior space within said storage container, and a communication link for communicating a sensed light level;

Sensing a light level within said storage container; and

Communicating said sensed light level.

In embodiments, the material placed in a storage container was under the control of a custodian. In embodiments, the material placed in a storage container was placed in said container by a custodian. In embodiments, the material placed in a storage container was provided by a courier, wherein said material was transferred to said courier upon presentation of an authorization code to a custodian.

In embodiments, the storage container further comprises memory.

Accordingly, a method for the storage of a material comprises:

Placing a material in a storage container, wherein said storage container comprises an interior space, a portal providing access to said interior space and configured to open, a light sensor configured to sense a light level in said interior space within said storage container, and a communication link for communicating a sensed light level;

Sensing a light level within said storage container; and

Recording said sensed light level in said memory.

In embodiments with a storage container that comprises memory, such methods may further comprise communicating said sensed light level, and may further comprise communicating a plurality of sensed light levels.

In embodiments of such methods comprising a storage container, with or without memory, a sensed light level may be indicative of whether a port is in an open configuration or whether a port is in a closed configuration. In embodiments, an alarm may be communicated when a port is in an open configuration, e.g., an alarm may be communicated when a port is in an open configuration for a period of time that exceeds a minimum period of time.

Accordingly, methods for the secure transport of materials are provided. Devices and systems, including transport containers and storage containers for the secure transport of materials are provided. Such materials include biological materials such as biological samples, biological specimens, organs for transplant, and other biological materials.

Such materials may comprise perishable materials; for example, perishable materials, in addition to such biological materials as biological samples, specimens, tissues, and organs, may also include foodstuffs; living creatures; radioactive materials with a short half-life; chemicals which may degrade, are unstable, or may otherwise be short-lived; and other perishable materials.

In addition, in embodiments, the methods, devices, and systems (including containers) disclosed herein may be used for the secure transport of highly valuable, or rare materials, such as: cash; securities; jewels; other valuables; art objects; rare stamps, books or manuscripts; other collectibles; and other materials. In addition, in embodiments, the methods and containers disclosed herein may be used for the secure transport of dangerous or confidential materials, particularly materials whose transport requires a documented chain-of-custody, such as: nuclear materials, including nuclear waste; confidential documents, including military documents and documents subject to export controls; poisons; evidence used in, or to be used in, a legal proceeding; research materials; and other materials.

The methods, devices, and systems (including transport containers and storage containers) provide superior methods for insuring that a courier is indeed a proper, authorized courier; that materials are only transferred to an authorized courier; and that materials are only transported by an authorized courier. Superior methods are provided which allow the re-routing of a courier, when required by any of several possible conditions, while retaining the ability to insure that a courier is an authorized courier even after alteration of a route. For example, provision of an authorization code to a courier only upon the arrival of the courier at a designated place at a designated time prevents unauthorized transfer, even when a route has been changed, since an authorization code is provided to a courier only upon their arrival at a transfer location at a (changed) designated time. Such methods provide improved security by ensuring that transport of materials is authorized; provide improved reliability by requiring that time, location, and courier be authorized prior to transfer of material; and provide improved safety by providing monitoring of routes, conditions, and containers. Transport containers and storage containers disclosed herein comprise novel features and capabilities, and enable further advantages when used in the practice of the novel methods disclosed herein.

Such methods, systems and devices thus provide advantages in security, reliability, and safety as compared to prior methods, systems, and devices. Accordingly, the methods, devices, and systems (including transport containers and storage containers) disclosed herein provide advantages over the art.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
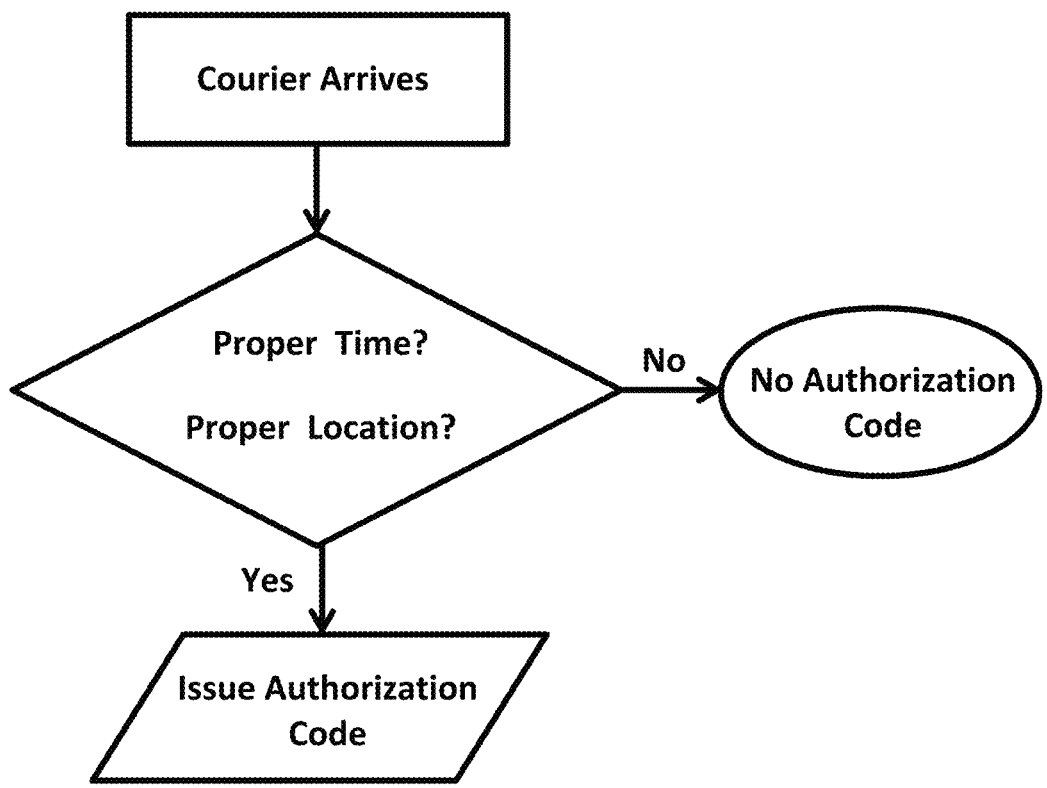
FIG. 1 provides a schematic representation of an embodiment of a method for providing an authorization code to a courier only upon the arrival of the courier at the correct transfer location and at the correct time (e.g., within a predetermined time period).

Description and disclosure of examples of methods, devices, and systems which may use, or be used with, method, devices, and systems disclosed herein may be found, for example, in U.S. Patent Application 61/864,505, filed Aug. 9, 2013; U.S. Patent Application 61/814,799, filed Apr. 22, 2013; U.S. Pat. Nos. 7,291,497; 8,088,593; 8,101,402; 8,380,541; U.S. patent application Ser. No. 13/769,798, filed Feb. 18, 2013; U.S. patent application Ser. No. 13/769,779, filed Feb. 18, 2013; U.S. patent application Ser. No. 13/769,817, filed Feb. 18, 2013; U.S. patent application Ser. No. 13/769,818, filed Feb. 18, 2013; U.S. patent application Ser. No. 13/769,820, filed Feb. 18, 2013; U.S. patent application Ser. No. 13/244,947 filed Sep. 26, 2011; PCT/US2012/57155, filed Sep. 25, 2012; U.S. application Ser. No. 13/244,946, filed Sep. 26, 2011; U.S. patent application Ser. No. 13/244,949, filed Sep. 26, 2011; and U.S. Application Ser. No. 61/673,245, filed Sep. 26, 2011, the disclosures of which patents and patent applications are all hereby incorporated by reference in their entireties.

Definitions

Before the present methods, devices, and systems are disclosed and described, it is to be understood that the terminology used herein is for the purpose of describing particular embodiments only and is not intended to be limiting. It is also to be understood that the present disclosure provides explanatory and exemplary descriptions and examples, so that, unless otherwise indicated, the devices, systems, and methods disclosed herein are not limited to the specific embodiments described herein.

It must be noted that, as used in the specification and the appended claims, the singular forms "a," "an" and "the" include plural referents unless the context clearly dictates otherwise. Thus, for example, reference to "a sample" refers to a single sample or multiple samples, including multiple kinds of samples.

Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise. Thus, in contexts where the terms "and" or "or" are used, usage of such conjunctions do not exclude an "and/or" meaning unless the context expressly dictates otherwise.

In this specification and in the claims that follow, reference will be made to a number of terms, which shall be defined to have the following meanings:

Acronyms and abbreviations, such as "min" (minute), "sec" (second), and so forth, have their customary meanings.

As used herein, the terms "time" and "designated time" refer to a particular time and to a reasonable amount of time before and after the named time; thus, for example, "2:00 PM" refers to 2:00 PM and a few minutes before, and a few minutes after, 2:00 PM. A reasonable amount of time before and after a designated time may be, for example, a few minutes before, and a few minutes after, the designated time. In embodiments, a few minutes may be 1, 2, 3, 4, 5, 6, or more minutes, or may be 10, 20, or 30 minutes, or more.

As used herein, the terms "time period" and "period of time" refer to a continuous duration of time, bounded by a beginning time and an ending time; a time period may include a designated time (e.g., a ten-minute period of time around 2:00 PM may be a time period beginning at 1:55 PM and extending until 2:05 PM; note that, since each of 1:55 PM, 2:00 PM, and 2:05 PM are particular times, a ten-minute period of time around 2:00 PM begins at about 1:55 PM and extends until about 2:05 PM). For example, a period of time may comprise a time that is within a few minutes before, and a few minutes after, a designated time, where a few minutes may be about 1, 2, 3, 4, 5, 6, or more minutes, or may be about 10, 20, or 30 minutes, or more. In embodiments, a period of time may comprise a time within about 1 minute, or within about 2 minutes, or within about 5 minutes, or within about 10 minutes, or within about 15 minutes, or within about 20 minutes, or within about 30 minutes, or within about 45 minutes, or within about one hour, or within about one and a half hours, or within about 2 hours, or within about 3 hours, or within about 4 hours, or within about 5 hours, of a designated time (where "within", as used in this regard, means before and/or after).

As used herein, the term "arrival time" refers to a time at which a courier arrives at a transfer location or destination. An arrival time may be a designated time. In embodiments, an arrival time comprises a period of time.

As used herein, the term "designated location" refers to a specified location, such as a particular location along a route.

As used herein, the term "transfer location" refers to a location at which a material to be transferred is located prior to the transfer.

As used herein, the terms "destination" and "destination location" refer to a location to which a material is to be transported, pursuant to the transfer of the material from an initial location (e.g., the transfer location) to a subsequent location (the destination).

As used herein, an "intermediate location" refers to a location that may be visited by a courier, but at which no transfer of material for transport is expected or required to be made; an intermediate location may be, for example, a location where a courier vehicle may stop for fuel, or repair, or where a courier may stop for rest, or food, or for any other reason. In embodiments, an intermediate location may be a location where a courier, or courier vehicle, or material transported by a courier or courier vehicle, may be inspected, or registered, or where information or instructions may be transmitted (e.g., to a courier; from a courier; or both).

As used herein, a "route" refers to an ordered sequence of locations, where a location may be, for example, a transfer location, a destination, an intermediate location, or other location. A route may comprise an arrival time, or a sequence of arrival times; such arrival times may be associated with a location, or sequence of locations. In embodiments, a route comprises a sequence of locations, with each location having an associated arrival time.

As used herein, a "planned route" refers to a route of travel planned for a courier to take when picking up material from a transfer location, or from a plurality of transfer locations. For example, where material is to be obtained from a single transfer location, a planned route would comprise a route expected to be taken by a courier in traveling to the transfer location, and in traveling from the transfer location to the destination. Where material is to be obtained from two or more transfer locations, a planned route would comprise a route expected to be taken by a courier in traveling to the first transfer location, to the second transfer location, and to any subsequent transfer locations, and in traveling from the final transfer location to the destination. A planned route thus includes a planned sequence of arrival at the one or more transfer locations and the one or more destinations. A planned route may start from a starting location. In embodiments, a starting location may also be a destination location (e.g., where the planned route comprises a loop). A planned route may comprise a planned sequence of arrival times, e.g., may comprise a planned sequence of arrival times, where each arrival time is associated with a location.

As used herein, the term "remote location" refers to a location that is not the transfer location. A remote location may include a physical location (e.g., a location at which a processor is situated), may include a virtual location (e.g., a computer network, such as "the cloud"), and may include both a physical location and a virtual location (e.g., a remote location may comprise elements of a processor situated at a specific physical location, and may also comprise virtual elements, where, for example, the processor accesses and uses services from a network). A remote location may comprise a destination location. A remote location may comprise a location that is not on a planned route. In embodiments, a remote location may comprise a location that is on a planned route; however, a location is not termed a remote location with respect to a courier when a courier is present at that location (but may be termed a remote location when the courier is absent from that location).

As used herein, the term "authorization code" refers to any code or symbol which serves to verify the authenticity of a person or procedure, or which verifies that an act is in accordance with proper procedures, or has been approved by the proper authorities; presentation of an authorization code may be required in order to allow a person or procedure to proceed as planned or expected by an accepted protocol. As disclosed herein, a unique, single-use authorization code is provided for use by a courier when the courier is present at a pre-defined location (e.g., a transfer location) at a pre-defined time (e.g., an arrival time or arrival time period). For example, where the accepted protocol comprises the pick-up of a material at a transfer location by a courier and the subsequent delivery of the material to a destination, presentation of an authorization code at the transfer location allows the transfer of the material to the courier; in the absence of the authorization code, the material would not be transferred to the courier, and the remaining steps of the accepted protocol (e.g., delivery of the material to the destination) would not proceed absent such authorization.

A unique authorization code is typically generated, or provided, for use at one time only; for example, where a courier proceeds from a first transfer location to a subsequent transfer location, a new authorization code may be generated for pick-up at the subsequent transfer location; and, for example, where a courier returns at another time to a first transfer location for a subsequent pick-up, a new authorization code may be generated, or provided, for the subsequent pick-up at the first transfer location. A unique authorization code is typically generated, or provided, for use at one time and at one location only; for example, a unique authorization code may be generated, or provided, to a courier for use at a first location within a first time period; and, where the courier proceeds to a subsequent transfer location, a new authorization code may be generated, or provided, for use at the subsequent transfer location within a subsequent time period. An authorization code, a portion or portions of an authorization code, or multiple authorization codes may be provided to a courier in an encrypted form. An authorization code, or a portion or portions of an authorization code, or multiple authorization codes may be provided to a custodian in an encrypted form.

It will be understood, however, that in embodiments, a unique authorization code may be generated, or provided, for use at multiple locations, such as, e.g., at multiple locations visited during a single route; for example, a unique authorization code may be generated, or provided, for use in a trip in which a courier proceeds from a first transfer location to one or more subsequent transfer locations, in a single trip (e.g., without returning to a point of origin, or without re-visiting a location) and then proceeds to a destination or destinations.

An authorization code may comprise, for example, a symbol, such as a bar code, Quick Response code (QR code), or arbitrary symbol (which may be displayed on a cell-phone, a tablet, a computer screen, or by other means); a number (i.e., a numeric code); a series of letters (i.e., an alphabetic code); a combination of numbers and letters (i.e., an alphanumeric code); a combination of symbols, numbers, and letters; or other code. An authorization code may be machine readable, may be readable by a human, and may comprise a combination thereof. Where visible to a human or to a scanner, camera, or other light-sensing device, an authorization code may be black and white, may comprise gray, may comprise colors, and may comprise a combination thereof. An authorization code may comprise visual elements; may comprise audio elements; may comprise electrical elements; may comprise magnetic elements; may comprise electromagnetic signals or elements; may comprise mechanical elements; and may comprise combinations thereof. For example, an authorization code that comprises audio elements may comprise the generation of, or the reception of, a sound (e.g., a pitch, or series of pitches, or combination of pitches). For example, an authorization code that comprises magnetic elements may comprise the generation of, or the reception of, a magnetic field, or the placement of a magnet on or near a sensor. For example, an authorization code that comprises electromagnetic elements may comprise the generation of, or the reception of, an electromagnetic signal (e.g., a signal comprising radio, microwave, infrared, visual, ultraviolet, or other electromagnetic energy). In embodiments, an authorization code may comprise mechanical elements, including elements that require physically mating or fitting one object to another (such as, e.g., a key which fits in a lock, a card which slides in a slot, a tag which is configured to lodge in a tag reader, or other mechanical elements). An authorization code may comprise a combination of mechanical and other elements (e.g., a card comprising a magnetic strip, in which the card must slide in a slot in order that a magnetic code may be read by a card-reader). An authorization code may comprise, or the provision of an authorization code may require, a timing signal, a Global Positioning System (GPS) signal, a video signal, or other signal, and may comprise a combination thereof.

In embodiments, an authorization code may comprise a plurality of codes, or a plurality of code elements. An authorization code comprising a plurality of codes, or a plurality of code elements, may include any number of codes, or any number of code elements. For example, an authorization code comprising a plurality of codes may comprise two codes; or three codes; or four codes; or more codes. For example, an authorization code comprising a plurality of code elements may comprise any number of code elements; for example, a numeric code may comprise 1, 2, 3, 4, 5, 6, 7, 8, 9, 10, 11, 12, 13, 14, 15, 20, 30, 40, 50, or more digits, and an alphabetic code may comprise 1, 2, 3, 4, 5, 6, 7, 8, 9, 10, 11, 12, 13, 14, 15, 20, 30, 40, 50, or more letters. For example, an authorization code comprising a plurality of codes may comprise an alphanumeric code together with a bar code. For example, an authorization code comprising a plurality of codes may comprise an alphanumeric code together with a QR code. For example, an authorization code comprising a plurality of codes may comprise an alphanumeric code comprising characters (e.g., digits and letters) written in different colors together with an RFID code. For example, an authorization code comprising a plurality of codes may comprise a numeric code, a mechanical code (e.g., a card), a magnetic code (e.g., a magnetic strip), and a QR code. An authorization code comprising a plurality of codes may comprise any combination of codes.

As used herein, the term "material" is used to refer broadly to any physical item which may be transported from one location to another. A material may be inspected; for example, verification of the suitability of material may comprise inspection of the material, or verification of the identity of material may comprise inspection of the material. Inspection of material may determine that it is damaged, or spoiled, or incomplete, or otherwise not in a condition to be used as required, and so the material would not be a suitable material. Inspection of material may determine that it is not the material that is expected to be transferred, and so the material would fail to be identified as the proper material.

As used herein, the term "perishable" is used to describe a material that will degrade, or is susceptible to degradation, over a short period of time, where a short period of time is typically a few hours, and usually less than a few days. Biological materials, including biological samples as well as foodstuffs, are typically perishable. In many instances, measures can be taken to prolong the useful life of perishable materials, such as refrigeration, storage in dark conditions, protection from moisture, or wind, and other measures known in the art.

As used herein, the term "highly valuable" is used to refer to materials having commercial or sentimental value to an owner; for example, money, jewels, art objects, pure metals, and other materials are often highly valuable materials. However, any material, including biological material, may be valuable and may be highly valuable.

As used herein the term "rare" is used to refer to items which are unique or of which only a relatively few examples exist; rare objects may be natural objects, such as rare animals or minerals, and rare objects may be manufactured, such as paintings by a particular artist. Rare objects are often highly valuable.

As used herein the term "dangerous" is used to refer to items which may harm people, animals, or property; such materials may be, e.g., toxic, infectious, volatile, explosive, corrosive, radioactive, or have other properties which may cause injury or damage.

As used herein, the term "biological material" refers to a material derived from living organisms, including specimens obtained from a subject, such as a human patient, or any mammal. Biological materials also refer to, without limitation, material obtained or derived from any animal, plant, or micro-organism, including cell cultures. The term biological materials refers to, for example, clinical specimens obtained from a subject (such as blood samples, urine samples, biopsy specimens, swabs, and other biological materials collected for use in research or in the clinical evaluation or diagnosis of a subject), and organs obtained from an organ donor, e.g., for transplantation into an organ recipient, and tissues (such as blood) obtained from a donor, e.g., for transfusion into a recipient.

As used herein, the term "biological sample" refers to a fluid, tissue, or other material collected from a subject, such as an organ (e.g., an organ for transplantation), a blood sample, a urine sample, a biopsy specimen, a throat swab, or other specimen obtained for a clinical or diagnostic test for use in research or in the clinical evaluation or diagnosis of a subject). Examples of biological samples include but are not limited to, blood, serum, plasma, bone marrow, a nasal swab, a nasopharyngeal wash, saliva, urine, gastric fluid, spinal fluid, tears, stool, mucus, sweat, earwax, oil, a glandular secretion, cerebral spinal fluid, tissue, semen, vaginal fluid, interstitial fluids derived from tumorous tissue, ocular fluids, spinal fluid, a throat swab, breath, hair, finger nails, skin, biopsy, placental fluid, amniotic fluid, cord blood, lymphatic fluids, cavity fluids, sputum, pus, microbiota, meconium, breast milk and/or other secretions or excretions. Biological samples may include nasopharyngeal wash, or other fluid obtained by washing a body cavity or surface of a subject, or by washing a swab following application of the swab to a body cavity or surface of a subject. Nasal swabs, throat swabs, stool samples, hair, finger nail, ear wax, breath, and other solid, semi-solid, or gaseous samples may be processed in an extraction buffer, e.g., for a fixed or variable amount of time, prior to their analysis. The extraction buffer or an aliquot thereof may then be processed similarly to other fluid samples if desired. Examples of tissue samples of the subject may include but are not limited to, connective tissue, muscle tissue, nervous tissue, epithelial tissue, cartilage, cancerous sample, or bone. The sample may be obtained from a human or animal. The sample may be obtained from a vertebrate, e.g., a bird, fish, or mammal, such as a rat, a mouse, a pig, an ape, another primate (including humans), a farm animal, a sport animal, or a pet. The sample may be obtained from a living or dead subject. The sample may be obtained fresh from a subject or may have undergone some form of pre-processing, storage, or transport.

A biological sample may comprise any size or volume. In embodiments, a single biological sample may comprise no more than about 1000 μL of volume, or no more than about 500 μL of volume, no more than about 250 μL of volume, or no more than about 150 μL of volume, or no more than about 100 μL of volume, or no more than about 50 μL of volume, or no more than about 40 μL of volume, or no more than about 30 μL of volume, or no more than about 25 μL of volume, or no more than about 20 μL of volume, or no more than about 10 μL of volume, or no more than about 5 μL of volume, or no more than about 4 μL of volume, or no more than about 3 μL of volume, or no more than about 2 μL of volume, or no more than about 1 μL of volume, or less than about 1 μL of volume.

As used herein, the term "cool" when used as a verb means to reduce the temperature of an object or of a space within an object.

As used herein, the terms "cool temperature", "cold temperature", and "cold" refer to a temperature that is reduced, e.g., that is less than an ambient temperature, or less than an original temperature. For example, a cool or cold temperature may be a temperature that is about 2° C., or about 3° C., or about 4° C., or about 5° C., or about 6° C., or about 7° C., or about 8° C., or about 9° C., or about 10° C., or about 15° C., or about 20° C., or about 25° C., or about 30° C., or about 35° C., less than an ambient, or an original temperature. For example, a cool or cold temperature may be a temperature of about 17° C., or about 15° C., or about 12° C., or about 10° C., or about 8° C., or about 6° C., or about 4° C., or about 3° C., or about 2° C., or about 1° C., or about 0° C.

As used herein, a "cooling apparatus" refers to any machine, machine element, or apparatus that is configured to cool a material or space to a temperature below that of ambient temperature, or to maintain the temperature of a material or space at a temperature below that of ambient temperature. A cooling apparatus may include ice, dry ice, a cold pack, a fan, an evaporative cooler, a refrigerant, a coil, a pump, a fan, a heat exchanger, or other active or passive cooling elements. A refrigerator is a cooling apparatus.

As used herein, the terms "cloud", "cloud computing", "cloud-based processor", and other terms including "cloud" refer to a computer or computer network capable of being accessed remotely, which is useful to provide computing services to one or more remote users by means of generally accessible interconnections. As used herein, the cloud includes any computer or computer network which may be accessed remotely by any suitable means. For example, access to the cloud may be via the internet, e.g., via an ethernet connection, via a wireless local area network ("WiFi") connection, a Bluetooth connection, an infrared link, via cell-phone, or any means which allows a user access to, or which provides communication between, a user and a network. A cloud may be a public cloud (e.g., accessible to any user with internet access) or may be a private cloud that is accessible to only a limited ("private") number of users (e.g., a network entirely behind a firewall, so that access is restricted to authorized users who can operate within the protected network behind a firewall). A private cloud may be a virtual private cloud (a network which may be accessible via public internet connections, for example, but which includes security features (e.g., requirements for passwords or other identification or verification features) so as to limit access to authorized users and to maintain security).

As used herein, a "courier" refers to a person or device effective to transport a material from one location to another location. For example, a courier may be a person who can carry a material from one location to another location; a courier may be a person who can transport a material from one location to another location in or on a vehicle, such as a bicycle, car, van, or truck; or a courier may comprise a mechanism or vehicle configured to carry a material from one location to another location autonomously (e.g., a conveyor belt, a pneumatic-tube transport system, a driverless vehicle, pilotless aircraft, or other automatic or autonomous transport system). Where a courier comprises a device operating in the absence of a person present at the designated location, the courier may be identified by photographic means; by external markings (e.g., bar code, serial number, identifying symbols or features); by electronic, optical, acoustic, or other codes communicated to a custodian by the device (e.g., via physical link such as an Ethernet, a universal serial bus (USB) or a firewire connection; a wireless link such as radio-frequency identification (RFID), Bluetooth, WiFi; or other communication means); or by any combination thereof.

As used herein, the term "custodian" refers to the person, or device that has control or possession of the material prior to its transport, and who provides the material to the courier upon proper verification of identity and authorization of the transfer.

As used herein, the term "operator" refers to a person, device, or system which is responsible for (e.g., monitors, controls, or maintains) an operation, in whole or in part. An operator may be a person. An operator may be a device working in conjunction with a communication link, or in conjunction with a processor, or in conjunction with a network, or in conjunction with a cloud service. An operator may comprise a device or system comprising a communication link, a processor, a network, a cloud service, or a combination thereof. For example, an operator may be responsible for providing an authorization code to a courier. For example, an operator may be responsible for encrypting an authorization code provided to a courier. For example, an operator may be responsible for verifying the authenticity of an authorization code. For example, an operator may be responsible for verifying the identity of a courier. For example, an operator may be responsible for verifying the identity of a custodian. For example, an operator may be responsible for providing a route for a courier; and may be responsible for providing a route to a courier. For example, an operator may be responsible for altering a route, e.g., in response to temperature readings from a transport container, or traffic conditions, or weather conditions, or for other reasons. For example, an operator may be responsible for issuing an alert, e.g., to a courier. For example, an operator may be responsible for altering a route in response to an alert. For example, an operator may be responsible for storage of a material at a location, which may be, e.g., a transfer location or a destination location.

As used herein, the term "communication link" refers to any means of communicating information, e.g. between an operator and a courier, or between a transport container and a courier, or between a courier and a network service (such as a cloud service). In embodiments, a communication link may comprise, for example, a wireless communication link, such as a cell phone, WiFi, radio-frequency identification (RFID), Bluetooth, infrared, direct microwave or radio link, or other communication linkage, which may comprise a computer, a router, an internet node, a network, or other intermediate device, element, or system. In embodiments, a communication link may comprise a physical linkage via telephone, ethernet, firewire, universal serial bus (USB) or other physical connection. In embodiments, a communication link may comprise a combination of wireless and physical links. In embodiments, a communication link may comprise a dedicated device, a dedicated communication device, a dedicated communication system, or a combination thereof. In embodiments, a communication link may comprise communication with a Global Positioning System (GPS) device or system (e.g., for positioning, timing, or both).

A communication link may be a secure communication link, e.g., one which is not easily intercepted and/or understood. For example, a communication link may utilize frequency hopping techniques, data compression techniques, encryption techniques, and other methods designed to preserve the confidentiality of messages and information transmitted over the communication link. In embodiments, a communication link may be configured to transmit and receive encrypted messages; in embodiments, any suitable encryption means may be utilized, including public-key encryption methods (e.g., PGP encryption), private key encryption, and others.

As used herein, a "display" comprises an interface able to be understood by a human, and may comprise a visual display, an audio display, a vibrating component, or other display element which a human may observe. In embodiments, a display is configured to provide information to a human. In embodiments, a display may comprise an interactive display which is configured to receive information and/or commands from a human (e.g., a display may comprise a touchscreen). A display may comprise a cell-phone display, a tablet-computer display, a computer monitor, a dedicated display device, other display element(s), and combinations thereof. In embodiments, a display may be configured to be used in conjunction with other elements or devices, including, e.g., a keyboard, a mouse, a speaker, a camera, a cell-phone, a tablet computer, a portable or other computer, or other element. In embodiments, a display is used with other elements or devices, including, e.g., being used along with a keyboard, a mouse, a speaker, a camera, or other element.

As used herein, "verification of an authorization code" refers to confirmation of the validity of an authorization code, including confirmation that the code is not counterfeit or corrupted; is still valid (e.g., is being presented within a proper time period); and is valid for the location at which it is presented. In embodiments, verification of an authorization code may include verification that the courier presenting the code is the proper courier for its use. Such verification regarding the courier may include verification of the identity of the courier.

Verification of an authorization code may comprise use of a check digit, parity bit, checksum, fingerprint, cryptographic hash function, or other code characteristic that allows the verification of an authorization code possessed or presented by a courier. Such verification may determine whether or not the code is counterfeit or corrupted; if so, verification fails, and no transfer is authorized. Verification of an authorization code may comprise comparison of an authorization code possessed or presented by a courier with an authorization code possessed or obtained by a custodian; may comprise observation of the delivery of an authorization code to a courier by a custodian (e.g., observation by a custodian of the appearance of an authorization code on a courier display, such as a tablet or cell-phone display), or by other means. The information for such verification procedures may be included (at least in part) in the authorization code itself; may be provided in a separate communication, e.g., to a custodian; or a combination thereof. In embodiments, such verification may comprise photographic or biometric identification of the courier, the custodian, or both.

As used herein, the terms "identification", "courier identification", "custodian identification", and the like, refer to providing information or documentation that identifies the bearer, and confirms the identity of the bearer. Such identification is typically provided by identification cards including photographs of the holder (such as driver's license or other such identification card). For example, identification of a courier or of a custodian refers to confirmation that the courier is a proper courier, or that the custodian is a proper custodian. Identification of a courier to a custodian refers to verification, to the custodian, that the courier is a proper courier and that (upon authorization) material may be transferred to the courier. Similarly, identification of a custodian to a courier refers to verification, to the courier, that the custodian is a proper custodian and that (upon confirmation) material may be accepted from the custodian. Identification of a material refers to verification that the material is a proper material. Verification of the identity of the courier or of the custodian may comprise, for example, presentation of identification documents; identity verification using biometric means; identity verification by photographic or other imaging means; or other means. For example, verification of the identity of the courier or custodian may comprise obtaining a photograph or other image with a cell phone, transmission of the photograph or image, and verification of the identity of the courier or custodian. Verification of the identity, propriety, or suitability of material may comprise inspection or verification of serial numbers, bar codes, RFID, markings, insignia, documentation, or other verification. Verification of the suitability of material may comprise inspection of the material. Verification of the identity of material may comprise inspection of the material.

Identification may be provided by any suitable means, including by presentation of identification cards, badges, or other insignia issued by an employer, agency, or other organization. Identification may be provided by observation, or other means. For example, identification may be provided biometrically, e.g., by iris scan, fingerprint, voice-print, cheek swab, hair sample, photographic or facial recognition (by a person, by software, or both), or other means identifying an individual by their personal physical or behavioral characteristics. Identification of a material, container, device or vehicle may be by bar code, serial number, radio-frequency identification (RFID), or other distinguishing characteristic.

Secure Transport of Materials

Secure transport of material, such as biological materials, e.g., biological samples, from a transfer location to a courier for transport to a destination location requires that the materials be transported by the proper courier. Delivery of materials for transport to an unauthorized courier may lead to loss of the material, misdirection of the material, spoilage of the material, or other unfavorable events. Accordingly, methods for insuring that transport of materials is undertaken only by authorized couriers are disclosed herein.

In embodiments, provision of an authorization code to a courier may be contingent upon 1) identification of a courier, and 2) upon the presence of the courier at a proper time, or within a proper time interval. In embodiments, provision of an authorization code may be contingent upon 1) identification of a courier, and 2) upon the presence of the courier at a proper location. In embodiments, provision of an authorization code may be contingent upon 1) identification of a courier, 2) upon the presence of the courier at a proper time, or within a proper time interval, and 3) upon the presence of the courier at a proper location.

In embodiments, provision of an authorization code to a courier may be contingent upon 1) identification of a custodian, and 2) to the courier at a proper time, or within a proper time interval. In embodiments, provision of an authorization code may be contingent upon 1) identification of a custodian, and 2) upon the presence of the courier and the custodian at a proper location. In embodiments, provision of an authorization code may be contingent upon 1) identification of a custodian, 2) to the courier at a proper time, or within a proper time interval, and 3) upon the presence of the courier and the custodian at a proper location.

In embodiments, provision of an authorization code to a courier may be contingent upon 1) identification of a courier, 2) present at a proper time, or within a proper time interval, 3) at a proper location, and 4) upon verification of the identity of the custodian. In embodiments, identification of a courier may comprise photographic identification, e.g., may comprise acquisition of a photograph, picture, or other image of the courier at the proper location, and may comprise transmission of the photograph, picture, or other image. Such identification may comprise comparison of the photograph, picture, or other image with one or more previously obtained photograph, picture, or other image, or with other data identifying or related to the courier. In embodiments, a photograph, picture, or other image of the custodian may be provided, or may be newly acquired, at the proper location, upon arrival of the courier at that location. In embodiments, such a photograph, picture, or other image of the custodian may be transmitted, and may be compared with a previously obtained photograph, picture, or other image, or with other data identifying or related to the custodian.

In embodiments, only upon the fulfillment of all of the prior conditions of proof of courier identity, presence of that courier at the transfer location, and at the designated time, will such authorization code be provided to the courier for presentation to the custodian of the material at the transfer location.

In embodiments, in addition to the fulfillment of all of the prior conditions (proof of courier identity; presence of that courier at the designated location; at the designated time), a further condition of proof of custodian identity is required prior to provision of an authorization code to the courier for presentation to the custodian of the material at the transfer location.

In embodiments, provision of an authorization code may be contingent upon presentation of identification by the person or device which requests the authorization code. In embodiments, provision of an authorization code may be contingent upon visual verification or corroboration of the identity of the person (e.g., by face, eye, iris, hand, or other image) or device (e.g., by bar code or other identifying image) which requests the authorization code. In embodiments, provision of an authorization code may be contingent upon presentation of identification information by the person or device which requests the authorization code, where such identification information may comprise visual elements, may comprise audio elements, may comprise electromagnetic signals or elements, and may comprise a combination thereof. In embodiments, provision of an authorization code may be contingent upon presentation of identification information by the person or device which requests the authorization code, where such identification information may comprise a timing signal, a Global Positioning System (GPS) signal, a video signal, or other signal, and may comprise a combination thereof. In embodiments, identification information may comprise cell phone, tablet, or other image information, and may comprise communication via cell phone, WiFi, network, or other link.

In embodiments, acceptance of material from a custodian may be contingent upon presentation of identification by the custodian to the courier. In embodiments, acceptance of material from a custodian may be contingent upon visual verification or corroboration of the identity of the custodian (e.g., by face, eye, iris, hand, or other image) or device (e.g., by bar code or other identifying image) which holds the material. In embodiments, identification information for use in confirming the identity of a custodian may comprise visual elements, may comprise audio elements, may comprise electromagnetic signals or elements, and may comprise a combination thereof. In embodiments, identification information may comprise cell phone, tablet, or other image information, and may comprise communication via cell phone, WiFi, network, or other link. In embodiments, identification information may comprise a timing signal, a Global Positioning System (GPS) signal, a video signal, or other signal, and may comprise a combination thereof.

In embodiments, provision of an authorization code may be further contingent upon the presence of the proper vehicle for transport of the material. For example, where transport of the material requires, or is best provided by, a particular type of vehicle (e.g., a vehicle comprising an air-conditioned or otherwise temperature-controlled compartment), an authorization code may be withheld from a courier lacking such a vehicle, even though the courier may fulfill all the other required conditions. In embodiments, provision of an authorization code may be further contingent upon the presence of the proper container for transport of the material. In embodiments, provision of an authorization code may be further contingent upon the availability or present capability of the destination for acceptance of the material. In embodiments, provision of an authorization code may be further contingent upon environmental conditions (e.g., the weather; road conditions; traffic conditions; possibility of disruptions in power at the source or destination location; or other environmental conditions).

In embodiments, upon verification of such identification information, and fulfillment of other criteria, if applicable, an authorization code may be provided to the person or device which requested the authorization code, or for which such authorization code was requested.

In embodiments, verification of the identity of the courier comprises presentation of an authorization code, wherein said authorization code is provided to the courier only upon arrival of the courier at a designated location at a designated time, in concert with proof of the identity of the courier. In embodiments, verification of the identity of the custodian comprises presentation of proof of the identity of the custodian. In embodiments, verification of the identity of the custodian comprises presentation of an authorization code, and presentation of proof of the identity of the custodian. In embodiments, verification of the identity of the custodian comprises presentation of an authorization code, wherein said authorization code is provided to the custodian at a designated time (e.g., at or near to the expected time of arrival of the courier), in concert with proof of the identity of the custodian. In embodiments, verification of the identity of the custodian comprises presentation of an authorization code, wherein said authorization code is provided to the custodian only upon arrival of the courier at a designated location at a designated time, in concert with proof of the identity of the custodian.

In embodiments, an authorization code may be provided to a courier, or to a custodian, or to both a courier and a custodian, by electronic means. An authorization code may be provided to a courier, or to a custodian, or to both a courier and a custodian, by any suitable communication means or mechanism. For example, an authorization code may be provided to a courier, or to a custodian, or to both a courier and a custodian, by a means comprising a wireless communication link, such as, for example, cell phone, WiFi, radio-frequency identification (RFID), Bluetooth, infrared, direct microwave or radio link, or other communication linkage, which may comprise a computer, a router, an internet node, a network, or other intermediate device, element, or system. In embodiments, an authorization code may be provided to a courier, or to a custodian, or to both a courier and a custodian, by a means comprising a physical linkage via telephone, ethernet, firewire, universal serial bus (USB) or other physical connection. In embodiments, an authorization code may be provided to a courier, or to a custodian, or to both a courier and a custodian, by a means comprising a dedicated device, a dedicated communication device, a dedicated communication system, or a combination thereof.

In embodiments, a material may be transported by courier. A material transported by courier may be, for example, a biological material, such as a biological sample. In embodiments, a courier may have a designated route for regular pick-up and delivery of materials (e.g., pick-up of material from a transfer location, and delivery of the material to a destination). In embodiments, a courier may alter a designated route in order to optimize the transport of materials (i.e., in view of the type, age (e.g., time since collection), or condition of the material being transported, the temperature in a transport container or transport vehicle, external conditions such as traffic, weather, situation at a transfer location or destination, or in view of other factors). In embodiments, the material may be transported from a transfer location to a destination location.

For example, a custodian may maintain possession of a material prior to transfer of the material to a courier, until the custodian is satisfied that the courier is an authorized courier. As disclosed herein, a custodian may become satisfied that the courier is an authorized courier only when the courier presents or possesses an authorization code. Accordingly, a custodian may require that a courier present or possess an authorization code prior to transfer of material to a courier. A custodian may also require that a courier present or possess identification in addition to presenting or possessing an authorization code.

In embodiments, an authorization code is a unique, single-use code provided to a particular courier at a particular time upon arrival of the courier at a particular location; such an authorization code is not valid at another time, or at another location, or for use by another courier. Accordingly, a courier may obtain an authorization code only upon arrival at a designated location (e.g., a transfer location where material to be transported is found) at a designated time (e.g., within a designated time period, such as a scheduled pick-up time or time-period). In embodiments, a courier may obtain an authorization code only upon arrival at a designated location at a designated time and upon confirmation of the courier's identity. In embodiments, photographs or other images may be taken of the courier, of the custodian, or both, at the designated location; such photographs or images may be taken at a designated time (e.g., within a designated time period).

Verification that a courier is present at a designated location at a designated time, or, in embodiments, that an identified courier is present at a designated location at a designated time, may be required prior to transmission of an authorization code to a courier. Such verification may be effected by providing confirmatory information to an operator or a processor. In embodiments, the operator or processor are located at a remote location (e.g., a location other than a transfer location); in embodiments, the operator or processor are located at the transfer location, and the operator, if present, is a person other than the custodian of the material.

For example, information confirming the arrival of an identified courier at a pick-up location within a designated time period may be communicated to a remote location (e.g., to an operator at a remote location, or to a remote processor that is part of a network (the "cloud")) and, upon verification of that information, a unique authorization code may be generated and provided to the courier. Alternatively, upon verification of information confirming the arrival of an identified courier at a pick-up location within a designated time period, a previously generated unique authorization code may be provided to the courier. Where an operator is located at a transfer location, the operator confirms that the courier is a proper courier, present at that transfer location within a designated time period prior to issuance of a unique authorization code.

A unique authorization code may comprise, for example, a bar code (which may be displayed on a cell-phone, a tablet, a computer screen, or by other means); a number; a series of letters; a symbol; a combination of numbers and letters; a combination of symbols, numbers, and letters; or other code. A unique authorization code is typically generated for use at one time only; for example, where a courier proceeds from a first transfer location to a subsequent transfer location, a new authorization code may be generated for pick-up at the subsequent transfer location; and, for example, where a courier returns at another time to a first transfer location for a subsequent pick-up, a new authorization code may be generated for the subsequent pick-up at the first transfer location.

A unique authorization code may be provided to a courier in an encrypted communication. A unique authorization code may be provided to a courier in an encrypted communication via any suitable communications link, including a cell-phone link, WiFi, other wireless link, a physical linkage (e.g., telephone landline, ethernet, serial connection, or other link), or a combination of these. In embodiments, unique authorization code may be provided to a courier via a network. In embodiments, unique authorization code may be provided to a courier via a dedicated communication link. In embodiments, a unique authorization code may be provided to a courier via a communication link that may include a public communication link.

Methods for providing an authorization code to a courier are provided. In embodiments, a method for providing an authorization code to a courier comprises verifying that a courier is present at a transfer location at an arrival time (where an arrival time may be any time within a predetermined arrival time period), and providing an authorization code to the courier. Verification that a courier is present at a transfer location may comprise use of a Global Positioning System (GPS) device or element; may comprise use of a cell phone, and/or a cell phone system; may comprise an action by the courier at a designated location (e.g., may require that the courier sign a register, present identification, provide a thumbprint, submit to a biometric inspection, or other action). In embodiments, verifying that a courier is present at a location at a time within a designated time period may comprise use of a Global Positioning System (GPS) device or element, where such GPS device or element comprises a clock or time-signal; may comprise use of a computer, tablet computer, cell phone, and/or a cell phone system comprising a clock or time-signal; may comprise an action by the courier at a designated location (e.g., may require that the courier sign a register, present identification, provide a thumbprint, submit to a biometric inspection, or other action) at a time within a designated time period.

An authorization code may be provided to a courier via any suitable communication link, and is preferably provided by a secure communication link (e.g., an encrypted signal carried by a communication link). For example, an authorization code may be provided by, e.g., a wireless communication link, such as, for example, a cell phone or cell phone system; WiFi; a radio-frequency or microwave frequency communication link; Bluetooth, infrared, or other communication linkage, which may comprise a computer, a router, an internet node, a network, or other intermediate device, element, or system, or a combination thereof. A wireless communication link may use a single frequency, or a single frequency range, for transmission; or may use multiple frequencies or multiple frequency ranges, for transmission. In embodiments, an authorization code may be provided to a courier by a means comprising a physical linkage via telephone, ethernet, firewire, universal serial bus (USB) or other physical connection, or a combination thereof. In embodiments, an authorization code may be provided to a courier by a means comprising a dedicated device, a dedicated communication device, a dedicated communication system, or a combination thereof. It will be understood that an authorization code may be provided to a courier via any combination of such communication links, or any communication means or combination of means known in the art.

The identity of a courier may be verified prior to, as a part of, or following, the provision of an authorization code to the courier. Identification of a courier may be verified, for example, by presentation of identification documents; by identity verification using biometric means; by identity verification by photographic or other imaging means; or by other means. In embodiments, the identity of a courier may be verified prior to providing an authorization code using a radio-frequency identification (RFID) device or system. In embodiments, the identity of a courier may be verified prior to providing an authorization code using a processor in a network, e.g., using a processor running cloud-based software. For example, verification of the identity of the courier may comprise obtaining a photograph or other image with a cell phone, transmission of the photograph or image, and verification of the identity of the courier.

Accordingly, Applicants further disclose methods for authorizing transfer of material from a custodian at a transfer location to a courier, the methods comprising providing a courier with an authorization code at the transfer location prior to the transfer of material to the courier. In embodiments, the courier provides the authorization code to the custodian, upon verification of which the custodian may transfer the material to the courier. In embodiments, the methods comprise providing a courier with an authorization code only upon the arrival of the courier at a designated transfer location at a designated time (e.g., within a designated time period). In embodiments, the methods comprise providing a courier with an authorization code only upon the arrival of the courier at a designated transfer location, at a designated time (e.g., within a designated time period), and upon presentation of the authorization code to the custodian. In embodiments, the methods comprise providing a courier with an authorization code only upon the arrival of the courier at a designated transfer location, at a designated time (e.g., within a designated time period), and upon presentation of the authorization code and courier identification to the custodian.

Accordingly, Applicants disclose methods for transporting material from a transfer location to a destination, comprising providing a courier with an authorization code at the transfer location. In embodiments, methods for transporting material from a transfer location to a destination comprise providing a courier with an authorization code at the destination. In embodiments, an authorization code may be provided to a courier only upon the arrival of the courier at a designated transfer location at a designated time (e.g., within a designated time period). In embodiments, a courier may be required to provide identification to a custodian of the material prior to transfer of the material to the courier. In embodiments, a courier may require identification from a custodian prior to acceptance of the material by the courier.

Accordingly, Applicants disclose methods for authorizing the transfer of material, comprising requiring a courier to present an authorization code prior to transfer of material to the courier, where such authorization code is only provided to the courier upon the arrival of the courier at a designated transfer location at a designated time (e.g., within a designated time period). In embodiments, transfer of the material is prevented if no authorization code is presented, or if an incorrect authorization code is presented. In embodiments, methods for authorizing the transfer of material comprise requiring a courier to present an authorization code and courier identification prior to transfer of material to the courier, where such authorization code is only provided to the courier upon the arrival of the courier at a designated transfer location at a designated time (e.g., within a designated time period), and authorizing the transfer of material upon presentation of proper authorization code and courier identification. In embodiments, transfer of material is prevented if no authorization code is presented, if an incorrect authorization code is presented, or if incorrect or insufficient courier identification is presented.

Accordingly, Applicants disclose methods for the authorized transfer of material, comprising requiring a courier to present an authorization code prior to transfer of material to the courier, where such authorization code is only provided to the courier upon the arrival of the courier at a designated transfer location at a designated time (e.g., within a designated time period), and transferring the material upon presentation of the authorization code. In embodiments, authorized transfer of materials is prevented if no authorization code is presented, or if an incorrect authorization code is presented. In embodiments, methods for the authorized transfer of material comprise requiring a courier to present an authorization code and courier identification prior to transfer of material to the courier, where such authorization code is only provided to the courier upon the arrival of the courier at a designated transfer location at a designated time (e.g., within a designated time period), and transferring the material upon presentation of the authorization code and of courier identification. In embodiments, authorized transfer of material is prevented if no authorization code is presented, if an incorrect authorization code is presented, or if incorrect or insufficient courier identification is presented. In embodiments, authorized transfer of material is prevented if incorrect or insufficient custodian identification is presented. In embodiments, authorized transfer of material is prevented if incorrect or insufficient identification regarding the material to be transferred is presented. In embodiments, authorized transfer of material is prevented if authorization of the custodian is not confirmed. In embodiments, authorized transfer of material is prevented if authorization of the material to be transferred is not confirmed.

In embodiments, a courier may be provided with a transport container for holding the material, which transport container comprises temperature sensors. In embodiments, temperature sensors may be provided on an external surface of the transport container, may be provided on an internal surface of the transport container, and may be provided on both an external and an internal surface of a transport container. In embodiments, a transport container may comprise a memory element, or multiple memory elements, configured to store a record of temperature measured by one or more sensors.

In embodiments, a transport container may comprise a communication link (e.g., a Bluetooth connection, a WiFi connection, an infrared connection, a GPS connection, an RFID connection, which, in embodiments, may further connect to a cell phone or other link) configured to receive information (e.g., location information, traffic information, weather information, or other information) and to transmit information (e.g., temperature information, information regarding the time material has been contained within the transport container, or other information) which may be used to evaluate the route taken by a courier in transporting material from a transfer location to a destination. In embodiments, a route may be changed if it is expected that material may be required to remain in the transport container too long at that temperature, e.g., due to traffic, weather, or other conditions. A transport container may comprise an alarm, bell, speaker, light, or other signal means configured to alert a courier to transport container, material, route information, or other information.

In embodiments, a transport container may be configured to alert a courier to a condition requiring alteration of a planned route. In embodiments, alteration of a planned route may comprise re-ordering of a planned route, or elimination of one or of a plurality of transfer locations of a planned route, or elimination of all remaining transfer locations. In embodiments, a transport container may be configured to alert a courier to a condition requiring rapid travel to a destination, e.g., direct travel to a destination without intermediate stops. In embodiments, a transport container may be configured to alert a courier to a condition requiring an urgent return to a location (which may be, e.g., a location that has been previously visited along a route), such as, e.g., a transfer location, a destination, or other location. In embodiments, a transport container may be configured to alert a courier to a condition requiring immediate travel to a particular location, such as, e.g., a destination location (which may be, e.g., a location that has not yet been visited along a route).

In embodiments, a transport container may comprise refrigerator means, such as, for example, a cold pack, a fan, an evaporative cooler, an active cooling system, or other apparatus configured to maintain the interior of the transport container at a temperature lower than the temperature of the environment external to the transport container.

In embodiments, a storage container for storing a material may comprise refrigerator means, such as, for example, cooling apparatus configured to maintain the interior of the storage container at a temperature lower than the temperature of the environment external to the storage container. Refrigerator means may include a cold pack, a fan, an evaporative cooler, a refrigerant, a pump, a fan, a heat exchanger, an active cooling system, or other cooling elements and apparatus. A storage container may comprise a portal for access to the inside of the storage container, and such portal may comprise a door effective to close the portal. A storage container may comprise a light sensor disposed inside the storage container and configured to sense the light level within the storage container. In embodiments, such a light sensor may be configured to sense whether or not the portal is open, or to sense whether or not the portal is closed, or both. A storage container may comprise a temperature sensor, and, in embodiments, may comprise a plurality of temperature sensors. Temperature sensors may be disposed on the inside, on the outside, or both on the inside and on the outside of the storage container. A storage container may comprise memory means, such as, for example, solid-state memory, or a hard-drive, a writeable disc, or other memory. The memory means of a storage container may be configured to record times, including time periods, when the portal is open, and may be configured to record times, including time periods, when the portal is closed. The memory means of a storage container may be configured to record temperatures, including temperatures during time periods, e.g., temperatures when the portal is open, and may be configured to record temperatures during times, including time periods, when the portal is closed.

A storage container may be configured to communicate with an operator, e.g., by a display, or a light, or a speaker, or a combination thereof. A storage container may be configured to communicate with a processor, e.g., a processor situated at a remote location. In embodiments, a storage container may communication with a processor via a communication link (e.g., via a cell phone, a Bluetooth connection, a WiFi connection, a USB connection, an Ethernet connection, or other link). In embodiments, a processor with which a storage container communicates may be a processor in a network, or may be a cloud-based processor.

As disclosed herein, transfer of materials from a custodian to a courier for transport may be authorized only upon issuance of an authorization code to a courier, where the authorization code is provided to the courier upon arrival of the courier at the location of the transfer, and at the proper time (e.g., within a designated period of time). Authorization must be performed prior to providing the material to a courier for transport. In embodiments, transfer of a material from a custodian to a courier for transport may be authorized only upon presentation of an authorization code. In embodiments, transfer of a material from a custodian to a courier for transport may be authorized only upon 1) presentation of an authorization code and 2) verification of the identity of the courier. In embodiments, verification of the identity of the courier comprises presentation of a photograph or other image, identifying documentation, identifying insignia or markings, biometric identification, or other proof of the identity of the courier. For example, verification of the identity of the courier may comprise obtaining a photograph or other image with a cell phone, transmission of the photograph or image, and verification of the identity of the courier.

In embodiments, transfer of a material from a custodian to a courier for transport may be authorized only upon verification of the identity of the custodian. In embodiments, verification of the identity of the custodian comprises presentation of a photograph, other identifying information, or both, prior to issuance of an authorization code, wherein said authorization code is required prior to any authorized transfer of the material from the custodian to the courier.

In embodiments, verifying the identity of the courier may comprise presentation of identification documents; verification using biometric means; verification by photographic or other imaging means; verification of courier identity using a radio-frequency identification (RFID) device or system; or by other means. In embodiments, verification of courier identity may comprise using a processor in a network, e.g., using a processor running cloud-based software.

In embodiments, the identification presented by the courier to the custodian may comprise photoidentification (e.g., taking a photograph or other image, which may be compared with a stored image), biometric identification (e.g., inspection of a physical or biological characteristic of the courier (e.g., inspection of a fingerprint, an iris, an ear, a cheek swab, hair sample, or other body part, sample, or characteristic), presentation of an identifying card or certificate (e.g., a driver's license, passport, or other identification including a photograph, issued by a governmental agency), or other form of identification.

In embodiments, a custodian may present identification information to a courier; such identification may comprise the same elements as the identification presented by the courier to the custodian. In embodiments, a courier, a custodian, or a courier and a custodian may present identification information to a network; such identification, for example, may comprise the same elements as the identification presented by the courier to the custodian. For example, verification of the identity of a custodian may comprise obtaining a photograph or other image with a cell phone, transmission of the photograph or image, and verification of the identity of the custodian. In embodiments, identification of the material to be transferred may be required. In embodiments, confirmation of the authorization of the material to be transferred, or of authorization of its transfer or transport, may be required.

A courier may transport more than one material. In embodiments, a courier may travel to a transfer location for the collection of a plurality of materials, for transport of these materials to a destination. In embodiments, a courier may travel to a transfer location for the collection of a plurality of materials, for transport of these materials to a plurality of destinations. In embodiments, a courier may travel to a plurality of transfer locations for the collection of a plurality of materials, for transport of these materials to a destination. In embodiments, a courier may travel to a plurality of transfer locations for the collection of a plurality of materials, for transport of these materials to a plurality of destinations. A courier may travel to and between transfer locations, and to and between a transfer location and a destination or destinations, by a route.

A route may comprise a path to be traveled, or a path that is being traveled, or a path that has been traveled by a courier. A courier may transport a material from a transfer location to a destination along a route. A courier may transport a plurality of materials from a plurality of transfer locations to a destination along a route. A courier may transport a plurality of materials from a plurality of transfer locations to a plurality of destinations along a route.

Thus, in embodiments, providing a route may comprise preparing a route by determining a sequence of locations to be visited by a courier; a location to be visited by a courier may be a transfer location (e.g., a location where a material may be picked up), or may be a destination (e.g., a location to which a material may be delivered), or may be another location (e.g., a location for obtaining fuel for a vehicle, or other location). In embodiments, providing a route may comprise taking factors into account, where such factors may be relevant to the identification of locations to be visited along the route; to the identification of a destination or destinations to be visited along a route; to the sequence or order in which such locations and destinations are to be visited; to the identification of other locations, if any, to be visited along a route; to the determination of a speed, or speeds, to be maintained, or expected to be obtained, along a route; to the particular streets to be taken, where a street or alternate streets are available and suitable along a route; to a particular time or times, or periods of time, for arrival at a location or locations along a route; or other particulars of a route. In embodiments, providing a route comprises communicating a route to a courier. In embodiments, providing a route may comprise communicating a route to a custodian. In embodiments, providing a route comprises communicating a route to an operator. In embodiments, a route may be provided to a courier, or to a custodian, by an operator. In embodiments, a route may be provided to a courier, or to a custodian, or to an operator, or a combination thereof, by a communication link with a processor, where the processor may be a processor in a computer, on a network, associated with a service (e.g., a cloud service) or other processor. In embodiments, a route may be provided to a courier, or to a custodian, or to an operator, or a combination thereof, by a display (e.g., a display on a monitor associated with a computer, a cell-phone display, a tablet display, or other display).

In embodiments, providing a courier with a route may comprise communication by a communication link; providing a courier with a route may comprise providing a route prior to a courier beginning to travel along the route; may comprise providing a portion of a route to a courier prior to a courier beginning to travel along the route; may comprise providing a portion of a route after a courier has begun to travel along a route. A route may be altered; in embodiments, a route may be altered prior to, or during, a courier's travel along the route. A route provided to a courier may comprise an altered route (e.g., an alteration to a previously determined route), may comprise a portion of an altered route, and may comprise more than one portion of an altered route.

In embodiments a route may be provided to a custodian. In embodiments a route may be provided to a custodian prior to a courier beginning to travel along the route; may be provided to a custodian prior to a courier arriving at a transfer location; may be provided to a custodian prior to a courier arriving at the transfer location at which the custodian is located; or at other times. A route provided to a custodian may comprise an entire route, may comprise a portion of a route, and may comprise more than one portion of a route. A route provided to a custodian may comprise an altered route (e.g., an alteration to a previously determined route), may comprise a portion of an altered route, and may comprise more than one portion of an altered route.

In embodiments, providing a courier with an authorization code may comprise providing the courier with an authorization code from a remote location, where a remote location is a different location than a transfer location.

In embodiments, such methods for transporting a materials or materials from a transfer location or from a plurality of transfer locations to a destination or to a plurality of destinations, further comprise a courier providing an identification card, mark, insignia, or other identification to a custodian. In embodiments, such methods for transporting a materials or materials from a transfer location or from a plurality of transfer locations to a destination or to a plurality of destinations, further comprise a custodian providing an identification card, mark, insignia, or other identification to a courier.

In embodiments of the methods disclosed herein, identification of a courier or of a custodian may comprise, for example, presentation of identification documents; verification using biometric means; verification by photographic or other imaging means; or by other means. In embodiments, the identity of a courier or of a custodian may be verified prior to providing an authorization code using a processor in a network, e.g., using a processor running cloud-based software. In embodiments, the identity of a courier or of a custodian may be verified prior to providing an authorization code using a radio-frequency identification (RFID) device or system.

In embodiments, a material, or a plurality of materials transported according to any one or more of the methods disclosed herein may comprise a biological material. In embodiments, a material, or a plurality of materials transported according to any one or more of the methods disclosed herein may comprise a biological sample. In embodiments, a material, or a plurality of materials transported according to any one or more of the methods disclosed herein may comprise a plurality of biological materials. In embodiments, a material, or a plurality of materials transported according to any one or more of the methods disclosed herein may comprise a plurality of biological samples.

A route may be altered from a previously planned route at any time during travel along the route. For example, a route may be altered from a previously planned route prior to the arrival of a courier at a first transfer location. In embodiments, a route may be altered from a previously planned route following to the arrival of a courier at a first transfer location. In embodiments, a route may be altered from a previously planned route prior to the arrival of a courier at a subsequent transfer location after arrival at a first transfer location. In embodiments, a route may be altered from a previously planned route following to the arrival of a courier at a subsequent transfer location after arrival at a first transfer location.

Alteration of a route may comprise following a different path than previously planned, to arrive at all planned transfer locations and at a planned destination or destinations. In embodiments, alteration of a route may comprise following a different path than previously planned, to arrive at less than all of the previously planned transfer locations and at a planned destination. In embodiments, alteration of a route may comprise following a different path than previously planned, to arrive at all planned transfer locations and at an additional transfer location, and at a planned destination. In embodiments, alteration of a route may comprise following a different path than previously planned, to arrive at all planned transfer locations and at a different destination than the previously planned destination. In embodiments, alteration of a route may comprise following a different path than previously planned, to arrive at all planned transfer locations and at an additional destination as well as at the previously planned destination. In embodiments, alteration of a route may comprise following a different path than previously planned, to arrive at less than all planned transfer locations and at a different destination than the previously planned destination. In embodiments, alteration of a route may comprise following a different path than previously planned, to arrive at less than all planned transfer locations and at an additional destination as well as at the previously planned destination. In embodiments, alteration of a route may comprise following a different path than previously planned, to arrive at all planned transfer locations, at an additional transfer location, and at a different destination than the previously planned destination. In embodiments, alteration of a route may comprise following a different path than previously planned, to arrive at all planned transfer locations, at an additional transfer location, and at an additional destination as well as at the previously planned destination.

Alteration of a route may be due to factors arising after a route was planned. In embodiments, alteration of a route may be due to a change in plans. In embodiments, alteration of a route may be due to factors comprising traffic conditions; road conditions; transport vehicle conditions (e.g., mechanical or fuel factors); environmental conditions (e.g., weather); type of material to be transported; source of material to be transported; time-sensitivity of the transport; perishability of the material to be transported; fragility of the material to be transported; availability of air conditioning/heating in transport vehicle; availability of materials at a transfer location; availability of personnel, services, equipment, power, access, or other factors at a transfer location; availability of equipment, services, personnel, power, access, or other factors at a destination; and other factors.

Alteration of a route may be pursuant to instructions. In embodiments, route instructions may be provided to a courier by an operator. In embodiments, instructions may be provided to a courier by a device. In embodiments, route instructions may be provided to a courier by a system, e.g., by a system comprising one or more of an operator, a device, and a processor. In embodiments, route instructions may be provided to a courier by software, such as cloud-based software. In embodiments, route instructions provided to a courier by an operator, a device, a service, or by other means may be delivered by a communication link.

In embodiments, a communication link for providing route instructions may comprise, for example, a wireless communication link, such as, for example, cell phone, WiFi, radio-frequency identification (RFID), Bluetooth, infrared, direct microwave or radio link, or other communication linkage, which may comprise a computer, a router, an internet node, a network, or other intermediate device, element, or system. In embodiments, a communication link for providing route instructions may comprise a physical linkage via telephone, ethernet, firewire, universal serial bus (USB) or other physical connection. In embodiments, a communication link for providing route instructions may comprise a dedicated device, a dedicated communication device, a dedicated communication system, or a combination thereof. In embodiments, route instructions may be provided to a courier by a network.

Thus, in embodiments, a transport container may comprise an enclosure, a lid, a temperature sensor, and a communication link. In embodiments, an enclosure may comprise thermal insulation, e.g., a material that provides thermal insulation, a design that provides thermal insulation (e.g., provides an air-gap, a vacuum, or other insulating design feature), or a combination thereof. In embodiments, a lid may be any cover, door, hatch, or element suitable to close off an opening in an enclosure. In embodiments, a lid is configured to close an opening which provides access to the interior of the container, and may be configured to make a tight seal with an enclosure when closed; a tight seal may comprise a water-tight seal, or may comprise an air-tight seal. In embodiments, a tight seal may comprise a light-tight seal. A temperature sensor may be any suitable type of temperature sensor, including a thermistor, a thermocouple, a solid-state temperature sensor, a mercury-containing temperature sensor, or other temperature sensor or combination of temperature sensors. A communication link may comprise a link comprising a wireless link, a telephone link, a Bluetooth link, an Ethernet link, a serial link (e.g., a universal serial bus (USB) connection), an infrared link, or other link or combinations thereof. A communication link may comprise a display, including, for example, a cell-phone display, a tablet display, a computer monitor display, or other display.

A courier, or an operator monitoring a communication link, or others, may monitor the sensed temperature, and respond if the temperature falls outside a desired range. An alert may be communicated if the temperature falls outside a desired range. A response may be initiated if the temperature falls outside a desired range, if an alert is communicated, or both. For example, where the transport container contains a temperature-sensitive material, monitoring the temperature of the transport container may be important to the maintenance of the integrity of the material within the transport container. In embodiments where the material within a transport container comprises biological material, such as a blood sample, a tissue sample, an organ for transplantation, or other material which may be temperature-sensitive, monitoring of the temperature within the transport container may be critical to maintaining the integrity of the material, and to maintaining its utility and/or viability.

In embodiments, altering a route comprises shortening the route to the destination. In embodiments, a route comprises travel to multiple transfer locations prior to travel to a destination, and shortening a route comprises eliminating one or more transfer locations; in embodiments, shortening a route comprises eliminating all transfer locations. In embodiments where a route comprises travel to multiple transfer locations prior to travel to a destination, and an alert is displayed after travel to at least one transfer location has been accomplished, and travel to one or more transfer location remains to be accomplished, shortening a route may comprise eliminating all remaining transfer locations.

In embodiments, communicating comprises providing a signal to a remote location, e.g., providing a signal to an operator situated at a remote location, or to a processor situated at a remote location. In embodiments, communicating comprises providing a signal to a processor linked to a network, such as, e.g., a cloud network. In embodiments, communicating said sensed temperature comprises communicating a temperature that exceeds an alarm limit.

In embodiments, communicating comprises receiving a signal; in embodiments, a courier receives a signal. In embodiments, a signal may be received (e.g., by a courier) from an operator situated at a remote location; or a processor situated at a remote location; or from a processor linked to a network, such as, e.g., a cloud network; or from another source. In embodiments, receiving a signal comprises receiving instructions to alter a route. In embodiments, a signal to alter a route may follow after a communication is sent that indicates that a sensed temperature exceeds an alarm limit. For example, a courier, or a vehicle controlled by a courier, or a device (such as a container) traveling with a courier, may send a signal indicating that a sensed temperature exceeds an alarm limit; a signal or instructions to the courier to alter a route may follow the receipt of such a signal at a remote location.

In embodiments, a signal to alter a route may be provided due to traffic conditions. In embodiments, a signal to alter a route may be provided due to weather conditions. In embodiments, a signal to alter a route may be provided due to conditions at a destination. In embodiments, a signal to alter a route may be provided due to the condition of a material being transported. In embodiments, a signal to alter a route may be provided due to the condition of a material to be transferred at a transfer location (e.g., a material to be transported, but not yet picked up by a courier). In embodiments, a signal to alter a route may be provided due to a change in plans. In embodiments, a signal to alter a route may be provided due to the condition of a vehicle controlled by a courier.

In embodiments, a signal to alter a route may be due to a sensor in the vicinity of a material being transported by a courier. In embodiments, a signal to alter a route may be due to a sensor in or on a container which holds a material being transported by a courier. In embodiments, a signal to alter a route may be due to a temperature sensor in or on a container which holds a material being transported by a courier. In embodiments, a signal to alter a route that is due to a sensor in or on a container which holds a material being transported by a courier may comprise a light signal, an auditory signal, a written signal, a symbol, a change in a display, or other signal.

In embodiments, altering a route comprises shortening the route to the destination. In embodiments, a route comprises travel to multiple transfer locations prior to travel to a destination, and shortening a route comprises eliminating one or more transfer locations; in embodiments, shortening a route comprises eliminating all transfer locations. In embodiments where a route comprises travel to multiple transfer locations prior to travel to a destination, and an alert is displayed after travel to at least one transfer location has been accomplished, and travel to one or more transfer location remains to be accomplished, shortening a route may comprise eliminating all remaining transfer locations.

In embodiments, a unique, time-sensitive credential (termed an "authorization code") is generated and provided to the courier only upon confirmation of the identity of the courier upon the arrival of the courier at the proper transfer location at the proper time. FIG. 1 provides a schematic representation of an embodiment of a method for providing an authorization code to a courier only upon the arrival of the courier at the correct transfer location and at the correct time (e.g., within a predetermined time period). Material is not transferred to a courier in the absence of an authorization code. Thus, a requirement for an authorization code serves to ensure that material is only transferred to an authorized courier, and that the transfer itself is authorized; in this way, material is protected from incorrect or unauthorized transport, and so is protected from loss, damage, or misuse.

The authorization code is provided for use by that courier at that location at that time, and is not valid for any other courier, or at any other location, or at any other time. Thus, an authorization code is a single-use, specific credential for use by a particular courier, at a particular location, at a particular time (typically a period of time, such as an arrival time). In embodiments, the authorization code is provided for presentation to a particular person (e.g., to a particular custodian) at that transfer location at that time, and is not valid for use with any other person, or at any other location, or at any other time. In embodiments, the authorization code is created for use upon, or after arrival of a courier at that transfer location at that time. In embodiments, the authorization code is created for use prior to the after arrival of a courier at that transfer location at that time, but is only provided to the courier upon, or after arrival of a courier at that transfer location at that time.

The presence of a courier at a designated location at a designated time, or within a designated time period, may be confirmed, for example, by use of the Global Positioning System (GPS), cell phone, a clock, timing signal, or other means. Such location and time information may be provided to a remote location by any suitable means, including without limitation a telephone link, an internet link, a private network, a public network, a radio link, a microwave link, and other communication means.

Upon confirmation that a courier is located at the proper location at a proper time (and, in embodiments, is confirmed to be the proper courier), an authorization code may be provided to the courier.

In embodiments, an authorization code may be generated at a time prior to the arrival of the courier at the location, and only provided to the courier upon confirmation that the courier is located at the proper location at a proper time, or, in embodiments, that the courier is a proper courier, and is located at the proper location at a proper time. In embodiments, an authorization code is only generated following such confirmation, and is only generated and provided to the courier upon arrival of the courier at the proper location at a proper time, or, in embodiments, that the courier is a proper courier, and is located at the proper location at a proper time.

An authorization code may be generated at a remote location, i.e., at a location other than a transfer location. An authorization code may be generated or provided by a processor that is part of a network, or part of a service operated on a network, such as a cloud service. Such an authorization code may be provided to the courier by any suitable means, including without limitation a telephone link, an internet link, a private network, a public network, a radio link, a microwave link, and other communication means. In embodiments, an authorization code comprises a unique, one-time-only identification code, generated for use only by that courier, at that location, and at that time. In embodiments, an authorization code comprises a unique, one-time-only identification code, generated for use only by that courier, at that location, at that time, and for that specific material.

Figure 2:
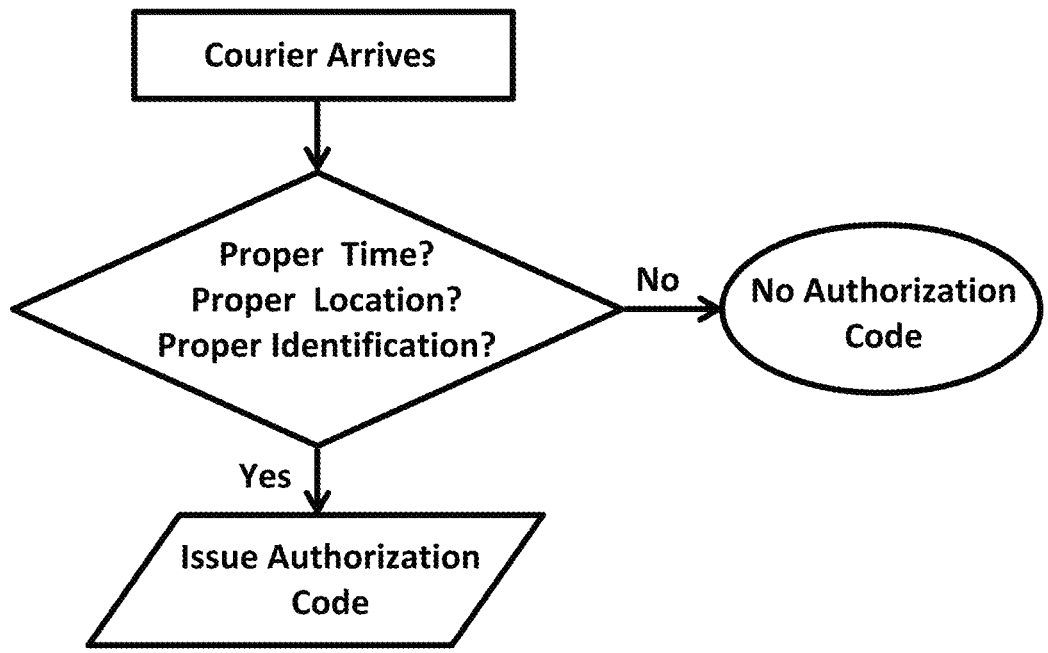
FIG. 2 provides a schematic representation of an embodiment of a method for providing an authorization code to a courier having proper courier identification only upon the arrival of the courier at the correct transfer location and at the correct time (within a predetermined time period).

FIG. 2 provides a schematic representation of an embodiment of a method for providing an authorization code to a courier having proper courier identification only upon the arrival of the courier at the correct transfer location and at the correct time (within a predetermined time period). In embodiments, a courier receives an authorization code only when the courier has arrived at a transfer location at a proper time, and has received identifying information from the custodian.

In embodiments, a custodian may transfer material to a courier only when the courier provides an authorization code. In embodiments, a custodian may transfer material to a courier only when the courier provides an authorization code and identifying information. For example, a custodian may take a photograph or obtain an image of the courier, or obtain biometric information or other identifying information from the courier, for comparison with a record, or for transmission over a network, or other verification, prior to transfer of material to a courier.

Figure 3A:
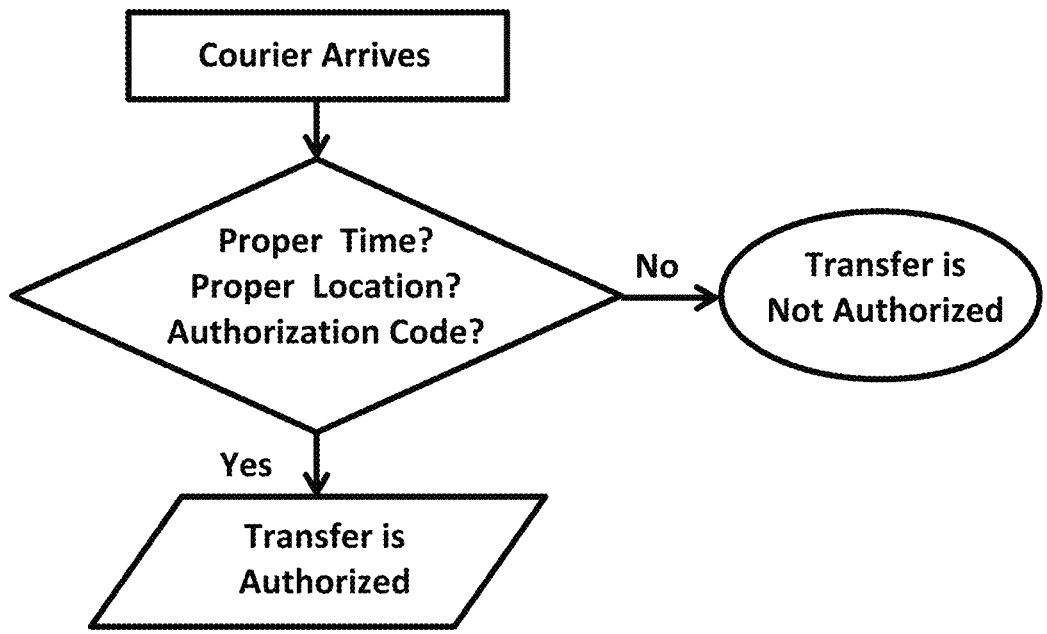
FIG. 3A provides a schematic representation of an embodiment of a method for authorizing transfer of a material from a custodian to a courier, comprising authorizing transfer of material to a courier having an authorization code, where the courier is provided with the authorization code only when present at the correct transfer location at the correct time (e.g., within a predetermined time period).

FIG. 3A provides a schematic representation of an embodiment of a method for authorizing transfer of a material from a custodian to a courier, comprising authorizing transfer of material to a courier having a valid authorization code, where the courier is provided with the authorization code only when present at the correct transfer location at the correct time (e.g., within a predetermined time period).

Figure 3B:
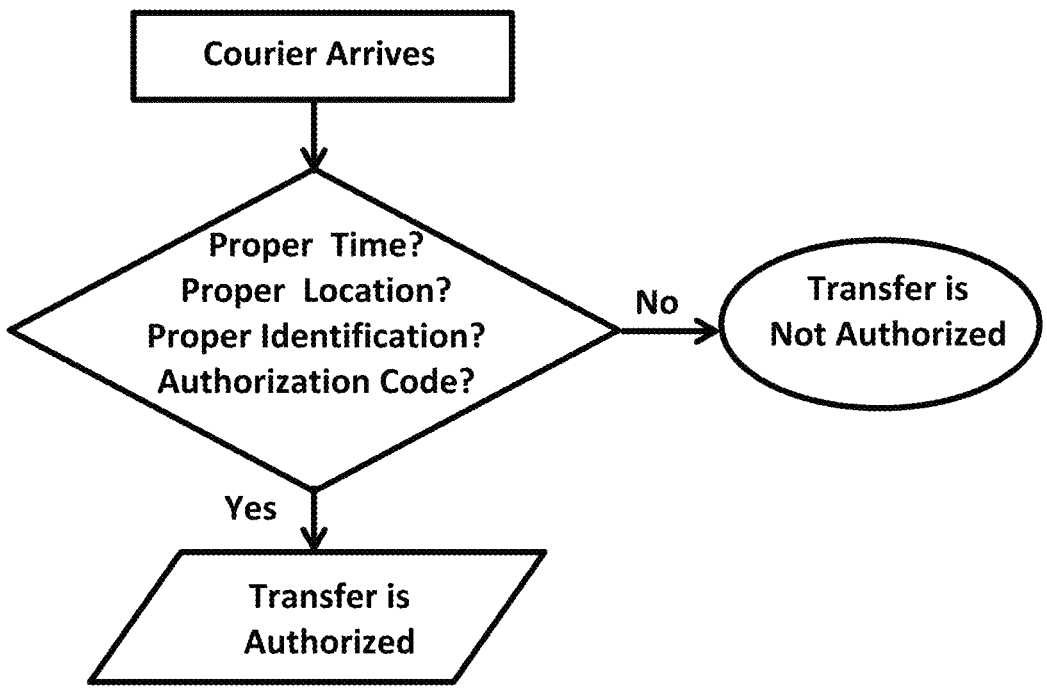
FIG. 3B provides a schematic representation of an embodiment of a method for authorizing transfer of a material from a custodian to a courier having proper identification, comprising authorizing transfer of material to the courier if the courier also has an authorization code, where the courier is provided with the authorization code only when present at the correct transfer location at the correct time (e.g., within a predetermined time period).

FIG. 3B provides a schematic representation of an embodiment of a method for authorizing transfer of a material from a custodian to a courier having proper identification, comprising authorizing transfer of material to the courier if the courier also has a valid authorization code, where the courier is provided with the authorization code only when present at the correct transfer location at the correct time (e.g., within a predetermined time period).

In embodiments, an authorization code must be verified.

Verification of an authorization code may comprise use of a code characteristic that allows the verification of an authorization code possessed or presented by a courier; may comprise comparison with an authorization code possessed or obtained by a custodian; may comprise observation of the delivery of the authorization code to a courier; and may include other verification means. Verification of an authorization code may include verification that the courier presenting the code is the proper courier for its use. In embodiments, such verification may comprise photographic or biometric identification of the courier.

In embodiments, an arrival time, or other time, may be determined using a clock, other timing device, or by use of a timing signal. A timing signal may include a publicly available timing signal, e.g., a time provided by a cellphone, by a computer connection, or other clock or timing device, and may include a timing signal provided by an operator or network service.

In embodiments, the location of a courier may be determined by a custodian at a location. In embodiments, the location of a courier, may be determined by automatic or remote means. Automatic and/or remote means for determining a location, such as the location of a courier, may include use of a cell-phone signal; a WiFi signal; an internet mapping service or cell-phone application; use of the Global Positioning System (GPS) and associated hardware and software; other remote or automatic means; or a combination of these.

In embodiments, verification of an authorization code may be performed remotely via communication link with software running on a processor; in embodiments, this processor is at a location remote from the transfer location. In embodiments, the communication link comprises a cell phone. Upon verification and confirmation of all the authorization code (and identity of the courier, if required), authorization to transfer the material from the transfer location to the courier is provided. Such authorization may be provided pursuant to verification and confirmation of all the required credentials by software running on a processor; this processor may be at a location remote from the transfer location. Such authorization may be provided via the communication link.

Methods for transferring material from a custodian to a courier are disclosed herein. In embodiments, methods for transferring material from a custodian to a courier may comprise requiring a courier to have an authorization code in order for a custodian to transfer material, and may comprise requiring a courier to have an authorization code, and verification of the authorization code, in order for a custodian to transfer material. Further embodiments of methods for transferring material from a custodian to a courier may comprise requiring that the courier verify the identity or authorization of the custodian; or that the courier verify the identity or authorization of the material; or both.

Figure 4A:
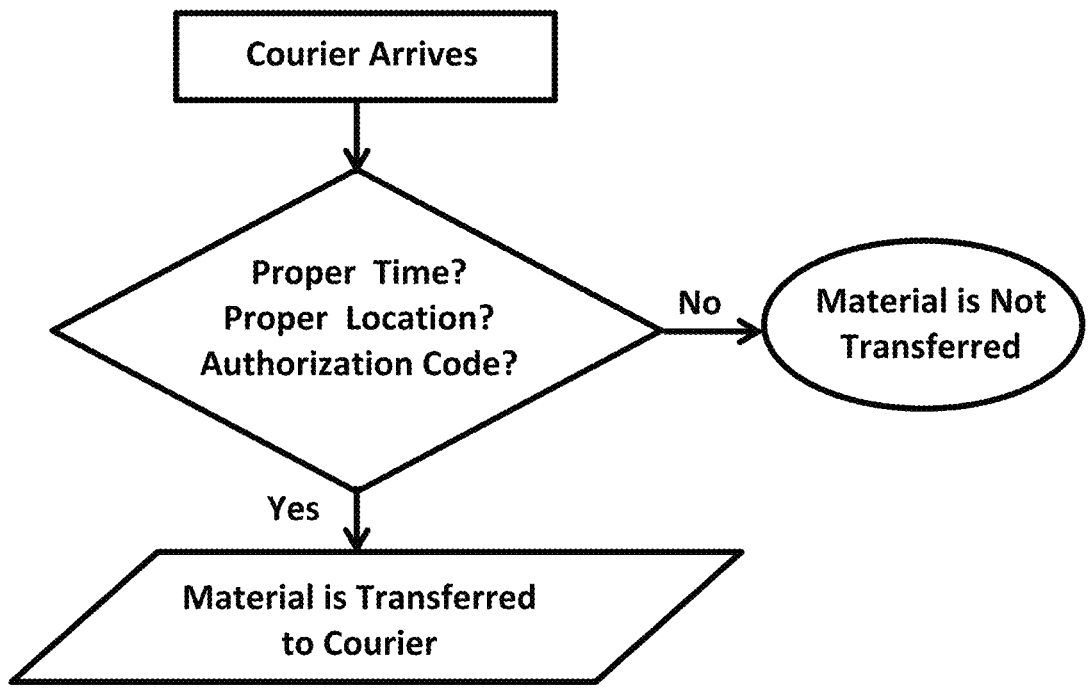
FIG. 4A provides a schematic representation of an embodiment of a method for transferring material from a custodian to a courier, comprising transferring material to a courier having a valid authorization code, where the courier is provided with the authorization code only when present at the correct transfer location at the correct time (e.g., within a predetermined time period).

FIG. 4A provides a schematic representation of an embodiment of a method for transferring material from a custodian to a courier, comprising transferring material to a courier having a valid authorization code, where the courier is provided with the authorization code only when present at the correct transfer location at the correct time (e.g., within a predetermined time period). As illustrated in FIG. 4C, identification or verification regarding a custodian, or of material, or both, may also be required for the transfer of material. FIG. 4C provides a schematic representation of an embodiment of a method for transferring material from a custodian to a courier, comprising transferring material to a courier having a valid authorization code, where 1) the courier is provided with the authorization code only when present at the correct transfer location at the correct time (e.g., within a predetermined time period), and 2) where the courier accepts the material only upon verification of the identity of the custodian (or material) or authorization of the custodian (e.g., to make the transfer) or material (e.g., to be transferred, or to be suitable for transfer).

Figure 4B:
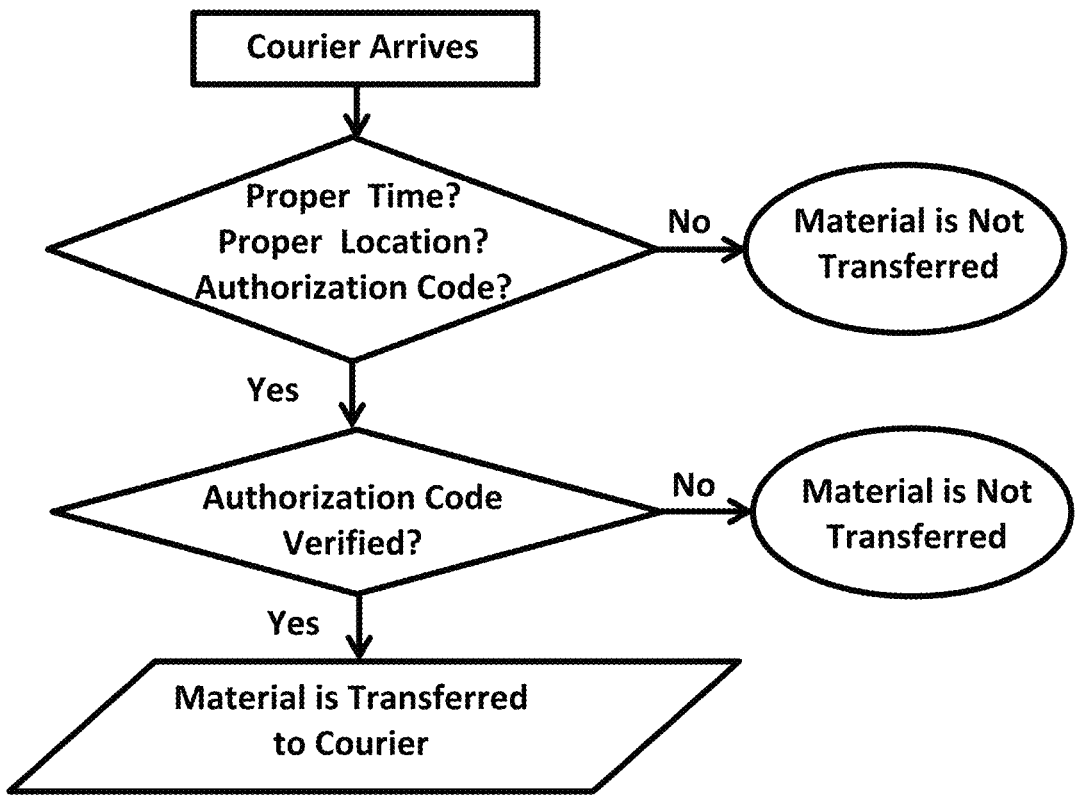
FIG. 4B provides a schematic representation of an embodiment of a method for transferring material from a custodian to a courier, comprising transferring material to a courier having an authorization code, where the courier is provided with the authorization code only when present at the correct transfer location at the correct time (e.g., within a predetermined time period), and the material is transferred only upon verification of the authorization code.
Figure 4C:
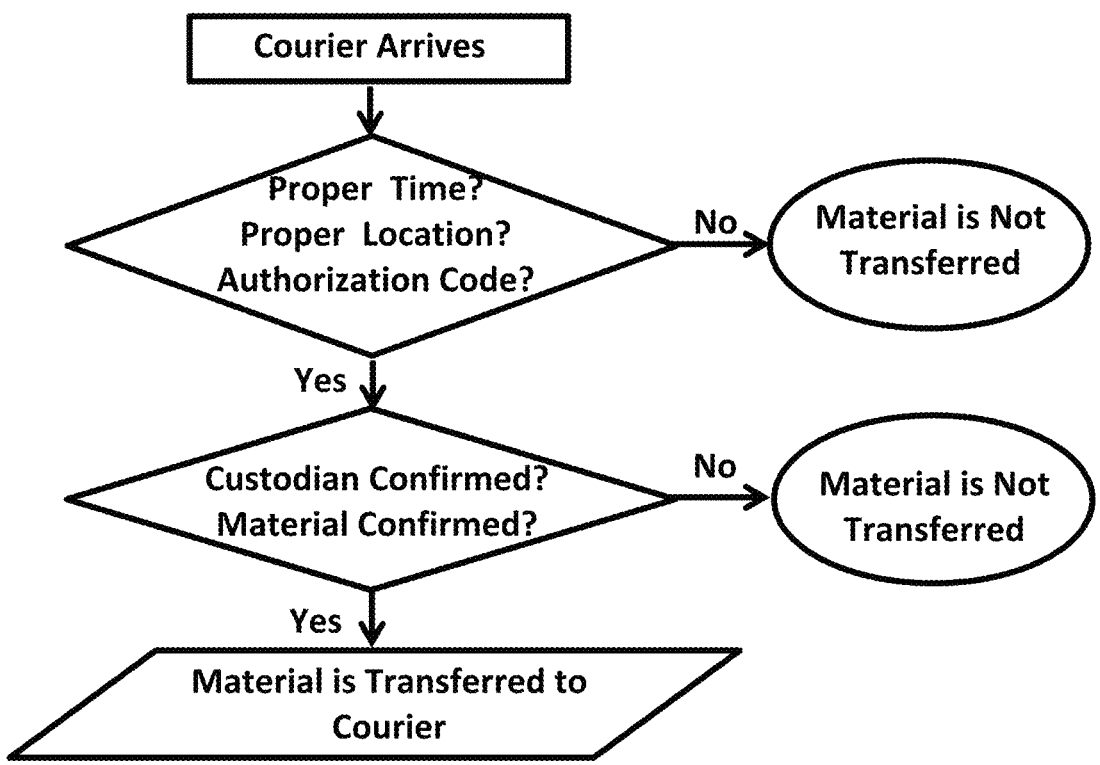
FIG. 4C provides a schematic representation of an embodiment of a method for transferring material from a custodian to a courier, where the courier is provided with the authorization code only when present at the correct transfer location at the correct time (e.g., within a predetermined time period), comprising transferring material to a courier having an authorization code, and upon confirmation of the identity or authorization of the custodian, the identity or authorization of the material, or both.
Figure 4D:
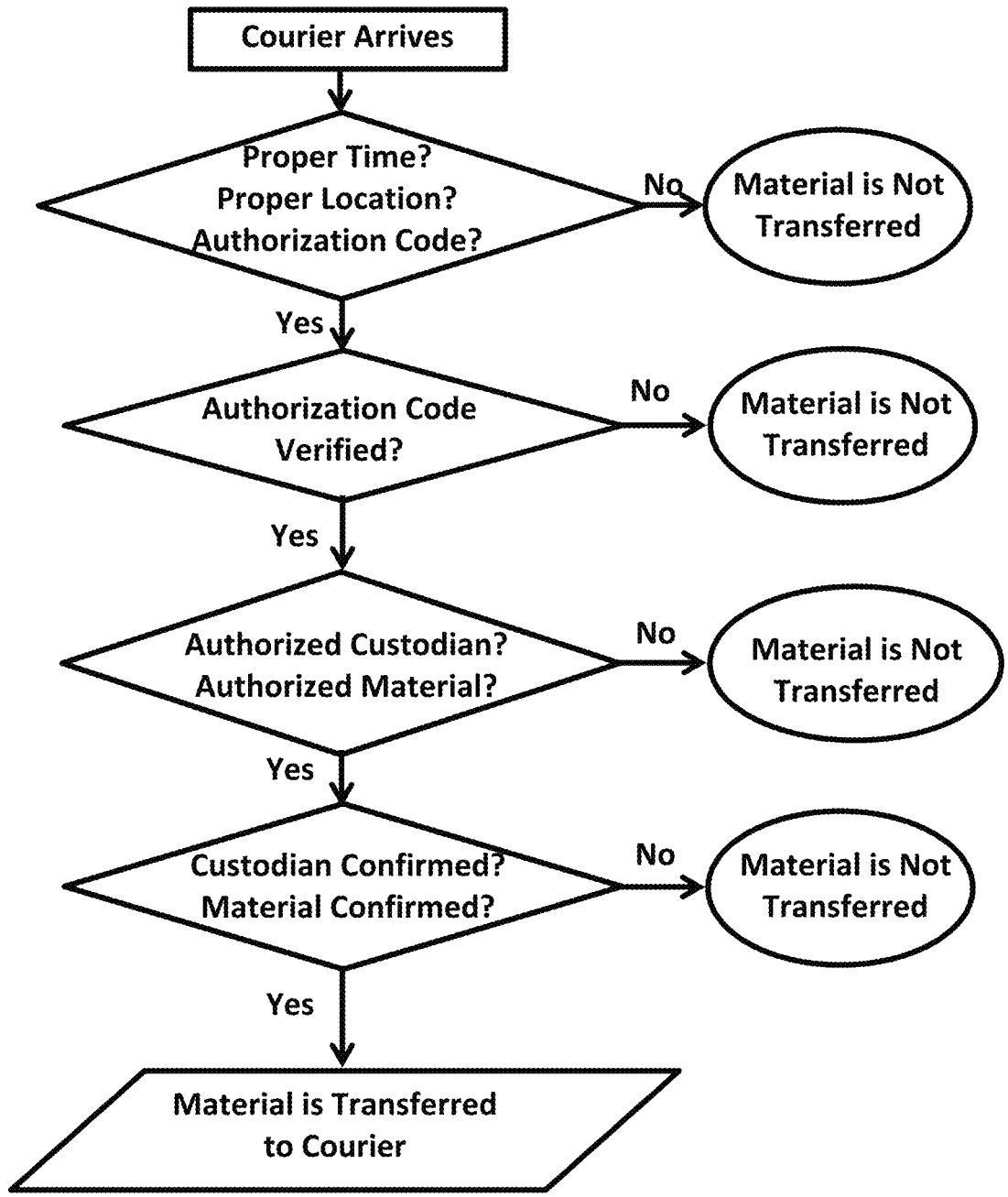
FIG. 4D provides a schematic representation of an embodiment of a method for transferring material from a custodian to a courier, comprising transferring material to a courier having an authorization code, where the courier is provided with the authorization code only when present at the correct transfer location at the correct time (e.g., within a predetermined time period), and the material is transferred only i) upon verification of the authorization code, and ii) upon confirmation of the identity or authorization of the custodian, the material, or both.

FIG. 4B provides a schematic representation of an embodiment of a method for transferring material from a custodian to a courier, comprising transferring material to a courier having a valid authorization code, where the courier is provided with the authorization code only when present at the correct transfer location at the correct time (e.g., within a predetermined time period), and the material is transferred only upon verification of the authorization code. As illustrated in FIG. 4D, identification or verification regarding a custodian, or of material, or both, may also be required for the transfer of material. FIG. 4D provides a schematic representation of an embodiment of a method for transferring material from a custodian to a courier, comprising transferring material to a courier 1) having a valid authorization code, 2) upon verification of the authorization code (where the courier is provided with the authorization code only when present at the correct transfer location at the correct time (e.g., within a predetermined time period)), and 3) where the courier accepts the material only upon verification of the identity of the custodian (or material) or authorization of the custodian (e.g., to make the transfer) or material (e.g., to be transferred, or to be suitable for transfer).

Upon arrival of a courier at a transfer location for pick-up of the material to be transported, the identity of the courier may be confirmed, e.g., by presentation of identification credentials (which may include identification cards including photographs of the holder, such as driver's license or other such identification card), or by transmission of an identifying code or password. In embodiments, verification of the identity of the courier may comprise, for example, presentation of identification documents; identity verification using biometric means; identity verification by photographic or other imaging means; or other means. For example, verification of the identity of the courier may comprise obtaining a photograph or other image with a cell phone, transmission of the photograph or image to a third party or to an automatic system, and verification of the identity of the courier. Such photographs may be retained as a record of the transaction. In embodiments, the identity of the custodian may be confirmed or verified. In embodiments, the identity or suitability of the material may be confirmed or verified.

Further methods for transferring material from a custodian to a courier are disclosed herein. In embodiments, methods for transferring material from a custodian to a courier may comprise requiring a courier to have an authorization code and to have proper identification in order for a custodian to transfer material, and may comprise requiring a courier to have an authorization code, proper identification, and require verification of the authorization code, in order for a custodian to transfer material. Further embodiments of methods for transferring material from a custodian to a courier may comprise requiring that the courier verify the identity or authorization of the custodian; or that the courier verify the identity or authorization of the material; or both.

Figure 5A:
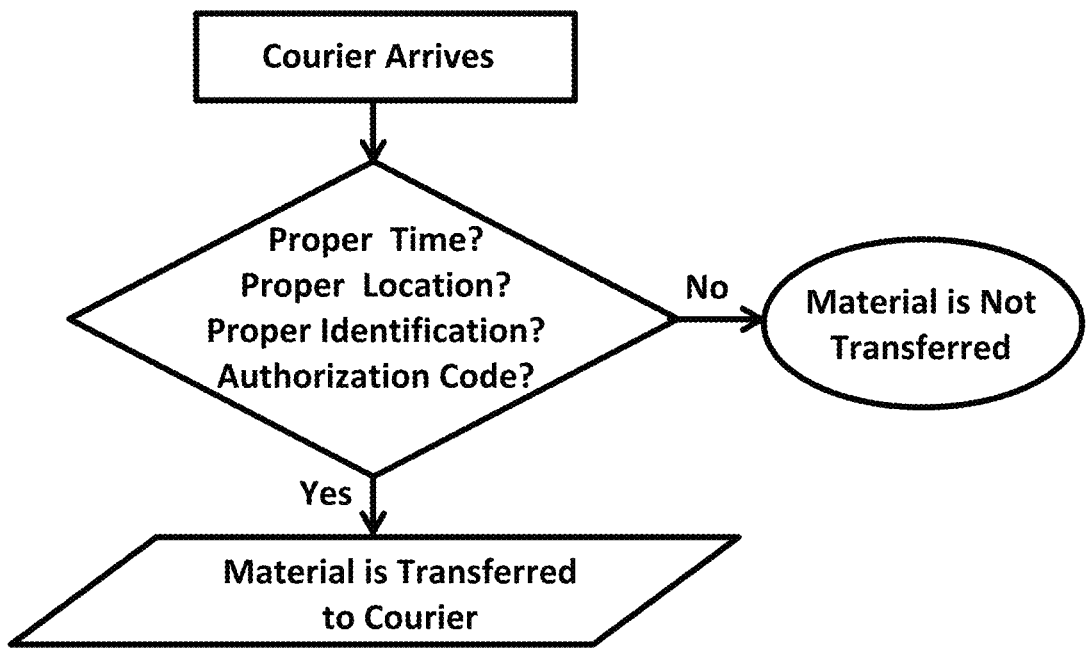
FIG. 5A provides a schematic representation of an embodiment of a method for transferring material from a custodian to a courier having proper identification, comprising transferring material to the courier if the courier also has an authorization code, where the courier is provided with the authorization code only when present at the correct transfer location at the correct time (e.g., within a predetermined time period).

FIG. 5A provides a schematic representation of an embodiment of a method for transferring material from a custodian to a courier having proper identification, comprising transferring material to the courier if the courier also has a valid authorization code, where the courier is provided with the authorization code only when present at the correct transfer location at the correct time (e.g., within a predetermined time period).

Figure 5B:
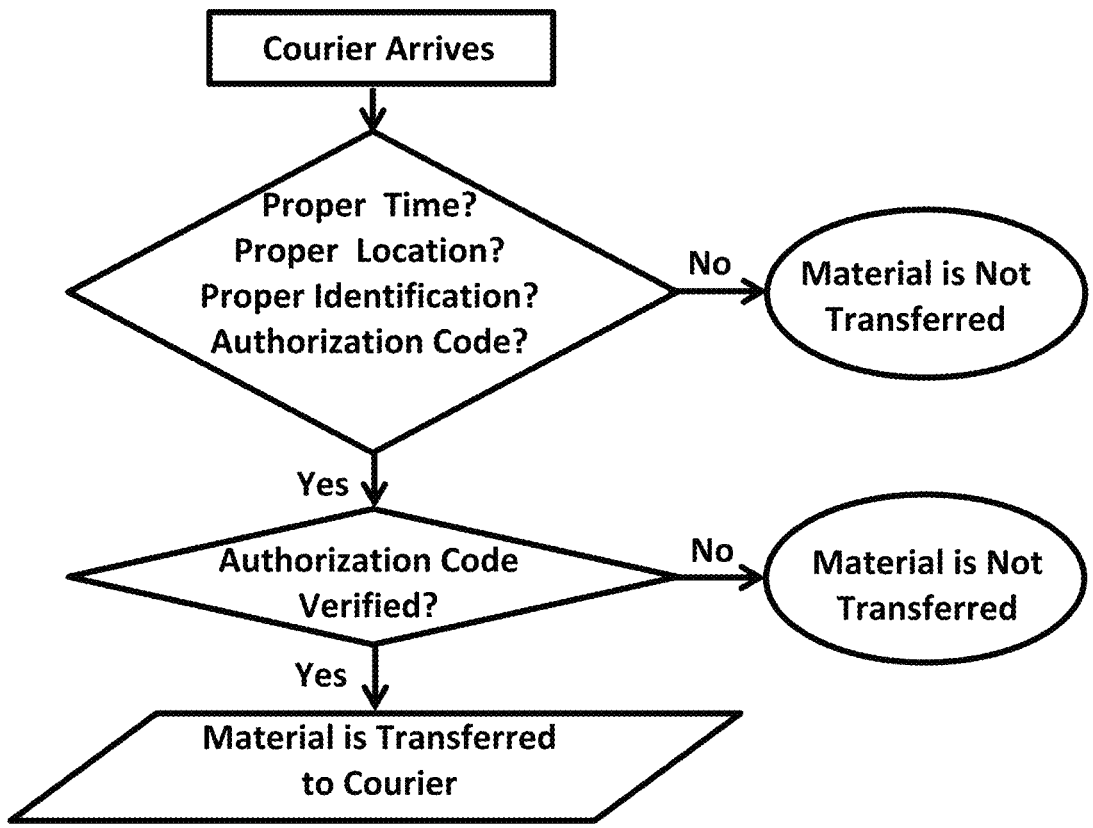
FIG. 5B provides a schematic representation of an embodiment of a method for transferring material from a custodian to a courier having proper identification, comprising transferring material to the courier if the courier also has an authorization code, where the courier is provided with the authorization code only when present at the correct transfer location at the correct time (e.g., within a predetermined time period), and the material is transferred only upon verification of the authorization code.

FIG. 5B provides a schematic representation of an embodiment of a method for transferring material from a custodian to a courier having proper identification, comprising transferring material to the courier if the courier also has a valid authorization code, where the courier is provided with the authorization code only when present at the correct transfer location at the correct time (e.g., within a predetermined time period), and the material is transferred only upon verification of the authorization code.

In embodiments, a courier may accept material from a custodian only when the custodian provides identifying information. Such identifying information may pertain to the custodian, to the material, or both. For example, a courier may take a photograph or obtain an image of the custodian, or obtain biometric information or other identifying information from the custodian, for comparison with a record, or for transmission over a network, or other verification, prior to transfer of material to a courier.

Thus, identifying information may be provided, e.g., by a courier to the custodian; by a courier to a network; by a custodian to a courier; by a custodian to a network; or by a courier or by a custodian to a network and an individual (e.g., a courier or a custodian).

A courier may present such an authorization code to a custodian at the transfer location. In embodiments, in addition to an authorization code, a custodian may require a photograph, biometric image, or other identifying information from a courier in addition to requiring an authorization code. In embodiments, a courier may require a photograph, biometric image, or other identifying information from a custodian. Such photographs, biometric information, or other identifying information, may be provided, for example, by or via cell phone, internet, or other means.

A custodian may transfer the material to a courier only upon presentation of the authorization code by the courier to the custodian. In embodiments, a custodian may transfer the material to a courier only upon presentation of identification information by the courier to the custodian in addition to the presentation of the authorization code by the courier to the custodian. A courier may accept transfer of the material from a custodian upon presentation of the authorization code by the courier to the custodian. In embodiments, a courier may accept transfer of the material from a custodian (following presentation of the authorization code by the courier to the custodian) only upon presentation of identification information by the custodian to the courier.

Accordingly, further embodiments of methods for transferring material from a custodian to a courier may comprise requiring that the courier verify the identity or authorization of the custodian; or that the courier verify the identity or authorization of the material; or both.

Figure 5C:
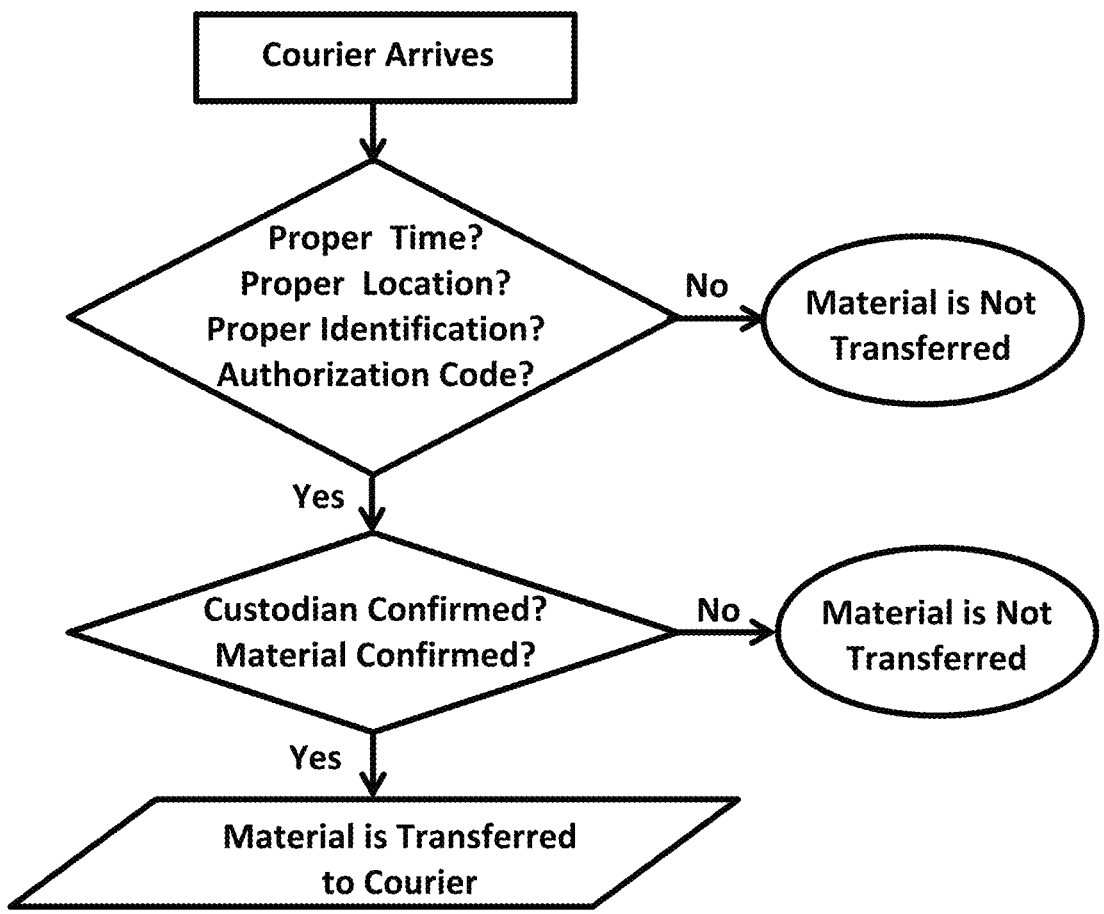
FIG. 5C provides a schematic representation of an embodiment of a method for transferring material from a custodian to a courier having proper identification, where the courier is provided with the authorization code only when present at the correct transfer location at the correct time (e.g., within a predetermined time period), comprising transferring material to the courier if the courier i) has proper identification and an authorization code, and ii) upon confirmation of the identity or authorization of the custodian, the identity or authorization of the material, or both.

FIG. 5C provides a schematic representation of an embodiment of a method for transferring material from a custodian to a courier having proper identification, comprising 1) transferring material to the courier having proper identification if the courier also has a valid authorization code, where the courier is provided with the authorization code only when present at the correct transfer location at the correct time (e.g., within a predetermined time period), and 2) where the courier accepts the material only upon verification of the identity of the custodian (or material) or authorization of the custodian (e.g., to make the transfer) or material (e.g., to be transferred, or to be suitable for transfer).

Figure 5D:
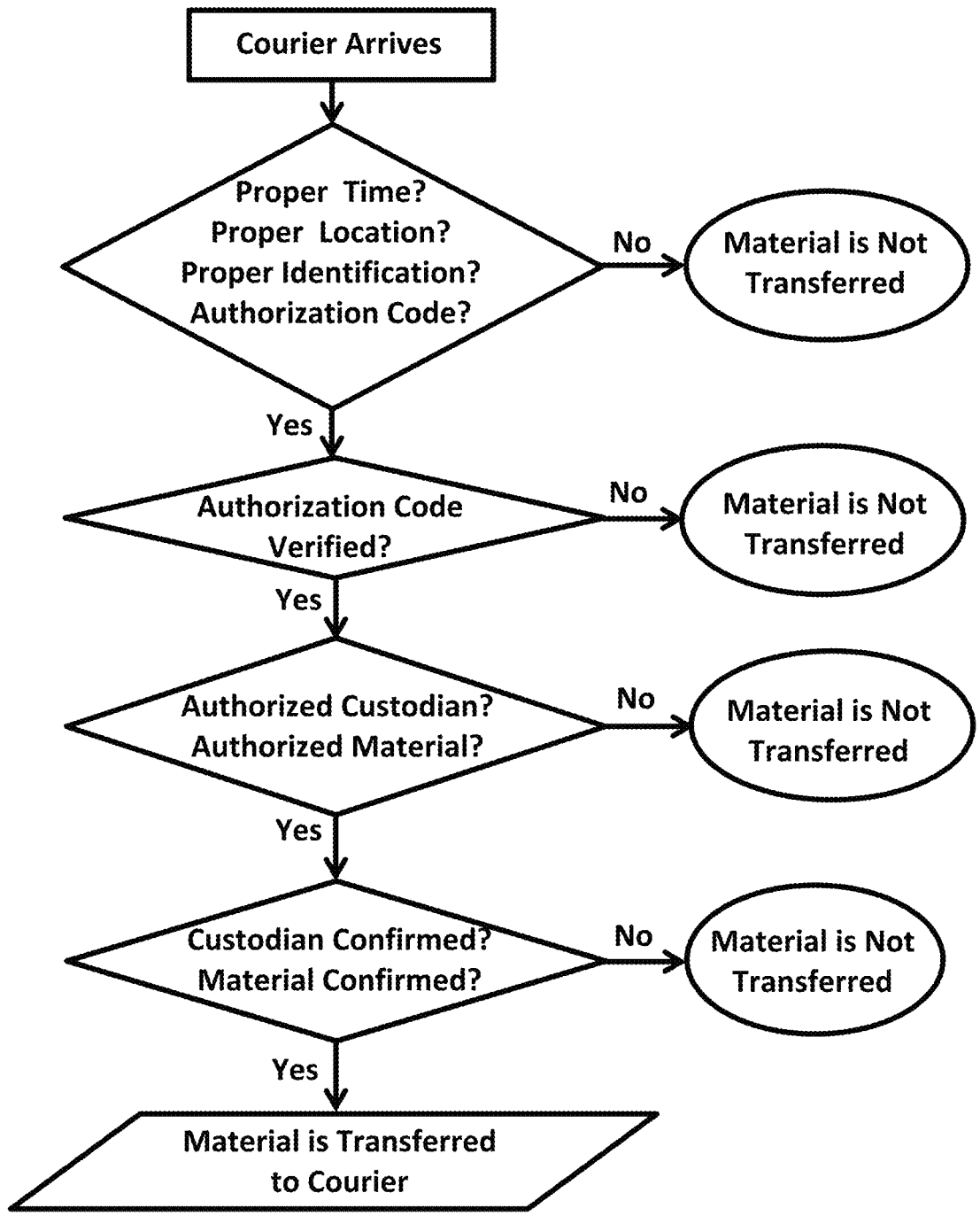
FIG. 5D provides a schematic representation of an embodiment of a method for transferring material from a custodian to a courier having proper identification, comprising transferring material to the courier if the courier also has an authorization code, where the courier is provided with the authorization code only when present at the correct transfer location at the correct time (e.g., within a predetermined time period), and the material is transferred only i) upon verification of the authorization code, and ii) upon confirmation of the identity or authorization of the custodian, the material, or both.

FIG. 5D provides a schematic representation of an embodiment of a method for transferring material from a custodian to a courier having proper identification, comprising 1) transferring material to the courier having proper identification if the courier also has a valid authorization code (where the courier is provided with the authorization code only when present at the correct transfer location at the correct time (e.g., within a predetermined time period)), 2) upon verification of the authorization code, and 3) where the courier accepts the material only upon verification of the identity of the custodian (or material) or authorization of the custodian (e.g., to make the transfer) or material (e.g., to be transferred, or to be suitable for transfer).

Methods for preventing unauthorized transfer of material from a custodian to a courier are disclosed herein. In embodiments, methods for preventing unauthorized transfer of material from a custodian to a courier may comprise preventing transfer of material unless a courier has an authorization code; or an authorization code and proper identification in order for a custodian to transfer material. In embodiments, methods for preventing unauthorized transfer of material from a custodian to a courier may comprise preventing transfer unless 1) a courier has an authorization code, and 2) only upon verification of the authorization code. In embodiments, methods for preventing unauthorized transfer of material from a custodian to a courier may comprise preventing transfer unless 1) a courier has an authorization code and proper identification, and 2) only upon verification of the authorization code. Further embodiments of methods for transferring material from a custodian to a courier may comprise requiring that the courier verify the identity or authorization of the custodian; or that the courier verify the identity or authorization of the material; or both.

Figure 6A:
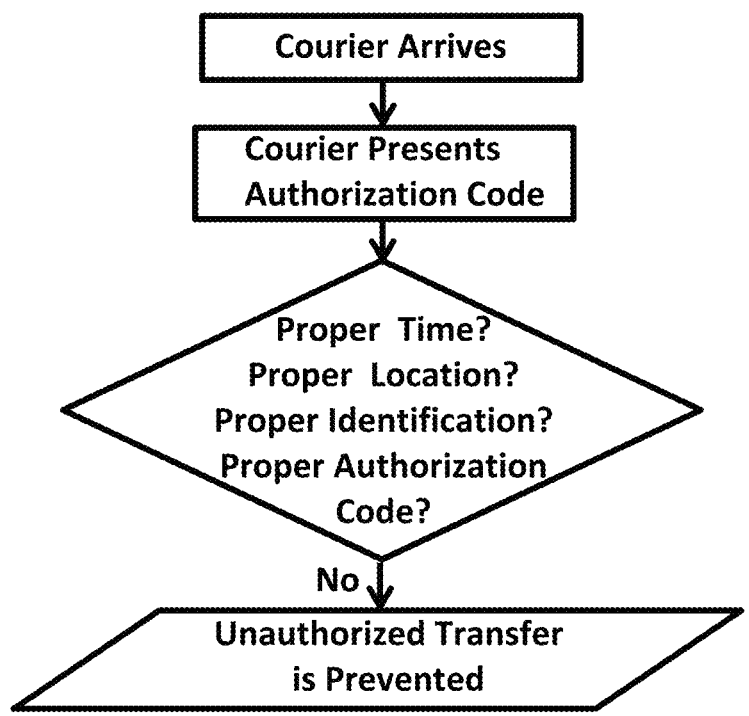
FIG. 6A provides a schematic representation of an embodiment of a method for preventing unauthorized transfer of material from a custodian to a courier, where transfer of material is unauthorized if the courier is not at the proper location at the proper time, lacks properly identification, or lacks a valid authorization code.

FIG. 6A provides a schematic representation of an embodiment of a method for preventing unauthorized transfer of material from a custodian to a courier, where transfer of material is unauthorized if the courier is not at the proper location at the proper time, lacks properly identification, or lacks a valid authorization code. Prevention of unauthorized transfer of material may entail, for example, a custodian's refusal to transfer the material to the courier. In embodiments, prevention of unauthorized transfer of material may not require an action by a custodian, for example, where the authorized transfer of material requires the operation of devices or systems which may automatically read and/or verify time, location, identification, authorization codes, or any combination thereof.

In further embodiments, methods for preventing unauthorized transfer of material from a custodian to a courier may also comprise requiring that the courier verify the identity or authorization of the custodian; or that the courier verify the identity or authorization of the material; or both.

For example, in embodiments, the material to be transported may also carry identifying marks or symbols, which may include identifying credentials certifying its authenticity or integrity. In embodiments, the material to be transported may carry or provide information regarding the material itself, or instructions regarding its treatment, storage, and use. In embodiments where the material to be transported comprises biological material, the material to be transported may carry or provide information regarding the source of the material; the time it was collected; the manner of its collection; the purpose of its collection; its composition; information regarding any treatment performed on the material; information regarding dilution, solutions or reagents applied; and storage information.

In further embodiments, a custodian or other personnel at the transfer location may be required to provide identifying credentials to a courier prior to transfer of material to the courier. In embodiments, a unique, time-sensitive credential may be generated and provided to personnel at the transfer location (e.g., a custodian) for presentation to a courier for use in a transfer of materials to a courier at that transfer location at the proper time. Such a credential for use by personnel at a transfer location may be created for use at that transfer location at that time, and may not be valid at any other location, or at any other time. In embodiments, such a credential may be created for use with a particular courier at that transfer location at that time, and may not be valid for use with any other courier, or at any other location, or at any other time.

Accordingly, identification, verification, authorization, or other confirmation of a custodian, of material, or both, may be required in further methods for preventing unauthorized transfer of material from a custodian to a courier.

Figure 6B:
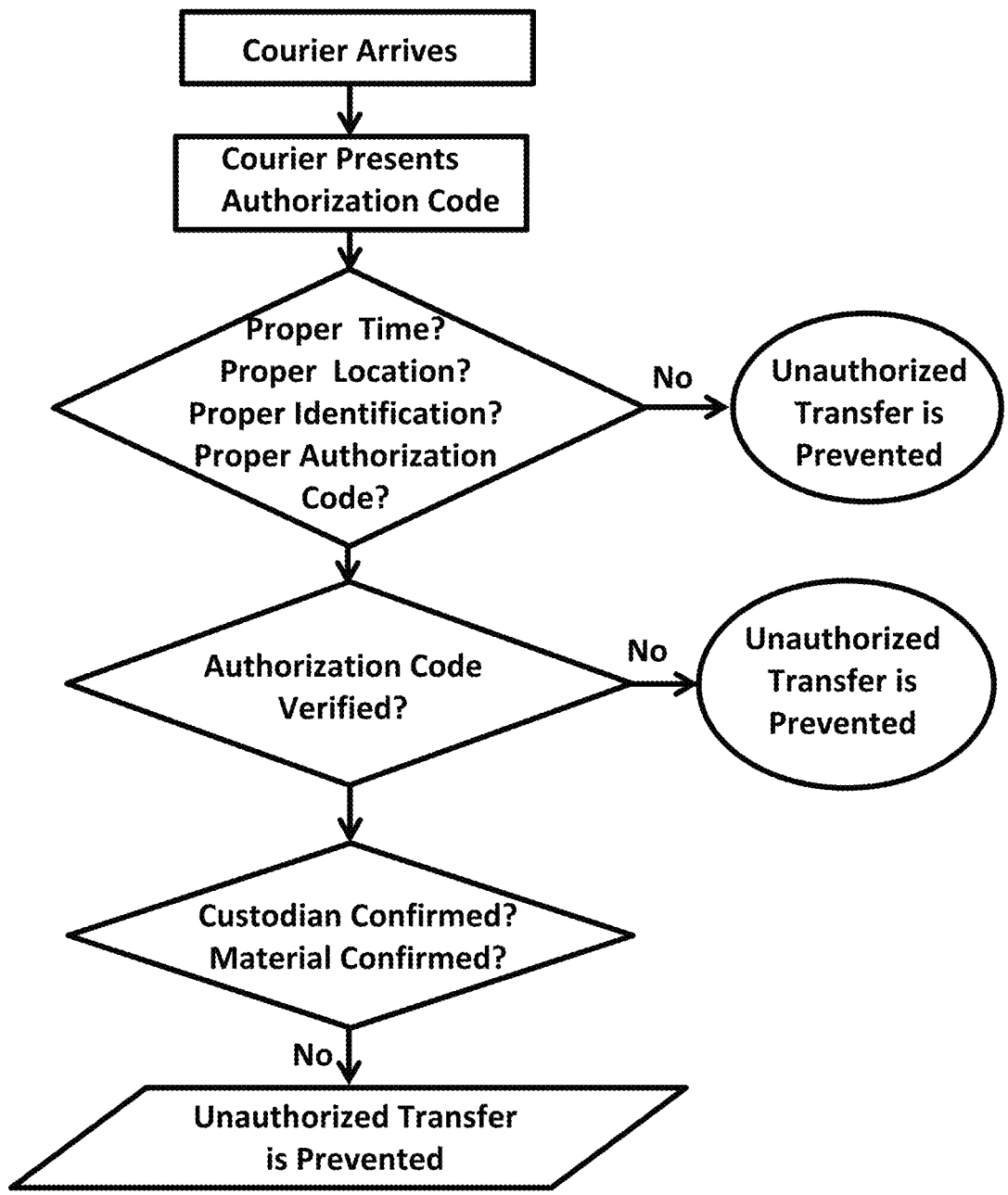
FIG. 6B provides a schematic representation of an embodiment of a method for preventing unauthorized transfer of material from a custodian to a courier, where transfer of material is unauthorized if the courier is not at the proper location at the proper time, lacks properly identification, lacks a valid authorization code; or if the identity or authorization of the custodian is not confirmed; or if the identity or authorization of the material is not confirmed.

FIG. 6B provides a schematic representation of an embodiment of a method for preventing unauthorized transfer of material from a custodian to a courier, where transfer of material is unauthorized if 1) the courier is not at the proper location at the proper time, lacks properly identification, or lacks a valid authorization code; or if 2) the custodian or material lacks proper identification, authorization, or other confirmation. Prevention of unauthorized transfer of material may entail, for example, a courier's refusal to accept a material from the custodian. Prevention of unauthorized transfer of material may entail, for example, a custodian's refusal to transfer the material to the courier. Where authorized transfer of material requires the operation of devices or systems which may automatically read and/or verify time, location, identification, authorization codes, or any combination thereof, prevention of unauthorized transfer of material may not require an action by a custodian.

Figure 7A:
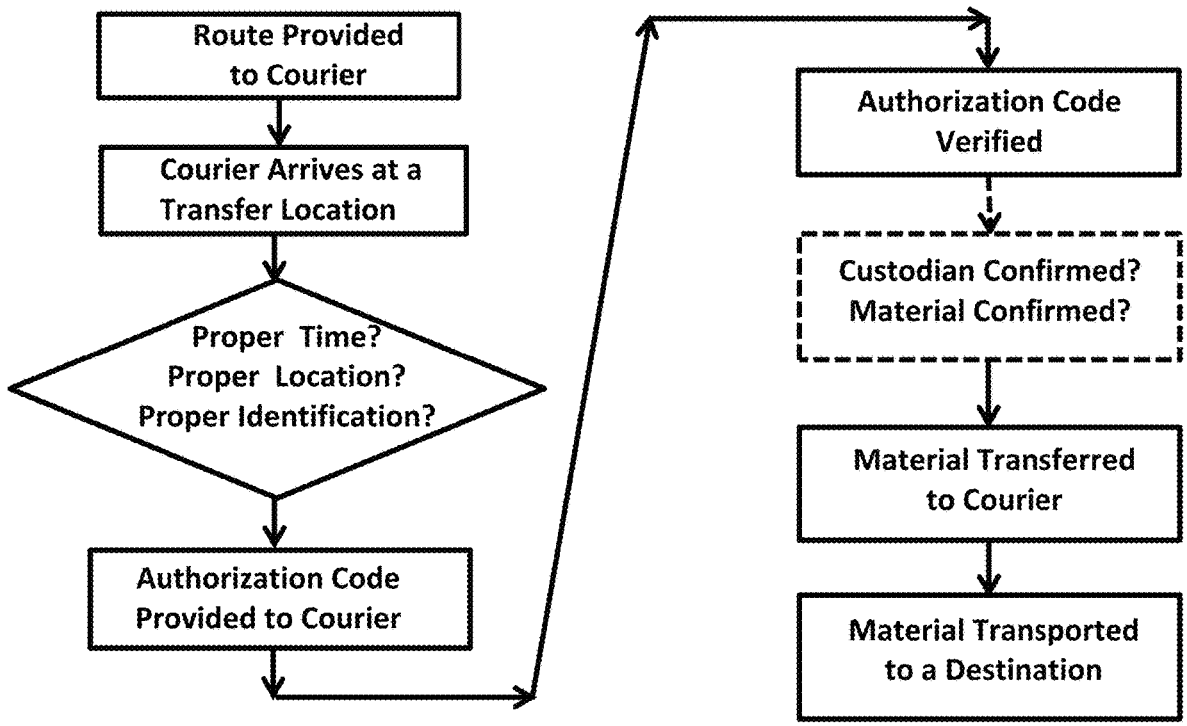
FIG. 7A provides a schematic representation of a method for transporting a material or materials from a transfer location to a destination, where a properly identified courier is provided with an authorization code upon arrival at a transfer location at the correct time; upon verification of the authorization code, material is transferred to the courier and is delivered to its destination. Identification or authorization of the custodian or of the material may optionally be required (as indicated by the dotted arrow and box).
Figure 7B:
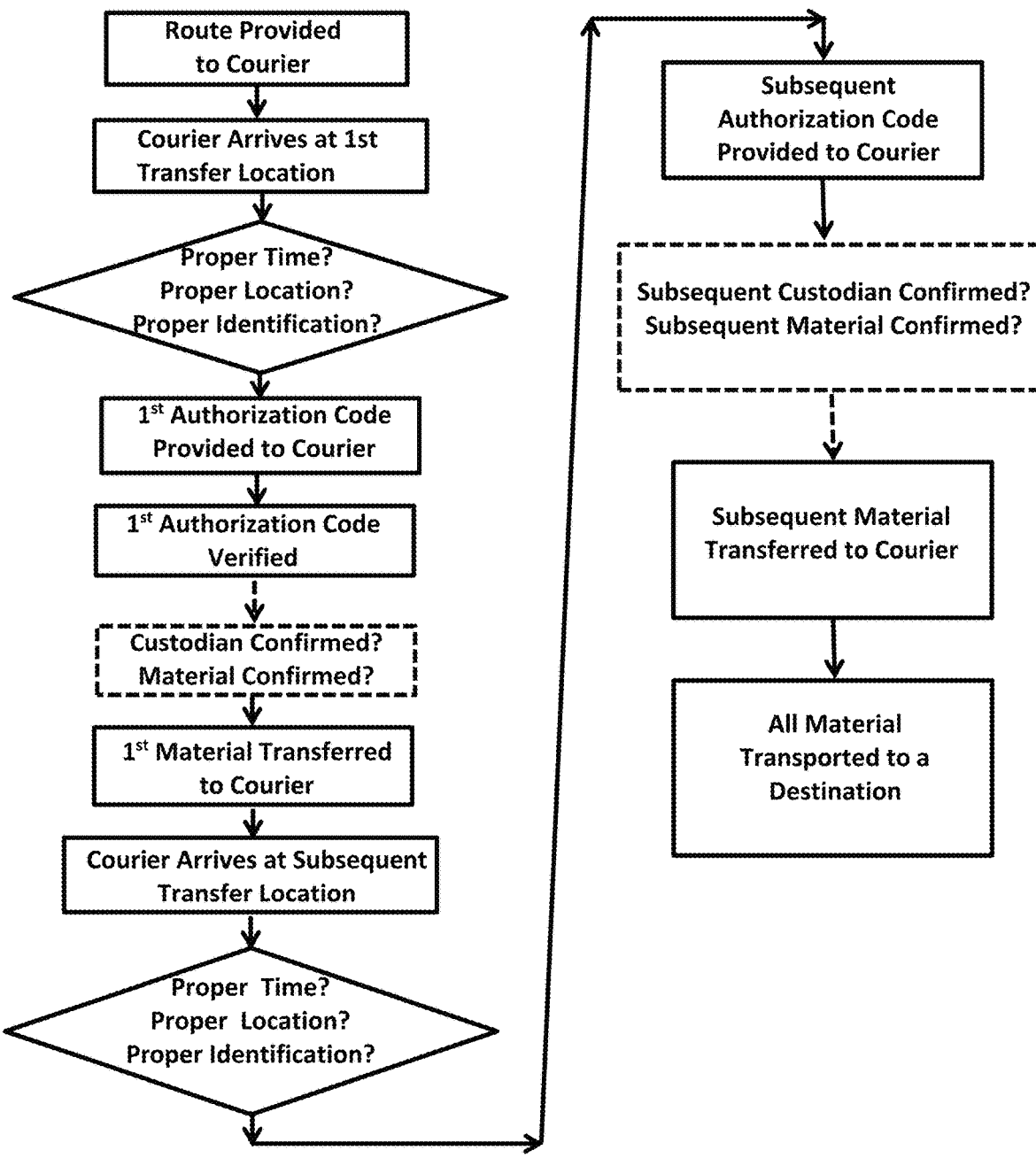
FIG. 7B provides a schematic representation of a method for transporting materials from multiple transfer locations to a destination, where a properly identified courier is provided with an authorization code upon arrival (at the correct times) at each transfer location; upon verification of each authorization code, material is transferred to the courier at each transfer location, and the materials are delivered to their destination. Identification or authorization of the custodian or of the material may optionally be required (as indicated by the dotted arrows and boxes).
Figure 7C:
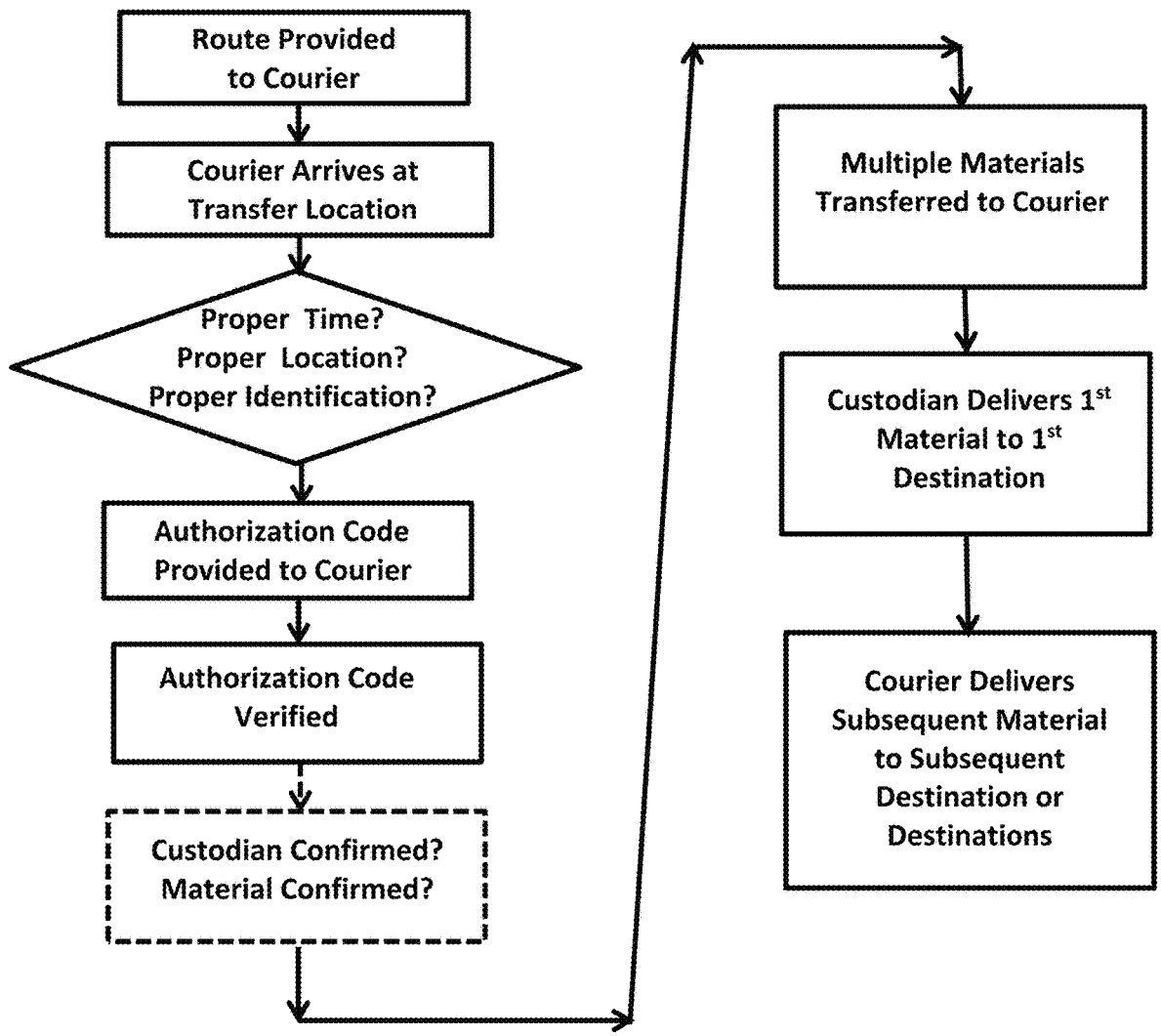
FIG. 7C provides a schematic representation of a method for transporting materials from a transfer location to multiple destinations, where a properly identified courier is provided with an authorization code upon arrival at a transfer location at the correct time; upon verification of an authorization code, material is transferred to the courier, and the materials are delivered to their destinations. Identification or authorization of the custodian or of the material may optionally be required (as indicated by the dotted arrow and box).
Figure 7D:
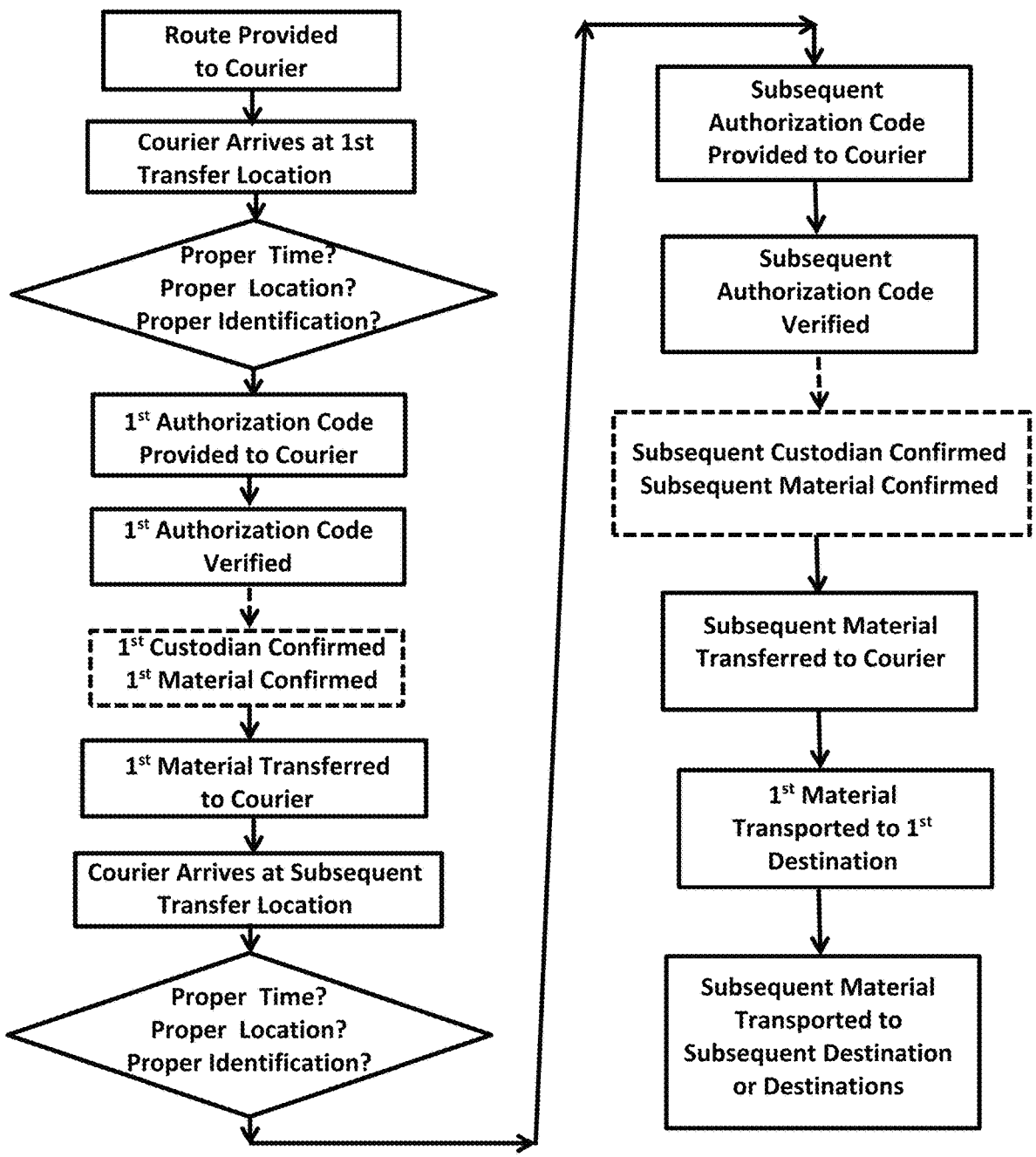
FIG. 7D provides a schematic representation of a method for transporting materials from multiple transfer locations to multiple destination, where a properly identified courier is provided with an authorization code upon arrival (at the correct times) at each transfer location; upon verification of each authorization code at each transfer location, material is transferred to the courier at each transfer location, and the materials are delivered to each of their destinations. Identification or authorization of the custodian or of the material may optionally be required (as indicated by the dotted arrows and boxes).

FIGS. 7A, 7B, 7C, and 7D provide schematic representations of embodiments of methods for transporting a material or materials from a transfer location to a destination. FIG. 7A provides a schematic representation of embodiments comprising arrival of a courier at a transfer location, providing the courier with a unique authorization code when the courier is at the proper location and at the proper time (and optionally is additionally identified as a proper courier) for pick-up of material for delivery to a destination. Optionally, the identification, authorization, or other confirmation of the custodian or material may also be required. FIG. 7B provides a schematic representation of embodiments comprising arrival of a courier at a first transfer location, and at a subsequent transfer location or locations, providing the courier with a unique authorization code at each transfer location when the courier is at the proper location and at the proper time (and optionally is additionally identified as a proper courier), for pick-up of multiple materials from multiple transfer locations for delivery to a destination. Optionally, the identification, authorization, or other confirmation of the custodian or material may also be required at one or more of the transfer locations. FIG. 7C provides a schematic representation of embodiments comprising arrival of a courier at a transfer location, providing the courier with a unique authorization code at the transfer location when the courier is at the proper location and at the proper time (and optionally is additionally identified as a proper courier), for pick-up of multiple materials at that transfer location for delivery to multiple destinations. Optionally, the identification, authorization, or other confirmation of the custodian or material at the transfer location may also be required. FIG. 7D provides a schematic representation of embodiments comprising arrival of a courier at a first transfer location, and at a subsequent transfer location or locations, providing the courier with a unique authorization code at each transfer location when the courier is at the proper location and at the proper time (and optionally is additionally identified as a proper courier), for pick-up of material from multiple transfer locations for delivery of the multiple materials to multiple destinations. Optionally, the identification, authorization, or other confirmation of the custodian or material at one or more of the transfer locations may also be required.

In further embodiments, the identification, authorization, or other confirmation of the courier or of material may also be required at a destination, or at all destinations.

Methods for transporting a material or materials from a transfer location to a destination may comprise providing a route, providing an authorization code to a courier at the transfer location, presentation of the authorization code to the custodian, transfer of the material by the custodian to the courier at the transfer location, and transport of the material to a destination. As shown, the process may comprise transport of material from more than one transfer location, and may comprise transport of material to more than one destination.

FIG. 7A provides a schematic representation of a method for transporting a material or materials from a transfer location to a destination, where a properly identified courier is provided with an authorization code upon arrival at a transfer location at the correct time; upon verification of the authorization code by a custodian at the transfer location (or by other means), material is transferred to the courier and is delivered to its destination. Optionally, the identification, authorization, or other confirmation of the custodian or material may also be required at the transfer location. Optionally, the identification, authorization, or other confirmation of the courier, or of the material, or both, may also be required at the destination.

FIG. 7B provides a schematic representation of a method for transporting materials from multiple transfer locations to a destination, where a properly identified courier is provided with an authorization code upon arrival (at the correct times) at each transfer location; upon verification of each authorization code by a custodian at each transfer location (or by other means), material is transferred to the courier at each transfer location, and the materials are delivered to their destination. Optionally, the identification, authorization, or other confirmation of the custodian or material may also be required at one or more of the transfer locations. Optionally, the identification, authorization, or other confirmation of the courier, or of the material, or both, may also be required at the destination.

FIG. 7C provides a schematic representation of a method for transporting materials from a transfer location to multiple destinations, where a properly identified courier is provided with an authorization code upon arrival at a transfer location at the correct time; upon verification of an authorization code by a custodian at the transfer location (or by other means), material is transferred to the courier, and the materials are delivered to their destinations. Optionally, the identification, authorization, or other confirmation of the custodian or material may also be required at the transfer location. Optionally, the identification, authorization, or other confirmation of the courier, or of the material, or both, may also be required at one, some, or at all of the destinations.

FIG. 7D provides a schematic representation of a method for transporting materials from multiple transfer locations to multiple destination, where a properly identified courier is provided with an authorization code upon arrival (at the correct times) at each transfer location; upon verification of each authorization code by a custodian at each transfer location (or by other means), material is transferred to the courier at each transfer location, and the materials are delivered to each of their destinations. Optionally, the identification, authorization, or other confirmation of the custodian or material may also be required at one or more of the transfer locations. Optionally, the identification, authorization, or other confirmation of the courier, or of the material, or both, may also be required at one, some, or at all of the destinations.

A route may be provided in which a courier is to visit one or more transfer locations; such a route may be altered (e.g., upon receipt of instructions) so that a different transfer location is visited (or multiple different transfer locations are visited), or so that fewer transfer locations are visited, or so that more transfer locations are visited, than originally planned. Instructions may be from an operator, a device, from software, from a network, or from a combination of these.

FIG. 8 provides a schematic representation of embodiments of methods for altering a route for the transporting a material or materials from a transfer location to a destination. A route may include a sequence of transfer locations to be visited by a courier at a sequence of arrival times; e.g., a route that includes visits to transfer locations A, B, C, and D will also include designated arrival times $T_A$, $T_B$, $T_C$, and $T_D$, where these arrival times are particular times, or particular time periods, at which the courier is scheduled to arrive at each of these transfer locations.

Figure 8A:
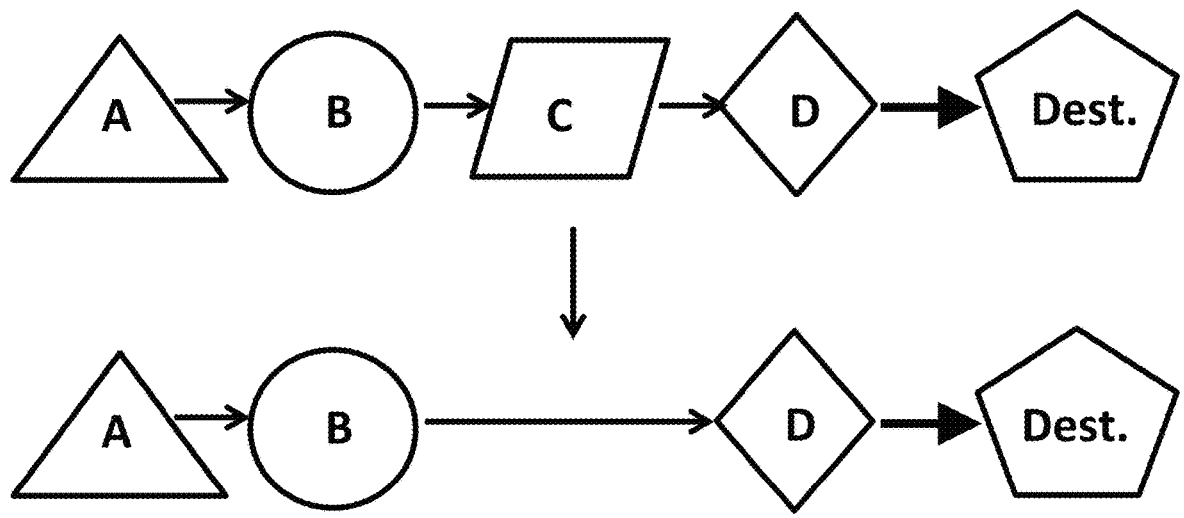
FIG. 8A provides a schematic representation of a route that is altered. The original route shown at the top of the figure, and is initially a route from location A to location B to location C to location D and then to a destination (labeled "Dest."). The route is altered by deletion of location C, so that the altered route (shown below the original route) becomes the route from location A to location B to location D, and then to the destination Dest.

FIG. 8A provides a schematic representation of a route that is altered. The route shown is initially a route from location A to location B to location C to location D and then to a destination (labeled "Dest."). The route is altered by deletion of location C, so that the altered route becomes the route from location A to location B to location D, and then to the destination Dest. Thus, as shown, FIG. 8A provides a schematic representation of a route ABCD→Destination that is altered to become an altered route ABD→Destination (transfer point C is omitted). A courier following the route shown in this example would have initially been scheduled to visit locations A, B, C, and D (and, in embodiments, be scheduled to pick up material at each of these transfer locations), and then to go to destination Dest.; however, upon alteration of the route, the courier would instead be scheduled to omit location C, and to visit only locations A, B, and D (e.g., for pick-up of material at only these transfer locations), and then to go to destination Dest. In such an altered route, arrival time $T_C$ is omitted, and arrival times $T_A$, $T_B$, and $T_D$ may be unaltered; or, in embodiments of altered routes, one or more of arrival times $T_A$, $T_B$, and $T_D$ may be altered as compared to the arrival times of the original planned route.

Figure 8B:
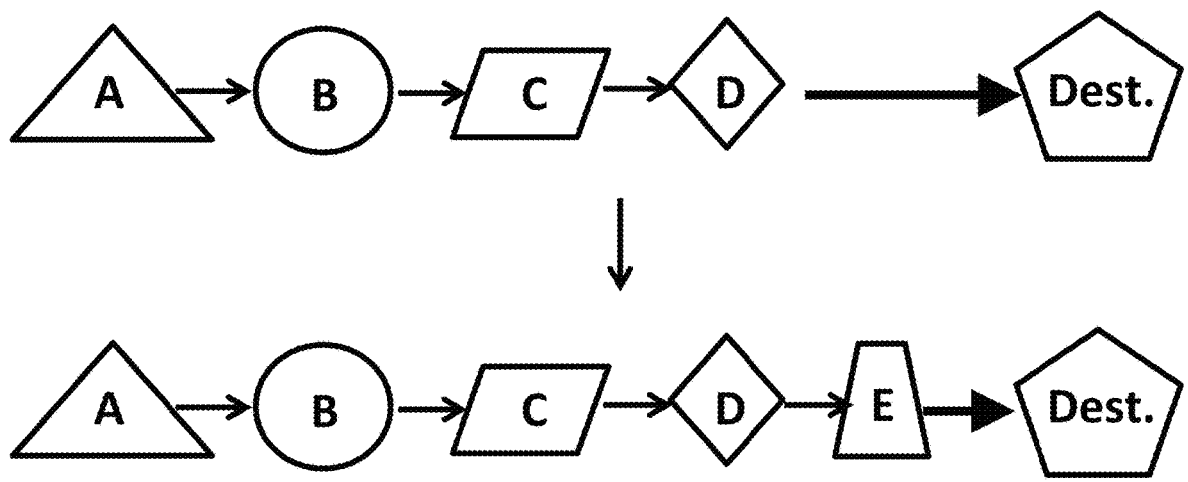
FIG. 8B provides a further schematic representation of a route that is altered. The original route (shown at the top of the figure) is initially a route from location A to location B to location C to location D and then to a destination (labeled "Dest."). The route is altered by addition of location E, so that the altered route (shown below the original route) becomes the route from location A to location B to location C to location D and then to location E, and only then to the destination Dest.

FIG. 8B provides a further schematic representation of a route that is altered. The route shown is initially a route from location A to location B to location C to location D and then to a destination (labeled "Dest."). The route is altered by addition of location E, so that the altered route becomes the route from location A to location B to location C to location D and then to location E, and only then to the destination Dest. Thus, FIG. 8B provides a schematic representation of a route ABCD→Destination that is altered to become an altered route ABCDE→Destination (transfer point E is added). Thus, a courier following the route shown in this example would have initially been scheduled to visit locations A, B, C, and D (and in embodiments, e.g., to pick up material at each of these transfer locations), and then to go to destination Dest.; however, upon alteration, the courier would instead be scheduled to add new location E, and to visit locations A, B, C, D, and E (in embodiments, e.g., to pick up material at each of these transfer locations) prior to delivering the material to destination Dest. In such an altered route, arrival time $T_E$ is added, and one or more of arrival times $T_A$, $T_B$, $T_C$, and $T_D$ may be unaltered; or, in embodiments of altered routes, one or more of arrival times $T_A$, $T_B$, $T_C$, and $T_D$ may be altered as compared to the arrival times of the original planned route.

Figure 9:
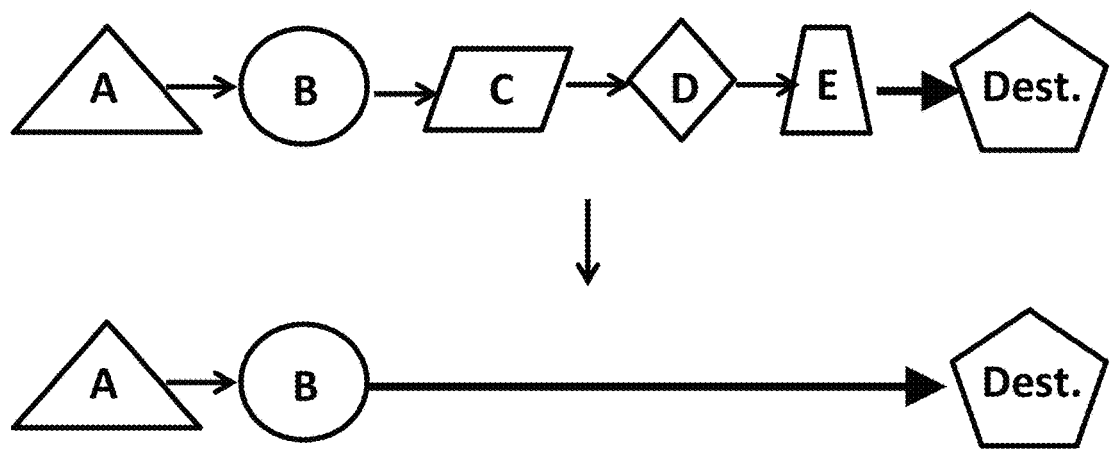
FIG. 9 provides a schematic representation of a route (shown at the top of the figure) that is originally a route from location A to location B to location C to location D and then to a destination (labeled "Dest."); however, the route is altered (shown below the original route) to omit all locations after location B, and to travel to destination Dest. immediately following the pick-up at location B (the final transfer points C, D, and E are omitted).

FIG. 9 provides a schematic representation of a route that is originally a route from location A to location B to location C to location D and then to a destination (labeled "Dest."); however, the route shown is altered to omit all locations after location B, and to travel to destination Dest. immediately following the pick-up at location B (the final transfer points C, D, and E are omitted). Thus, FIG. 9 provides a schematic representation of a route ABCDE→Destination that is altered to become an altered route AB→Destination (final transfer points C, D, and E are omitted). Thus, FIG. 9 provides a schematic representation of embodiments of methods for altering a route for the transporting a material or materials from a transfer location to a destination, showing a route alteration in which, upon receipt of instructions, a courier alters the route to travel directly to a destination, and to skip all further transfer locations following receipt of the instructions. Instructions may be from an operator, a device, from software, from a network, or from a combination of these.

Materials to be transferred at a transfer location, materials to be transported from a transfer location to a destination, and materials transported to a destination may be placed in an insulated or temperature-controlled container for transport.

Accordingly, materials may be placed in a container for transport; a transport container may comprise a temperature sensor; a transport container may comprise a display for communicating a sensed temperature; a transport container may comprise a communication link for communicating a sensed temperature; a transport container may comprise a communication link for receiving information and for receiving instructions, which information and instructions may relate to a sensed temperature, and to other factors. In embodiments, a courier may alter a designated route in order to optimize the transport of materials in view of the temperature in a container, or in view of information or instructions communicated via a communication link of a container.

Figure 10:
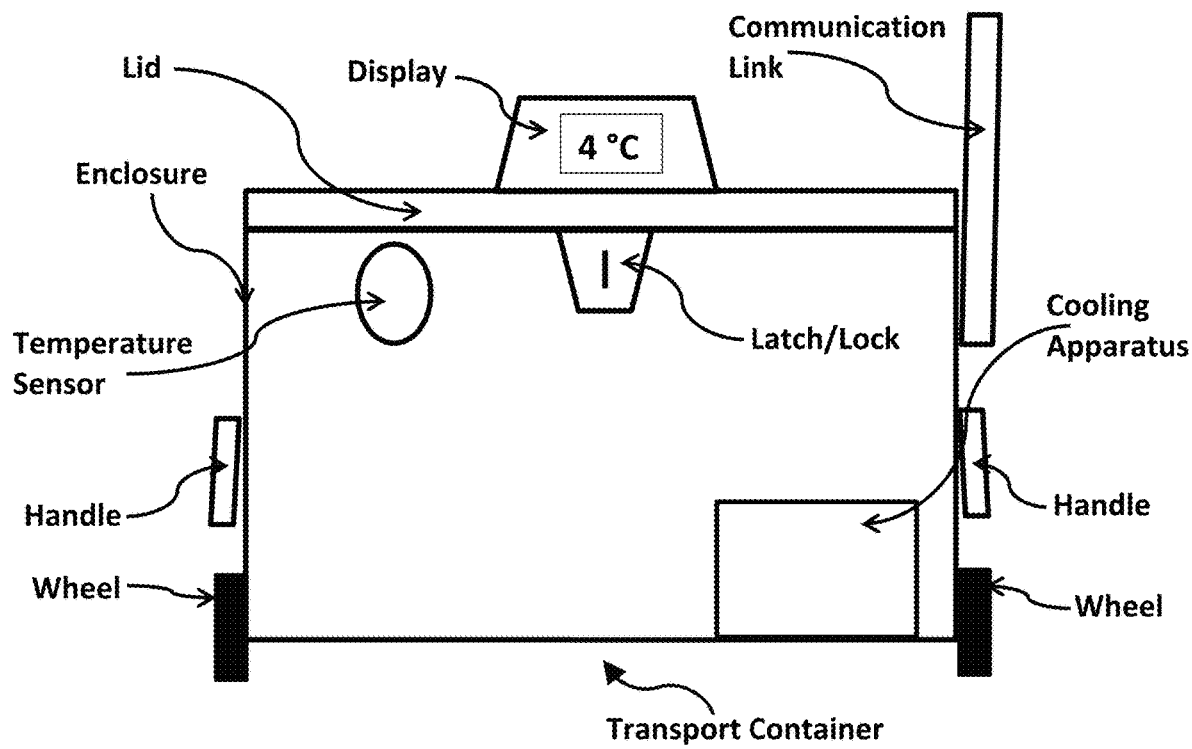
FIG. 10 provides a schematic illustration of a transport container suitable for transport of materials, the container having a temperature sensor, and a communication link configured to communicate or display (or both) a sensed temperature. Optional elements, including a latch (which may also include a lock); handles, wheels, and a cooling apparatus, are also shown.

FIG. 10 provides a schematic illustration of a transport container suitable for transport of materials, the container having a temperature sensor, and a communication link configured to communicate or display (or both) a sensed temperature. A transport container may be thermally insulated, may comprise a cooling apparatus, or both. For example, transport container may optionally include a cooling apparatus (e.g., a passive cooling apparatus such as ice, dry ice, or other cold material; or an active cooling means, such as a Peltier device, an evaporative cooler, a refrigerator mechanism, or other cooling means). In embodiments, a cooling apparatus may be in functional communication with the interior of a transport container, effective to cool at least a portion of the inside of the container; a cooling apparatus may be entirely within the transport container, may be partially within the transport container, or may be partly or entirely external to the interior of the transport container, and communicate (e.g., via a vent, or aperture, or other communication means) with the interior of the transport container. As shown, a transport container may also optionally have a latch, which may include a lock; may optionally include a handle, or handles, or other means for maneuvering and manipulating the transport container; may optionally include wheels, or other means to aid in maneuvering and manipulating the transport container. In embodiments, a transport container may lack wheels, or rollers, or other such elements. A latch, a lock, a handle, a wheel, and other such elements are typically disposed, at least partially, on the outside of a transport container.

An insulated or temperature-controlled container may comprise a temperature sensor. A temperature-controlled container may comprise multiple temperature sensors. A temperature sensor of a temperature-controlled container may be disposed within the temperature-controlled container, and may be disposed on the temperature-controlled container, for sensing temperature within and/or outside of the temperature-controlled container.

In embodiments, the transport container further comprises memory. For example, a temperature-controlled container may comprise a memory means, effective to store information. In embodiments, a memory means may comprise magnetic memory, volatile memory (e.g., "flash" memory), non-volatile memory, solid-state memory, bubble memory, or other memory device or mechanism known in the art. In embodiments, memory of a temperature-controlled container may comprise memory for recording temperatures within the container. In embodiments, memory of a temperature-controlled container may comprise memory for the time-course of temperature sensed in multiple locations within and around the temperature-controlled container.

In addition, in embodiments, a courier or an operator may monitor the temperature of a transport container, or of its contents, or may monitor both. In embodiments, a courier or an operator may monitor the temperature of a transport container, or of its contents, or may monitor both, in view of a desired temperature range. In embodiments, a courier or an operator may have control over the temperature within a transport container, and may have control over the temperature of materials within the transport container. For example, transport of a material may be most effective when such material is transported at temperatures within a desired, or optimal, temperature range.

A temperature-controlled container may comprise a communication link, e.g., a display, a Bluetooth connection, a Universal Serial Bus (USB) connection, a firewire connection, an ethernet connection, a cell-phone link, a WiFi connection, or any other communication link effective to provide information to another device, to a courier, to a custodian, or to the cloud.

In embodiments, a display or communication link may be monitored by a courier or an operator, so that container temperature may be monitored by a courier or an operator, and temperatures may be noted by the courier or operator. A courier will typically be located at or near a transport container; an operator may be a remote operator (e.g., an operator located at a location different than the location of the transport container). For example, transported materials may be temperature sensitive. Thus, in embodiments, a courier or an operator may monitor the temperature within a transport container, in order to detect whether or when the temperature may be above a desired level, or outside a desired range.

In embodiments, if the temperature within the transport container, or of material within the transport container, is found to be outside the desired range (e.g., too high), an alert or alarm may be issued. In embodiments, if the temperature within the transport container is found to be outside the desired range (e.g., too high) for too long a time (e.g., for longer than a minimum time), an alert or alarm may be issued. In embodiments, a courier or an operator may monitor a transport container, including monitoring a transport container display or communications link, in order to detect such an alert or alarm. In embodiments, corrective action to restore the temperature to within a desired range may be taken or ordered by a courier or an operator upon detection of such an alert or alarm. In embodiments, a courier or an operator may have control over a transport container, and the courier or operator may take corrective action. In embodiments, a courier or an operator may have remote control over a transport container, and the courier or operator may take corrective action from a remote location. In embodiments, a courier or an operator may direct others to take corrective action. In embodiments, remote control or direction of others to take corrective action may comprise use of a communication link.

Figure 11A:
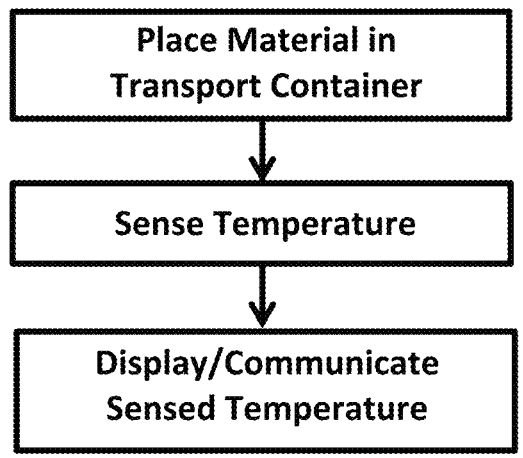
FIG. 11A provides a schematic representation of embodiments of methods for containing material, in which material is placed in a transport container having a temperature sensor; temperature is sensed; and the sensed temperature is communicated or displayed, or both.

FIG. 11A provides a schematic representation of embodiments of methods for the transport of material, in which material is placed in a transport container (e.g., for transport), the transport container having a temperature sensor; temperature is sensed (e.g., a temperature within the container is sensed by the temperature sensor); and the sensed temperature is communicated or displayed, or both. For example, a communication link or display may be configured to send or display an alert if the sensed temperature exceeds an alarm limit.

Figure 11B:
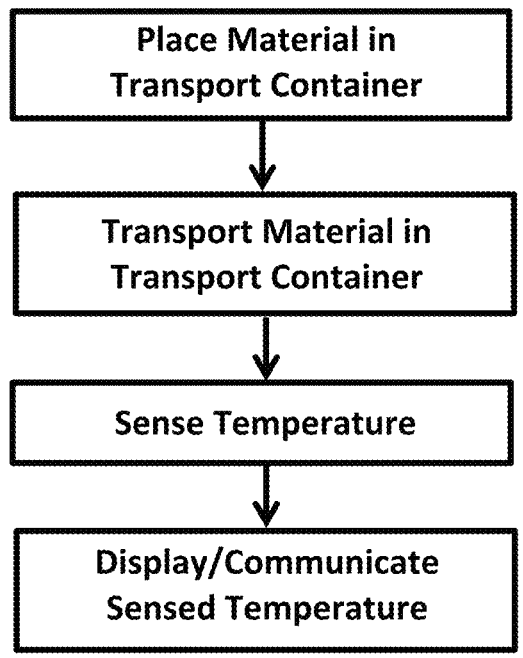
FIG. 11B provides a schematic representation of embodiments of methods for the transport of material placed in a transport container having a temperature sensor; the material is transported; a temperature is sensed; and the sensed temperature is communicated or displayed, or both.

FIG. 11B provides a schematic representation of embodiments of methods for the transport of material, in which material is placed in a transport container, the transport container having a temperature sensor; the material is transported (e.g., at least partly along a route, such as from one transfer location at least partly to another transport location, or destination); a temperature is sensed (e.g., a temperature within the container is sensed by the temperature sensor); and the sensed temperature is communicated or displayed, or both. For example, a communication link or display may be configured to send or display an alert if the sensed temperature exceeds an alarm limit.

Figure 12A:
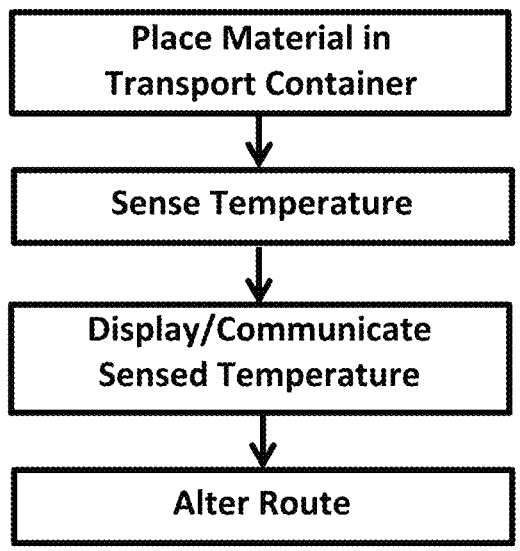
FIG. 12A provides a schematic representation of embodiments of methods for containing material in which material is placed in a transport container having a temperature sensor; a temperature is sensed; the sensed temperature is communicated or displayed, or both; and the route is altered.

FIG. 12A provides a schematic representation of embodiments of methods for the transport of material along a route to a destination, in which material is placed in a transport container for transport, the transport container having a temperature sensor; a temperature is sensed (e.g., a temperature within the container is sensed by the temperature sensor); the sensed temperature is communicated or displayed, or both; and the route is altered. For example, a route may be altered if the sensed temperature exceeds an alarm limit; e.g., in response to an alert communicated by a communication link or display.

Figure 12B:
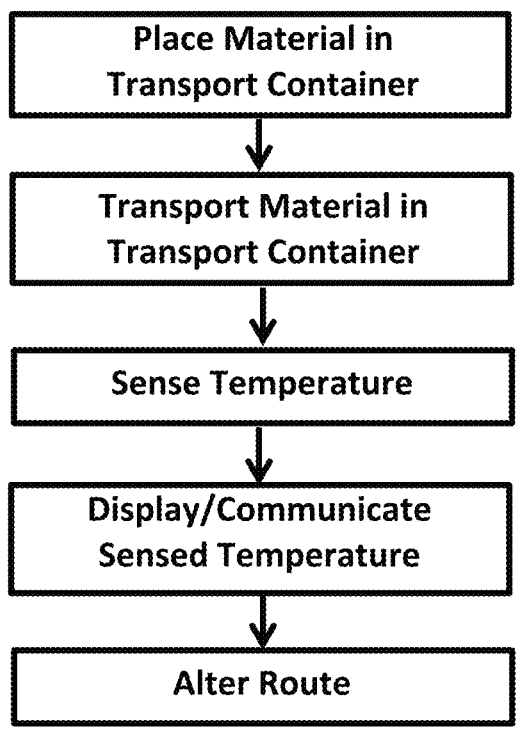
FIG. 12B provides a schematic representation of embodiments of methods for the transport of material in a transport container having a temperature sensor along a route to a destination. The material in the transport container is transported; a temperature is sensed; the sensed temperature is communicated or displayed, or both; and the route is altered.

FIG. 12B provides a schematic representation of embodiments of methods for the transport of material along a route to a destination, in which material is placed in a transport container for transport, the transport container having a temperature sensor; the material is transported (e.g., at least partly along a route, such as from one transfer location at least partly to another transport location, or destination); a temperature is sensed (e.g., a temperature within the container is sensed by the temperature sensor); the sensed temperature is communicated or displayed, or both; and the route is altered. For example, a route may be altered if the sensed temperature exceeds an alarm limit; e.g., in response to an alert communicated by a communication link or display.

Materials may be placed in a storage container following transport to a destination. A storage container may be thermally insulated, or may have a cooling apparatus, or both; for example, a temperature-controlled container may be a refrigerator. Examples of temperature-controlled storage containers suitable for storage of materials include containers having a sensor configured to sense the environment within the container, and a means for communicating information regarding the environment within the container; in embodiments, the containers have a light sensor, and a means for communicating a light level within the container. As indicated, embodiments of such temperature-controlled storage containers may have memory, e.g., memory configured to record times and time periods when a door of the temperature-controlled storage container has been open.

A temperature-controlled container comprises a portal through which materials may be placed in the container, and through which materials may be removed from the container; in embodiments, a portal may be a door. A temperature-controlled container may comprise a light sensor; in embodiments, a light sensor may be disposed within a temperature-controlled container, effective to sense whether, and when, a portal is open. A temperature-controlled container may comprise a temperature sensor. A temperature-controlled container may comprise multiple temperature sensors. A temperature sensor of a temperature-controlled container may be disposed within the temperature-controlled container, and may be disposed on the temperature-controlled container, for sensing temperature within and/or outside of the temperature-controlled container. A temperature-controlled container may comprise a memory means, effective to store information. In embodiments, a memory means may comprise electronic memory, which may comprise volatile memory (e.g., "flash" memory), non-volatile memory, magnetic memory, solid-state memory, or other memory device or mechanism known in the art. In embodiments, memory of a temperature-controlled container may comprise memory for recording when a portal was open, and may comprise memory for the time-course of temperature sensed within the temperature-controlled container. In embodiments, memory of a temperature-controlled container may comprise memory for the time-course of temperature sensed in multiple locations within and around the temperature-controlled container.

Figure 13:
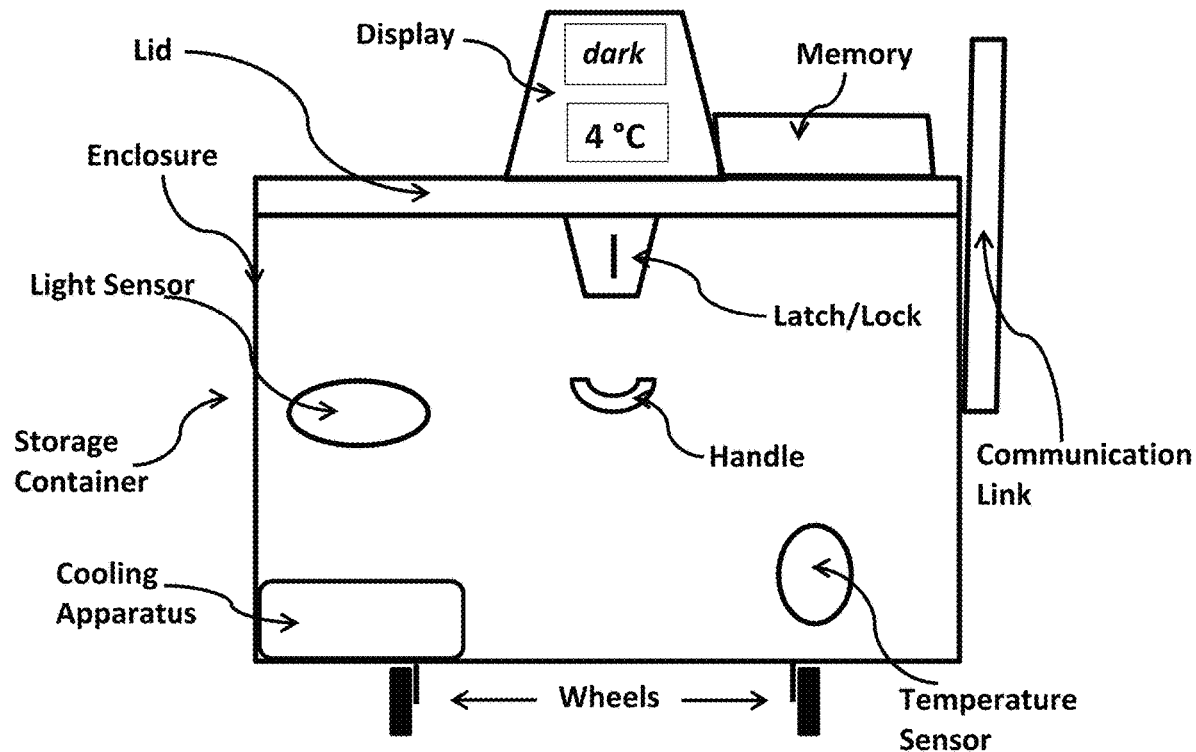
FIG. 13 provides an example of a storage container having a light sensor configured to detect light within the container; a communication link or display; and may have memory. Optional elements, including a temperature sensor, a latch (which may also include a lock); handles, wheels, and a cooling apparatus, are also shown.

FIG. 13 provides an example of a storage container having a light sensor configured to detect light within the container, and so to monitor whether or not the container is properly closed. Such a storage container may also have a temperature sensor configured to sense a temperature within the container; a communication link or display, e.g. for communicating a light level within the container; and may have memory, e.g., memory configured to record internal light levels (e.g., to record high light levels indicative of times and time periods when a door of the temperature-controlled storage container was open). A storage container may be thermally insulated, or may have a cooling apparatus, or both. For example, a storage container may optionally include a cooling apparatus (e.g., a passive cooling apparatus such as ice, dry ice, or other cold material; or an active cooling means, such as a Peltier device, an evaporative cooler, a refrigerator mechanism, or other cooling means). In embodiments, a cooling apparatus may be in functional communication with the interior of a storage container, effective to cool at least a portion of the inside of the container; a cooling apparatus may be entirely within the storage container, may be partially within the storage container, or may be partly or entirely external to the interior of the storage container, and communicate (e.g., via a vent, or aperture, or other communication means) with the interior of the storage container.

As shown, a storage container may also optionally have a latch, which may include a lock; may optionally include a handle, or handles, or other means for maneuvering and manipulating the storage container; may optionally include wheels, or other means to aid in maneuvering and manipulating the storage container. In embodiments, a storage container may be configured to remain in one position for an extended period of time, and may lack wheels, or rollers, or other such elements. A latch, a lock, a handle, a wheel, and other such elements are typically disposed, at least partially, on the outside of a storage container.

A temperature-controlled container may comprise an enclosure and a portal through which materials may be placed in the container, and through which materials may be removed from the container; in embodiments, a portal may be a door, lid, hatch, or other aperture which may, in one configuration, be covered, and in another configuration, provides access to the interior of the container. A portal may be configured to make a tight seal with the enclosure when closed; a tight seal may comprise a water-tight seal, or may comprise an air-tight seal. In embodiments, a tight seal may comprise a light-tight seal.

An insulated or temperature-controlled container may comprise a temperature sensor. A temperature-controlled container may comprise multiple temperature sensors. A temperature sensor of a temperature-controlled container may be disposed within the temperature-controlled container, and may be disposed on the temperature-controlled container, for sensing temperature within and/or outside of the temperature-controlled container. A temperature-controlled container may comprise a light sensor; in embodiments, a light sensor may be disposed within a temperature-controlled container, effective to sense whether, and when, a portal is open.

In embodiments, the storage container further comprises memory. For example, a temperature-controlled container may comprise a memory means, effective to store information. In embodiments, a memory means may comprise magnetic memory, volatile memory (e.g., "flash" memory), non-volatile memory, solid-state memory, bubble memory, or other memory device or mechanism known in the art. In embodiments, memory of a temperature-controlled container may comprise memory for recording when a portal was open, and may comprise memory for the time-course of temperature sensed within the temperature-controlled container. In embodiments, memory of a temperature-controlled container may comprise memory for the time-course of temperature sensed in multiple locations within and around the temperature-controlled container.

A storage container may comprise a communication link, e.g., a display, a Bluetooth connection, a Universal Serial Bus (USB) connection, a firewire connection, an ethernet connection, a cell-phone link, a WiFi connection, or any other communication link effective to provide information to another device, to a courier, to a custodian, or to the cloud. In embodiments, a communication link may be monitored by an operator, so that a sensed light level may be monitored by an operator, and a sensed light level may be noted by such an operator. An operator may be a local operator (e.g., an operator located at the same location as, or near to, the storage container) or may be remote operator (e.g., an operator located at a location different than the location of the storage container). An operator may have custody of a storage container; and may have custody of a storage container and its contents. In embodiments, an operator may monitor a storage container; or may monitor the contents of a storage container; or both. For example, an operator may monitor the light sensor of a storage container; or, via the light sensor, may monitor the light level within the storage container. The light level within a storage container is typically very low, e.g., the interior of a storage container should be dark during storage. In embodiments, the only time that the light level within a storage container would rise would be when the portal is open, typically when material is placed in, or taken out of, the storage container. An extended period of time with a high light level might indicate that the portal of the storage container is open, or ajar; such a situation might lead to exposure of materials within the storage container to sub-optimal storage conditions. For example, stored materials may be light-sensitive, or temperature sensitive, or both. Thus, in embodiments, an operator may monitor the light level within a storage container, in order to detect whether or when the light level may be above a desired level, or outside a desired range. In embodiments, if the light level within the storage container is found to be outside the desired range (e.g., too high), an alert or alarm may be issued. In embodiments, if the light level within the storage container is found to be outside the desired range (e.g., too high) for too long a time (e.g., for longer than a minimum time), an alert or alarm may be issued. In embodiments, an operator may monitor a storage container, including monitoring a storage container display or communications link, in order to detect such an alert or alarm. In embodiments, corrective action may be taken or ordered by an operator upon detection of such an alert or alarm. In embodiments, an operator may have control over a storage container, and the operator may take corrective action. In embodiments, an operator may have remote control over a storage container, and the operator may take corrective action from a remote location. In embodiments, an operator may direct others to take corrective action. In embodiments, remote control or direction of others to take corrective action may comprise use of a communication link.

In addition, in embodiments, an operator may monitor the temperature of a storage container, or of its contents, or may monitor both. In embodiments, an operator may monitor the temperature of a storage container, or of its contents, or may monitor both, in view of a desired temperature range. In embodiments, an operator may have control over the temperature within a storage container, and may have control over the temperature of materials within the storage container. For example, storage of a material may be most effective when such storage is at temperatures within a desired, or optimal, temperature range. In embodiments, if the temperature within the storage container, or of material within the storage container, is found to be outside the desired range, an alert or alarm may be issued. In embodiments, an operator may monitor a storage container, including monitoring a storage container display or communications link, in order to detect such an alert or alarm. In embodiments, corrective action to restore the temperature to within a desired range may be taken or ordered by an operator upon detection of such an alert or alarm.

Thus, in embodiments, a method for the storage of a material further comprises communicating an alarm when said sensed light level exceeds an alarm limit. In embodiments, an alarm is communicated when said light level exceeds a limit for a minimum amount of time.

Methods for the storage of material in a storage container comprise placing material in storage container comprising a light sensor, sensing a light level within the storage container, and communicating the sensed light level, displaying the sensed light level, or both. In embodiments, a storage container may be temperature-controlled storage container.

Figure 14:
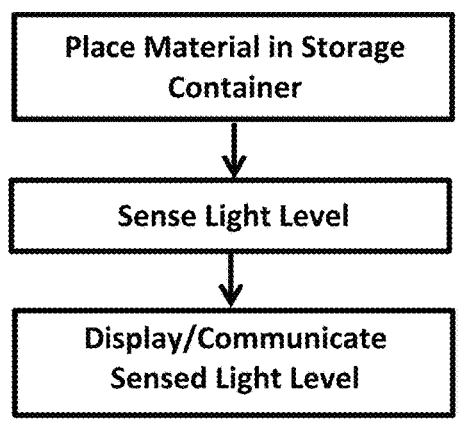
FIG. 14 provides a schematic representation of embodiments of methods for the storage of material in a temperature-controlled storage container, comprising placing material in the temperature-controlled storage container, sensing a light level within the temperature-controlled storage container, and communicating the sensed light level, displaying the sensed light level, or both.

FIG. 14 provides a schematic representation of embodiments of methods for the storage of material in a temperature-controlled storage container having a light sensor, comprising placing material in the temperature-controlled storage container having a light sensor, sensing a light level within the temperature-controlled storage container, and communicating the sensed light level, displaying the sensed light level, or both. In embodiments, a temperature-controlled storage container with a light sensor may also have a temperature sensor. Further embodiments of methods for the storage of material in a temperature-controlled storage container comprise placing material in the temperature-controlled storage container having a light sensor and a temperature sensor, sensing a light level within the temperature-controlled storage container, sensing a temperature within the temperature-controlled storage container, and communicating the sensed light level and sensed temperature; displaying the sensed light level and sensed temperature; or both.

In embodiments, a temperature-controlled storage container with a light sensor may have memory; in embodiments, a temperature-controlled storage container may have a temperature sensor. In embodiments, a temperature-controlled storage container with a light sensor and having memory may have a temperature sensor. In embodiments, methods for storing a material comprise placing material in the temperature-controlled storage container with a light sensor and having memory, sensing a light level within the temperature-controlled storage container, and recording the sensed light level in memory. In some embodiments, as shown in this figure, such methods may further comprise communicating the recorded light level, displaying the recorded light level, or both. In embodiments, methods for storing a material comprise placing material in the temperature-controlled storage container with a light sensor, memory, and having a temperature sensor, sensing a light level within the temperature-controlled storage container, sensing a temperature within the temperature-controlled storage container, and recording the sensed light level and temperature in memory. In some embodiments, as shown in this figure, such methods may further comprise communicating the recorded light level, displaying the recorded light level, or both; and such methods may further comprise communicating the recorded temperature, displaying the recorded temperature, or both.

Figure 15:
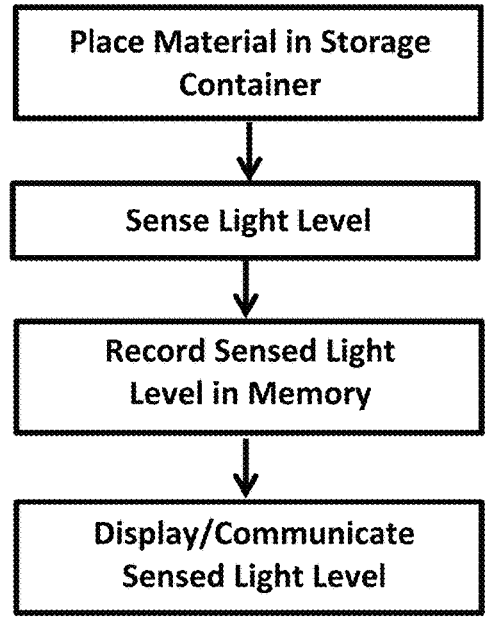
FIG. 15 provides a schematic representation of embodiments of methods for the storage of material in a temperature-controlled storage container having memory. Such methods include placing material in the temperature-controlled storage container having memory; sensing a light level within the container; and recording the sensed light level in memory. Such methods may (optionally) further comprise communicating the recorded light level, displaying the recorded light level, or both.

FIG. 15 provides a schematic representation of embodiments of methods for the storage of material in a temperature-controlled storage container having memory. Such methods disclosed herein comprise placing material in the temperature-controlled storage container having memory, sensing a light level within the temperature-controlled storage container, and recording the sensed light level in memory. In some embodiments, as shown in this figure, such methods may further comprise communicating the recorded light level, displaying the recorded light level, or both.

Light levels, or temperature levels, or both, in a storage container may be monitored. For example, light or temperature levels within a storage container may be monitored by an operator; the operator may be a local operator or a remote operator. Such monitoring may include monitoring of a display, or of a communication link, or both. In embodiments, if the light level or temperature within the storage container, or if the temperature of material within the storage container, is found to be outside the desired range, an alert or alarm may be issued. In embodiments, if the light level or temperature within the storage container, or if the temperature of material within the storage container, is found to be outside the desired range for too long a period of time, an alert or alarm may be issued. In embodiments, an operator may monitor a storage container, including monitoring a storage container display or communications link, in order to detect such an alert or alarm. In embodiments, corrective action to restore the temperature to within a desired range may be taken or ordered by an operator upon detection of such an alert or alarm.

Thus, in embodiments, a method for the storage of a material further comprises communicating an alarm when said sensed light level exceeds an alarm limit. In embodiments, an alarm is communicated when said light level exceeds a limit for a minimum amount of time. In embodiments, a method for the storage of a material further comprises communicating an alarm when a temperature level exceeds an alarm limit. In embodiments, an alarm is communicated when the temperature level exceeds a limit for a minimum amount of time.

Figure 16:
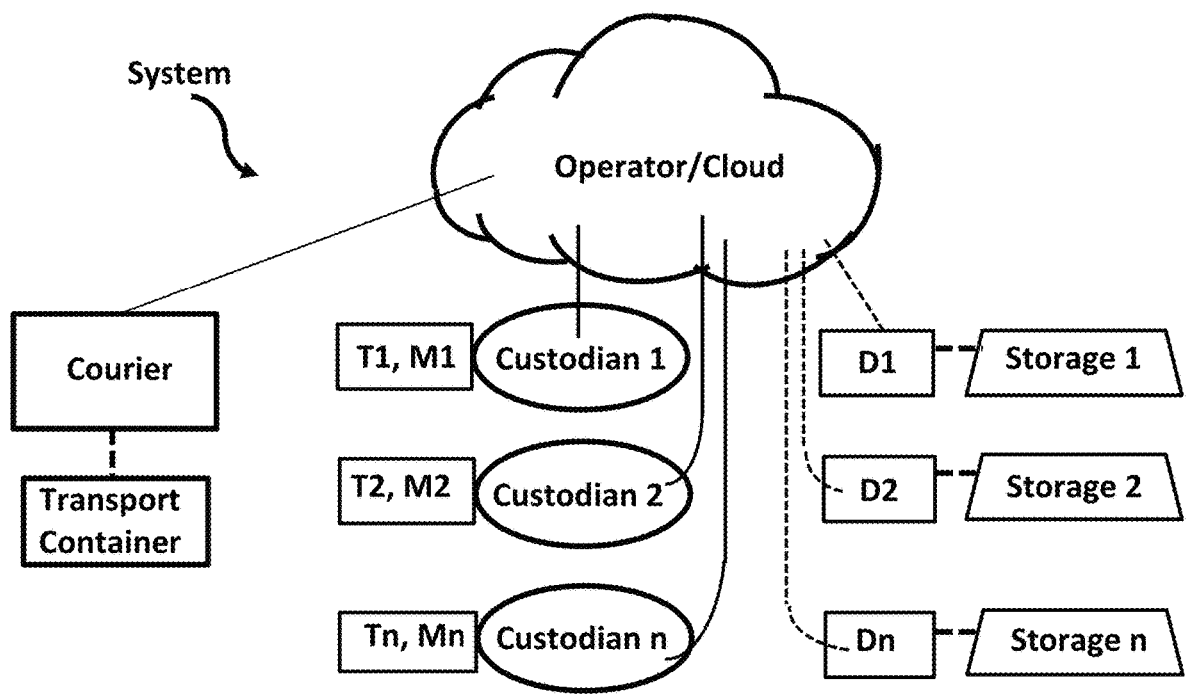
FIG. 16 provides a schematic representation of an embodiment of a system for the secure transport of materials. As shown, a system for the secure transport of materials may comprise a courier (or multiple couriers, not shown); transfer locations (e.g., T1, T2, and so on, including Tn); materials to be transported (e.g., M1, M2, and so on, including Mn); custodians (e.g., Custodian 1, Custodian 2, and so on, including Custodian n); destinations to receive the materials (e.g., D1, D2, and so on, including Dn); and an operational element (shown as an operator/cloud). Communication links are indicated in the figure by thin lines (the communication links indicated by dashed lines to the destinations are optional links). In addition, as indicated by the dashed lines, a courier may optionally use or comprise a transport container, and a destination may optionally use or comprise a storage container.

FIG. 16 provides a schematic representation of an embodiment of a system for the secure transport of materials. As shown, a system for the secure transport of materials may comprise a courier (or multiple couriers, not shown); one or more transfer locations (e.g., T1, T2, and so on, including Tn); one or more materials to be transported (e.g., M1, M2, and so on, including Mn); one or more custodians (e.g., Custodian 1, Custodian 2, and so on, including Custodian n); one or more destinations to receive the materials (e.g., D1, D2, and so on, including Dn); and an operational element (shown as an operator/cloud, where the operator may be a person, the cloud may comprise software and/or hardware configured to aid in the authentication of a courier, monitor material, monitor a transport container, and perform other functions). The cloud may comprise, for example, a remote service which may comprise software, hardware, and a communication link for receiving, e.g., location, time, and identification information (and optionally status, environmental, and other information as well).

Communication links are indicated in the figure by thin lines (the communication links indicated by dashed lines to the destinations are optional links) In addition, as indicated by the dashed lines, a courier may optionally use a transport container (e.g., material may be placed in a transport container for transport from a transfer location to a destination). In addition, as indicated by the dashed lines, a destination may optionally use a storage container (e.g., material may be placed in a storage container at a destination).

A system as illustrated in FIG. 16 is useful for the secure transport of material, e.g., for transporting material from one or more transfer locations to one or more destinations in such a way that material is provided only to authenticated couriers at the correct transfer locations, and thus to insure the integrity and authenticity of the transported materials. A courier may visit one transfer location (e.g., location T1) to pick up a material (e.g., material M1 at location T1). A custodian (Custodian 1) may be present at transfer location 1, and may have custody of material M1. As disclosed herein, material is only transferred to a courier when a proper courier is present at the correct transfer location, at the correct time, and has a unique, single-use authorization code issued only when the courier is present at that transfer location. As further indicated in the figure, additional transfer locations (e.g., transfer location T2 and others, indicated in general by the transfer location labeled Tn), additional materials, (e.g., material M2 and other materials, indicated in general by the material labeled Mn), and additional custodians (e.g., Custodian 2 at transfer location T2, and others, indicated in general by Custodian n at transfer location Tn). As shown, a courier may have, may carry, or may use a transport container, e.g., to transport material from a transport location to a destination. As shown, a destination may use a storage container, e.g., to store material delivered to a destination.

Figure 17:
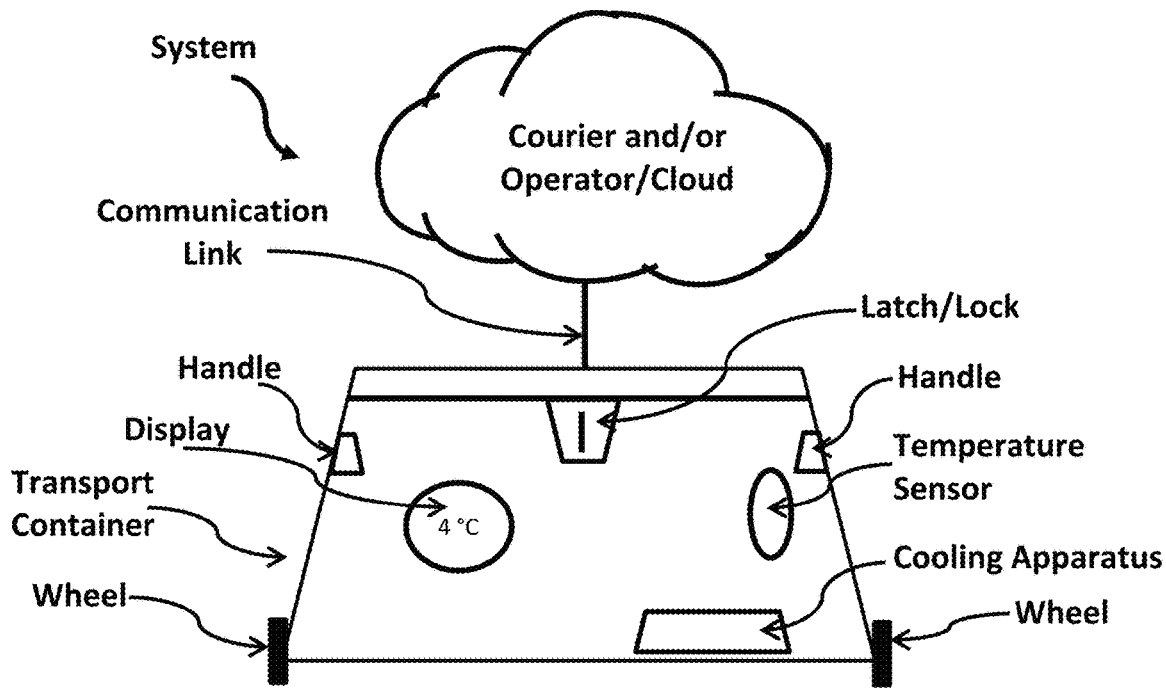
FIG. 17 provides a schematic representation of a system comprising a transport container having a temperature sensor and a communication link (and optionally a display); and an operational element (shown as a courier, and/or an operator/cloud). A communication link may be configured to communicate or display (or both) a sensed temperature.

FIG. 17 provides a schematic representation of a system comprising a transport container as disclosed herein. In embodiments, a transport container may include a temperature sensor, a cooling apparatus, and other elements, which may be disposed, at least partially, within the transport container, or may communicate with the interior of the transport container. A latch, a lock, a handle, a wheel, and other such elements may be disposed, at least partially, on the outside of a transport container. A system comprising a transport container includes a transport container having a temperature sensor and a communication link (and optionally a display); and an operational element (shown as a courier, and/or an operator/cloud, where the courier may use a transport container; where an operator may be a person; and the cloud may comprise software and/or hardware configured to aid in the authentication of a courier, monitor material, monitor a transport container, and perform other functions). A communication link may be configured to communicate or display (or both) a sensed temperature.

Figure 18:
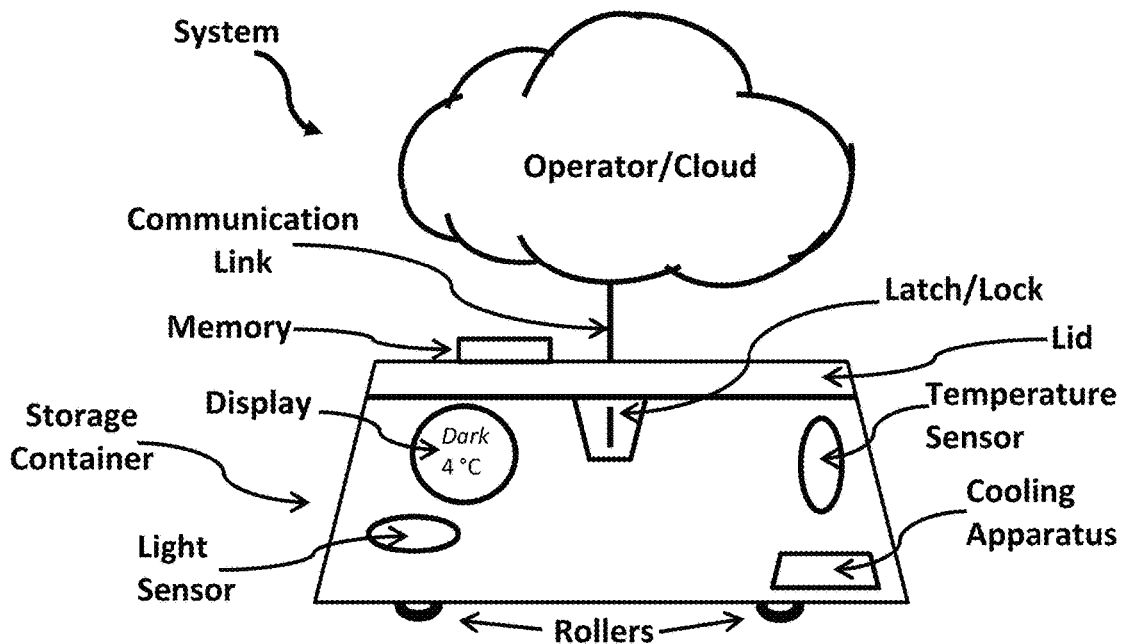
FIG. 18 provides a schematic representation of a system comprising a storage container having a light sensor (and optionally a temperature sensor); a communication link (and optionally a display); and an operational element (shown as an operator/cloud). A communication link may be configured to communicate or display (or both) a sensed temperature.

FIG. 18 provides a schematic representation of a system comprising a storage container as disclosed herein. In embodiments, a storage container may include a light sensor, a temperature sensor, a cooling apparatus, and other elements, which may be disposed, at least partially, within the storage container, or may communicate with the interior of the storage container. In embodiments, a latch, a lock, a handle, a wheel, and other such elements may be disposed, at least partially, on the outside of a storage container. A system comprising a storage container includes a storage container having a light sensor (and optionally a temperature sensor), and a communication link (which may include a display, and may include a wireless link, or other communication link); and an operational element (shown as an operator/cloud, where the operator may be a person, the cloud may comprise software and/or hardware configured to aid in the authentication of a courier, monitor material, monitor a transport container, and perform other functions). A communication link may be configured to communicate or display (or both) a sensed temperature.

Examples of ways to verify the identity of a courier, and to verify authorization of that courier to pick up and transport material include electronic, optical, acoustic, chemical, biochemical, and other verification means. Examples of ways to verify the identity of a custodian, and to verify authorization of that custodian to transfer material to a courier, include electronic, optical, acoustic, chemical, biochemical, and other verification means. Similar means may be used to verify the identity of material to be transported. For example, electronic, optical, acoustic, chemical, biochemical, or other information acquired from observing or testing the identity of a courier, or of a custodian, may be compared to information in a secure database (e.g., a secure database that includes identifying information about couriers, in particular, includes identifying information regarding the individual courier designated to be at a location at a particular time; or, e.g., a secure database that includes identifying information about custodians, in particular, includes identifying information regarding the individual custodian designated to be at a location, or to have custody of a material or materials). One or more of such electrical, optical, acoustic, chemical, biochemical, or other information may applied for facial recognition; voice recognition; motion recognition (e.g., video analysis of an individual's gait or other motion recognition); identifying mark recognition (e.g., image analysis of physical characteristics such as moles, ear shape, eye shape, eye separation, tattoos, or other individual characteristics, and combinations thereof); hand recognition (e.g., from palm print, finger characteristics, or other hand feature or combination of features); finger print recognition; retinal recognition (e.g., by retinal scan); DNA or other identifying biochemical feature recognition (e.g., from blood droplet, cheek swab, saliva, hair, skin, or other sample); recognition by analyses such as, e.g., breath analysis; neurological or other electrophysiological analysis (e.g., electroencephalograph (EEG), electrocardiograph (EKG), electroretinograph (ERG), electromyograph (EMG), or other analysis, and combinations thereof) whether passive or accompanied by presentation of stimuli, and combinations thereof; or other means of recognition or analysis which is useful for recognizing and identifying a subject (e.g., a courier, or a custodian, or both).

Devices and systems which may be used to aid or achieve such recognition and identification of a subject, such as a courier or a custodian, include cameras and other optical and video equipment; finger print scanners; microphones; breathalyzers; electronic chips or devices (e.g., RFID or other devices which may be produced, provided, or authorized by a third party, and which may be embedded or may be wearable (e.g., attached to the skin, or inserted under the skin, or worn as jewelry or clothing; see e.g., U.S. Pat. Nos. 7,291,497 and 8,101,402, incorporated by reference herein in their entirety); dissolvable or non-dissolvable pills (e.g., which may be taken by a courier or custodian prior to arrival of a courier at a location, and which may be detected at a transfer or destination location; non-dissolvable pills may be recovered after ingestion, while dissolvable pills will typically not be recoverable; see e.g., U.S. Pat. No. 8,101,402, incorporated by reference herein in its entirety); wearable electronic glasses; hand-held or otherwise portable devices (e.g., tokens which may receive and display updated code or encryption information); cell-phone applications which require codes or other special authorization or input for successful use; identity cards, identifying rings, bracelets, and other devices and elements useful for the recognition of and identification of a courier, custodian, or other person whose identity should be confirmed. Such devices and elements may be isolated, and may be usable independent of other devices or elements; or may be integrated as part of a multifunctional device, such as a phone, or computer, or car, or other device, machine, or instrument; or may be configured to work with a multifunctional device, such as a phone, or computer, or car, or other device, machine, or instrument; or combinations thereof.

Applications used to identify a courier, a custodian, material to be transported, and combinations of these may be run on cellphones, tablets, laptop computers, desktop computers, and other devices. Such applications may be resident on such devices, may be resident on a server or on multiple servers, or combinations thereof. A server may be located at a sample collection location (SCL), and that server may be a server which communicates with a Patient Service Center (PSC) application, a Courier Tracking System (CTS) application, or both. A server may be located at a location other than at a SCL location, and that server may be a server which communicates with a PSC application, a CTS application, or both. In embodiments, a PSC application, a CTS application, or both, may communicate with more than one server, and may communicate with more than one location. Such a server, or such servers, may be referred to as "cloud servers" or as the "cloud."

EXAMPLES

Example 1

This example discusses the transport of clinical samples, such as blood samples, urine samples, throat swab, cheek swab, or other clinical samples, from a sample collection location (SCL) to an analysis location. For example, in embodiments, clinical samples may be collected at a physician's office, a clinic, a hospital, a sample collection center, a retail pharmacy, a supermarket, or other location, and may be transported to, e.g., a central laboratory for analysis (e.g., a Clinical Laboratory Improvements Amendment (CLIA)-certified laboratory). In the following, "CTS" stands for Courier Tracking System. For example, a courier may carry a cellphone, and the cellphone may run CTS, where CTS is the mobile application that is deployed on the courier's phone which talks to the point-of-service (POS) system (equipment and software in use at or by the sample collection location and its personnel). The system at the POS location includes the PSC (Patient Service Center) application that technicians use to process samples daily at the SCL (e.g., a POS location such as a physician's office, a clinic, a hospital, a retail pharmacy, a supermarket, or other service location).

Examples of steps followed in methods for transferring material include the following; note that, in embodiments, the order of such steps may vary.

1. A courier (with a cellphone) arrives a SCL, such as a physician office, clinic, hospital, retail pharmacy, supermarket, or other service location where blood or other clinical sample may be collected for transport (e.g., to a central laboratory for analysis). A technician present at the SCL has custody of the material to be transported (e.g., a technician may be a custodian).

2. The courier uses a CTS application operating on a cellphone, tablet, laptop, other mobile computing device, or a custom instrument (or any other device capable of reading and displaying information, codes, and symbols), to begin a new pickup by enabling the "Begin Pickup" function; i.e., the courier clicks "Begin Pickup" on the CTS application. For simplicity, and not by way of limitation, in further discussion of the present example, the CTS application will be described as running on a cellphone.

3. The CTS application displays an identifying code, symbol, or signal (e.g., a QR code, a barcode, a symbol, a password, or other identifying code or symbol) on the cellphone display, which may be scanned at the SCL by the equipment and software in use at the SCL (e.g., the PSC application). In embodiments, an identifying code, symbol, or signal may be, or may include, a near-field communication (NFC) signal, a radiofrequency signal, or other signal which may be detected by the PSC. The PSC application may operate on a cellphone, tablet, laptop, other mobile computing device, desktop computer, a custom instrument, or any other device capable of reading and displaying information, codes, and symbols. The terms "scan", "scanned", "scanning" and the like are used in these examples and are not meant to be limiting; it will be understood that "scan", "scanned", "scanning" and the like as used in these examples includes any method of detecting, reading, or identifying a code, symbol, or signal that identifies a courier, a technician, a sample, a container, or other person or object to be identified. For simplicity in the following, and without limitation, the identifying code, symbol, or signal will be described as a QR code.

4. After the QR code displayed on the courier's cellphone is scanned, the CTS application displays an image of the courier with the courier's name and ID number, which is compared to the information displayed in the PSC application to confirm the courier's identity. The technician uses the PSC application and the technician's own observations and comparisons to verify the courier's identity.

The above steps 1 to 4 provide steps for methods of identifying a courier. Methods of transferring material may include such methods. In addition, further steps may be included in methods of transferring material as disclosed herein. For example, methods of transferring material may also include the following steps.

5. The PSC application displays the same information for the technician at the SCL as is displayed for the courier by the CTS. Thus, once a technician (e.g., a custodian holding clinical samples to be transported to the central facility) confirms the identity of the courier using the PSC application, the PSC application may display a QR code, a barcode, or other identifying code, symbol, or signal (as discussed above with regard to identifying a courier) which the courier may verify by scanning with the courier's cellphone, or by other means. The PSC application displays an image of the technician, and may display the technician's identification particulars (e.g., name, ID number, etc.) which may be compared to the information displayed in the CTS application to confirm the technician's identity. The courier uses the CTS application and the courier's own observations and comparisons to verify the technician's identity.

6. The transfer of material is authorized once the technician at the SCL verifies that the courier's information matches the information displayed by the PSC application, and once the courier verifies the technician's identity using the CTS application. Upon such authorization, the courier can begin scanning containers of material to be transported (e.g., where the material to be transported is held in containers). Such scanning may be used to confirm the identity of the material presented for transport; may be used to determine that all the material to be transported has indeed been provided (e.g., that the material to be transported is a complete load, and that no material is missing) or that no unauthorized or unidentified material is included in the material to be transported. Such scanning may include scanning of identifying codes, marks, symbols, or other identification on individual samples or individual sample containers (e.g., vials, tubes, or other containers holding individual samples). Such scanning may include scanning of identifying codes, marks, symbols, or other identification on containers (e.g., crates, boxes, specialized containers, and other shipping containers) which hold multiple individual samples or sample containers. Such scanning may include scanning of individual containers and of containers holding one or more of such individual containers.

For example, a PSC may provide an inventory of material present at the transfer location, which identifies the material to be transferred to the courier for transport. A technician at the SCL may use such an inventory to assemble the material, and to identify material to transfer to the courier. For example, a CTS application may provide a courier with an inventory of material that is authorized for transport, which identifies the material to be transferred from the SCL to the courier for transport to a destination. A courier may use such an inventory to identify material to accept from a technician, and to transport the material to a destination location.

Further exemplary steps may be performed as part of methods for transferring material for transport; for transporting material; and other methods. For example, such methods may optionally include the following steps:

7. The scanning of containers provides an inventory of material present at the SCL; such an inventory of material present at the SCL may be retained by the courier, may be communicated by the courier to a central location, may be carried by the courier to a destination location, and combinations thereof.

8. The scanning of containers provides an inventory of material transferred to the courier; such an inventory of material transferred to the courier may be retained by the courier, may be communicated by the courier to a central location, may be carried by the courier to a destination location, and combinations thereof.

9. The scanning of containers provides an inventory of material to be transported, and, after such transport, provides an inventory of transported material; such an inventory of material to be transported, and of transported material, may be retained by the courier, may be communicated by the courier to a central location, may be carried by the courier to a transport destination location, and combinations thereof.

Example 2

This example discusses steps taken during secure transport of materials, and provides illustrations of exemplary images which may be displayed by an application such as a CTS application or a PSC application for use in secure transport of materials as disclosed herein.

Figure 19:
FIG. 19 provides an example of a screen (which may be displayed, for example, on a smart-phone, tablet, computer, Google Glass or other wearable computer or communication device, or other device having a display) that provides an address of a transport location; other location information, such as, e.g., further stops on a route, landmarks, gas station locations, and other locations of use to a courier may also be provided. Such a screen may also provide other information (including map and route information, alternate route information, traffic information, weather information, information about construction being performed along or near a route, identification information regarding couriers, custodians, and other personnel involved in the secure transport of material, and other information). Such a screen may be used in a Courier Tracking System (CTS) application having features and uses as disclosed herein.

As shown in FIG. 19, a CTS application may display a screen that provides an address of a transport location, such as the next stop in a route, and other location information and contact information regarding the location. FIG. 19 also shows that a CTS application may display a screen that provides a map indicating the location of that address in relation to streets and other landmarks (which may, for example, aid a courier in arriving at a location, or allow a courier to plan alternate routes, e.g., to avoid traffic obstructions or in response to weather conditions). A CTS application may compute and provide preferred and alternate routes, which may be updated in view of weather, traffic, construction, or other information. Such weather, traffic, construction, or other information may be automatically collected and considered by the CTS application, or by the PSC application, or both, and may update expected arrival times, routes, and other information and instructions to a courier, a technician, or both.

As shown in FIG. 19, a CTS application may display a screen that provides identifying and contact information about personnel at the next (or other) stop on a route. As shown in FIG. 19, a CTS application may provide further information, or may provide links to further information, related to a location on a route. A CTS may include global positioning system capabilities, so that the location of the courier is provided to a central location at all times, or at designated times, or as needed; and may provide a courier with the courier's location, or provide maps related to the courier's location and/or destination. In addition, a CTS may display information not directly related to a route, but which may be useful or relevant to the secure transport of materials (e.g., the time, phone status, or other information).

The CTS is an active application, providing communication between a courier and a central location; such communication is typically encrypted and may be via the "cloud." For example, a courier arriving at a location will select "Begin Pick-Up" (shown at the bottom right of the image shown in FIG. 19). Selection of "Begin Pick-Up" causes a call to be made to a server (e.g., via cellphone link, Wi-Fi, or other linkage, typically including an internet link). Such a call is typically encrypted. The call to the server prompts the server to validate the courier by confirming that the courier is at the correct location (e.g., via GPS, cellphone-signal triangulation, or other location means), at the correct time, and is authorized to complete the pick-up. If the courier is not at the correct location for that pick-up, or the time is incorrect for that pick-up (e.g., the courier arrives at a time that is outside the designated time window) then authorization fails. If authorization proceeds (e.g., the courier is at the correct location at the correct time) then the server generates a QR code that is unique to that specific pick-up, and sends it to the courier.

Figure 20:
FIG. 20 provides an example of a CTS screen that provides authorization information, for use following the arrival of a courier at the proper location within the proper time-frame. The example shown includes a QR code, which may be scanned by a custodian at a transfer location for verification of the courier prior to transfer of material.

FIG. 20 presents an image of a screen that may be displayed by an exemplary CTS application following authorization of a courier as being present at the proper location at the proper time. A technician at the transfer location will scan the QR code displayed by the courier's cellphone. The transfer location technician's scanning of the QR code is performed by the PSC application. The scanned QR code information is sent by the PSC application to a server. In embodiments, the server to which the scanned QR code information is sent for validation may be the same server as the one which authorized the courier; or may be the same server as the one which generated the QR code; or both; this communication is typically encrypted as well. In embodiments, the server to which the scanned QR code information is sent for validation may be the in communication with the server which authorized the courier; or may be may be the in communication with the server which generated the QR code; or both; this communication is typically encrypted as well. In embodiments, the server to which the scanned QR code information is sent for validation may be a different server than the server which authorized the courier; or may be a different server than the one which generated the QR code; or may be a different server than both; this communication is typically encrypted as well. The PSC is an active application, providing communication between a technician and a central location; such communication is typically encrypted and may be via the "cloud."

A QR code is typically only valid for a certain amount of time after its generation by the CTS application, and is only valid at one location (the specific location for which it was generated). The server validates the QR code if it meets the required criteria, and transmits an image of the authorized courier to the technician at the location (e.g., via the PSC application). The technician then compares the image displayed by the PSC application to the courier present at the location; if the technician is confident that the courier is the proper courier, the transfer may proceed.

Figure 21:
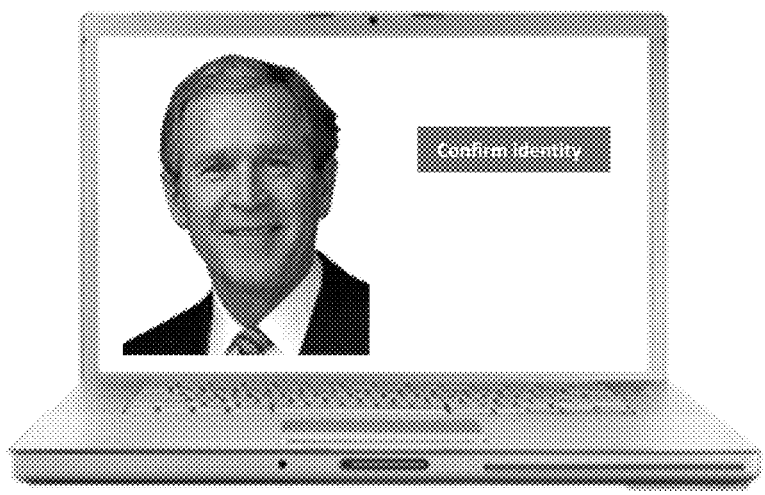
FIG. 21 provides an example of a screen generated by a Patient Service Center (PSC) application upon verification of the courier being a proper courier present at a proper time at the proper location (following scanning of the QR code shown in FIG. 20, or similar verification of the custodian). The PSC application presents an image of the proper courier; the PSC application provides a means for (and typically requires) the technician to confirm that the courier present at the location matches the image and is the correct courier. As shown in this figure, such confirmation may be performed by clicking on the button on the screen and entering a password.

As shown in FIG. 21, upon presentation of the courier's image, and subsequent identification that the courier at the location is the proper courier, the PSC application presents a button asking the technician to confirm the identity of the courier is correct; this may be done by clicking on the button on the screen and entering a password, as indicated in FIG. 21. Following such verification of the courier by the technician at the transfer location, the PSC application sends the technician's information to the server. The server then compares the technician's credentials (e.g., identity, whether or not the technician is at the proper location at the proper time, whether or not the technician is authorized to make the transfer, and optionally other identifying information) and if the technician meets the criteria, verifies the technician as being at the correct location and as being authorized to transfer the material. The server then transmits an image of the technician for display by the CTS application to the courier.

Figure 22:
FIG. 22 provides an example of a screen generated by the CTS following confirmation of the courier by the PSC. This screen provides an image of the personnel that should be present at the transfer location at that time; the courier must confirm that the personnel (e.g., custodian or technician) at the transfer location is indeed the proper person by comparing the image on the CTS screen to the person present at the transfer location. Such confirmation may be performed, e.g., by clicking the "Next" the button on the screen.

An image of the CTS screen showing an image of the technician is shown in FIG. 22. The courier then inspects the image of the technician, compares the image to the technician present at the location, and, if the image and the technician match, confirms the identity of the technician by clicking on "Next" on the CTS display. This allows the courier and technician to proceed with the pick-up.

Figure 23:
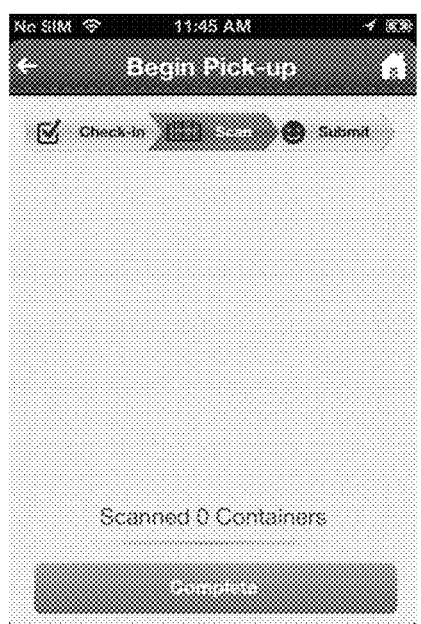
FIG. 23 provides an example of a CTS screen for use in scanning material to be transferred following confirmation of the personnel at the transfer location. The CTS (running, for example, on a cell-phone or tablet which includes a camera) may be used to scan material which has identifying markings such as bar codes, QR codes, or other marks or codes. Such scanning may be used to prepare a list of material transferred, may be used to compare the material present to be transferred with a list of material expected to be, or scheduled to be, transferred; and may be used to alert destination locations of the material that will be arriving when the courier reaches the proper destination with the material; such alerts may be useful in preparing for operations and analysis to be performed on the material upon its arrival at a destination, or to prepare for storage of the material, or for other uses.

As shown in FIG. 23, the CTS display then moves on to the "Scan" screen, where the cellphone may be used to scan material for pick-up. For example, the material may be held in containers, each of which has a bar-code, or QR code, or other identifying mark or device which allows the container to be scanned, thus identifying the container and its material to the CTS application. For example, the material may be identified by an inventory list which includes a listing of material held in an identified container. Scanning may include scanning of a container holding multiple samples, may include scanning individual containers (e.g., vials, tubes, or other containers) holding individual samples, or both. The CTS application can then communicate this information to the server, for comparison with the material expected to be present; to provide the server with a list of material transferred during the pick-up; to allow tracking of the material as it is transported from one location to another; and for other purposes.

Example 3

This example discusses secure transfer of materials, where the materials may be transferred from a custodian at a first location to a courier for transport of the material to a second location, or may be transferred from a courier who has transported the material from a first location to a custodian at a second location. For example, a courier may arrive at a transport location comprising a sample collection location (SCL), where clinical samples, such as blood samples, urine samples, throat swab, cheek swab, or other clinical samples, are awaiting transport from the SCL to an analysis location. For example, clinical samples may be collected at a physician's office, a clinic, a hospital, a sample collection center, a retail pharmacy, a supermarket, or other location, and may be transported to, e.g., a central laboratory for analysis (e.g., a CLIA-certified laboratory). It will be understood that the methods discussed herein may be applied to other combinations of locations, custodians, and couriers, and to any material as well.

Prior to, or upon arrival at the SCL, a courier ingests a pill, which may be a dissolvable pill or may be a non-dissolvable pill. The pill is detectable at the SCL; in addition, a non-dissolvable pill may be recovered after ingestion by the courier. However, dissolvable pills are typically not recoverable. A dissolvable pill may be useful as an identifier for a limited time after ingestion due to degradation as it dissolves. A non-dissolvable pill may be useful as an identifier for a very long, or practically unlimited time after ingestion and before elimination; or, in embodiments, a non-dissolvable pill may be useful as an identifier for a limited time (e.g., may include a timer or other means to inactivate its identifying properties at a desired time or duration after ingestion). Limiting the time period after ingestion that the pill is useful as an identifier provides further verification that the courier is the proper courier at the proper location at the proper time. For example, a pill may be useful as an identifier for only 30 minutes after ingestion; or may be useful as an identifier for only 20 minutes after ingestion; or may be useful as an identifier for only 10 minutes after ingestion; or may be useful as an identifier for another limited time period after ingestion.

A pill may be detectable subsequent to ingestion by the courier; for example, a pill may be radio-opaque, and so may be detectable by X-ray or other scan, allowing identification and verification that the courier is the proper courier. A pill may reflect electromagnetic radiation, and so be detectable by reflection of radiation directed at or to the courier, and the reflection or reflections may be used to identify and verify that the courier is the proper courier. A pill may reflect ultrasonic radiation, and so be detectable by reflection of ultrasound applied to or directed at the courier, and the reflection or reflections may be used to identify and verify that the courier is the proper courier. A pill may include active elements, containing battery or other power (e.g., power derived from salt or osmotic imbalances between the device and bodily fluids, or means to receive power from an external source such as, e.g., an antenna or piezoelectric element for providing power from electromagnetic, ultrasound or other energy), which active elements emit detectable radiofrequency, infrared, or other signals and are thereby detectable and may be used to identify and verify that the courier is the proper courier. A pill may include active elements that respond to incident signals or energy and are thereby detectable and may be used to identify and verify that the courier is the proper courier; such active elements may include their own power source (e.g., battery power, or power derived from salt or osmotic imbalances between the device and bodily fluids), may use power from an external source (e.g., as discussed above), or may otherwise use incident signal energy to provide a detectable signal. A pill may produce an observable effect on the courier; for example, it may affect the appearance of the skin, or eyes, or tongue, or fingernails, or other observable portion of the courier, and the observable effect may be used to identify and verify that the courier is the proper courier. As discussed above, a courier may be the proper courier only at one time, or only during a particular time period; the use of a pill, particularly of a pill that is useful as an identifier for a limited time period, is useful for providing identification and verification of the courier at the proper time.

An example of an identification and verification procedure includes the following: a courier arrives at a SCL; the courier takes a pill the pill transmits a signal indicating that the courier is the correct courier for 30 minutes; the signal is detected at the SCL within 30 minutes of the arrival of the courier at the SCL; and the courier is properly identified and verified as a proper courier.

A further example of an identification and verification procedure includes the following: a courier arrives at a SCL; the courier takes a pill; the pill transmits a signal indicating that the courier is the correct courier for 30 minutes; the signal is detected at the SCL within 30 minutes of the arrival of the courier at the SCL; and the courier is properly identified and verified as a proper courier; the custodian takes a pill; the pill taken by the custodian transmits a signal indicating that the custodian is the correct custodian for 30 minutes; the signal is detected by the courier within 30 minutes of the arrival of the courier at the SCL; and the custodian is properly identified and verified as a proper custodian.

A further example of an identification and verification procedure includes the following: a courier arrives at a SCL; the courier takes a pill; the pill transmits a signal indicating that the courier is the correct courier for 30 minutes; the signal is detected at the SCL within 30 minutes of the arrival of the courier at the SCL; and the courier is properly identified and verified as a proper courier; the custodian takes a pill; the pill taken by the custodian transmits a signal indicating that the custodian is the correct custodian for 30 minutes; the signal is detected by the courier within 30 minutes of the arrival of the courier at the SCL; and the custodian is properly identified and verified as a proper custodian; the custodian and the courier shake hands; the pills (the pill taken by the courier and the pill taken by the custodian) detect and verify each other; upon confirmation by the pills that their counterpart is the proper counterpart pill, a signal is provided indicating that each pill has verified the other pill; and the transfer of material at that location and at that time is properly authorized.

Example 4

This example discusses secure transfer of materials, where the materials may be transferred from a custodian at a first location to a courier for transport of the material to a second location, or may be transferred from a courier who has transported the material from a first location to a custodian at a second location. For example, a courier may arrive at a transport location comprising a SCL, where clinical samples, such as blood samples, urine samples, throat swab, cheek swab, or other clinical samples, are awaiting transport from the SCL to an analysis location. For example, clinical samples may be collected at a physician's office, a clinic, a hospital, a sample collection center, a retail pharmacy, a supermarket, or other location, and may be transported to, e.g., a central laboratory for analysis (e.g., a CLIA-certified laboratory). It will be understood that the methods discussed herein may be applied to other combinations of locations, custodians, and couriers, and to any material as well.

A courier may have, or may carry, an electronic chip or electronic device which identifies the courier and serves to, at least in part, verify that the courier is the correct courier and has proper authorization to perform the transfer of materials (e.g., to collect the material to be transported, or to deliver the material to be delivered, or both), at that time. A courier may have, or may carry, more than one such electronic chip or electronic device. The electronic chip or electronic device may be carried by the courier; may be embedded in the courier (e.g., inserted under the skin, or woven into the courier's hair) or may be wearable (e.g., on a wrist, around the neck, around an ankle, around the waist, on the head, a leg, or torso) as an ornament, as clothing, or attached to clothing.

An electronic chip or electronic device may include RFID or other electronic devices, whether passive or active. Such electronic chips or electronic devices may be used alone, or in conjunction with other identification and verification devices, including serial numbers, bar codes, identifying markings, identification cards, badges, identity cards, identifying rings, bracelets, or other insignia, documentation, or verification.

An electronic chip or electronic device may be configured to provide proper identification or authorization only when worn, in contact with, or embedded in, the proper courier. For example, the electronic chip or electronic device may determine that the wearer, or person with whom it is in contact, or is embedded in, is a proper courier by use of identifying characteristics selected from protein markers (e.g., major histocompatibility markers and patterns); genetic markers (e.g., DNA or RNA sequences which identify the courier); heart-rate, breathing patterns, galvanic skin responses, and other physiological patterns which identify the courier; or other identifying characteristics.

Example 5

This example discusses secure transfer of materials, where the materials may be transferred from a custodian at a first location to a courier for transport of the material to a second location, or may be transferred from a courier who has transported the material from a first location to a custodian at a second location. For example, a courier may arrive at a transport location comprising a SCL, where clinical samples, such as blood samples, urine samples, throat swab, cheek swab, or other clinical samples, are awaiting transport from the SCL to an analysis location. For example, as discussed above, clinical samples may be collected at a physician's office, a clinic, a hospital, a sample collection center, a retail pharmacy, a supermarket, or other location, and may be transported to, e.g., a central laboratory for analysis (e.g., a CLIA-certified laboratory). It will be understood that the methods discussed herein may be applied to other combinations of locations, custodians, and couriers, and to any material as well.

A courier may be subjected to an iris scan upon arrival at the SCL. The result of such an iris scan, when compared to the expected results of an iris scan for the proper courier, is used to verify that the courier is the correct courier and has proper authorization to perform the transfer of materials (e.g., to collect the material to be transported, or to deliver the material to be delivered, or both), at that time. An iris scan may be performed on only one eye; or may be performed on both eyes, of the courier.

Other identifying elements, such as facial appearance, ear shape, voice-print, and other personal identifying characteristics, may also be used, either in conjunction with an iris scan, or in place of an iris scan.

Example 6

This example discusses secure transfer of materials, where the materials may be transferred from a custodian at a first location to a courier for transport of the material to a second location, or may be transferred from a courier who has transported the material from a first location to a custodian at a second location. For example, a courier may arrive at a transport location comprising a SCL, where clinical samples, such as blood samples, urine samples, throat swab, cheek swab, or other clinical samples, are awaiting transport from the SCL to an analysis location. For example, as discussed above, clinical samples may be collected at a physician's office, a clinic, a hospital, a sample collection center, a retail pharmacy, a supermarket, or other location, and may be transported to, e.g., a central laboratory for analysis (e.g., a CLIA-certified laboratory). It will be understood that the methods discussed herein may be applied to other combinations of locations, custodians, and couriers, and to any material as well.

A courier may be subjected to a genetic test upon arrival at an SCL. A courier arriving at a SCL is required to provide a cheek swab, or sample of saliva, or hair follicle, or other source of identifying genetic material; the material thus provided is then tested to determine the identity of the courier. If the results of the test verify that the courier is the proper courier, and if the proper courier is present at the proper time, the transfer of material is authorized.

Example 7

In the preceding Examples, and elsewhere in the present application, examples of identification and of verification of a courier are provided; it will be understood that such methods of identification and verification may also be applied to a custodian at a location, and the identification and verification of the custodian thereby achieved.

In the preceding Examples, and elsewhere in the present application, examples of transport of material, such as clinical samples, have been discussed; in these examples, a courier arrives at a location with material, or arrives at a location to pick up material, and the identification of the courier is verified, followed by verification of the technician who is receiving the material, or who is in possession of the material to be picked-up. It will be understood that the sequence of verification (e.g., courier, then technician) discussed in these examples and elsewhere in the present application may be altered in other embodiments of the methods disclosed herein (e.g., verification of the technician before verification of the courier, or simultaneous verification).

While the above is a complete description of the preferred embodiment as described herein, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. The appended claims are not to be interpreted as including means-plus-function limitations, unless such a limitation is explicitly recited in a given claim using the phrase "means for."

This document contains material subject to copyright protection. The copyright owner (Applicant herein) has no objection to the facsimile reproduction by anyone of the patent document or the patent disclosure, as they appear in the US Patent and Trademark Office patent file or records, but otherwise reserves all copyright rights whatsoever. The following notice shall apply: Copyright 2013-2014 Theranos, Inc.

The invention claimed is:

1. A method for the storage of a biological material, comprising:
generating a unique, single-use authorization code specific for a proper courier and specific for a designated transfer location and a designated time period, wherein said generating is contingent upon the presence of the proper courier at the designated transfer location within the designated time period, and said unique, single-use authorization code is only generated following confirmation of the presence of the proper courier at the designated transfer location within the designated time period, said generating being performed by a processor that is part of a network comprising a server;
providing the proper courier with said unique, single-use authorization code specific for the proper courier and specific for the designated transfer location and the designated time period, wherein said providing is at the designated transfer location, said providing being performed following the arrival of the proper courier at the designated transfer location within the designated time period, said providing being contingent upon the presence of the proper courier at the designated transfer location within the designated time period, and being by electronic communication link to a network comprising a computer server;

placing a biological material in a storage container of the proper courier, wherein said storage container comprises an interior space, a portal providing access to said interior space, a lid configured to cover said portal in a first configuration effective to block access to said interior space, said lid configured to open effective to allow access to said interior space by way of said portal in a second configuration, a light sensor within said storage container configured to sense a light level within said interior space, and a communication link for communicating a light level sensed by said light sensor;

sensing a light level within said storage container; and communicating said sensed light level.

2. The method of claim 1, wherein said communication link is selected from a display, a Bluetooth connection, a universal serial bus (USB) connection, a firewire connection, an Ethernet connection, a cell-phone connection, a WiFi connection, and other wireless connections.

3. A method for the storage of a biological material, comprising:

generating a unique, single-use authorization code specific for a proper courier and specific for a designated transfer location and a designated time period, wherein said generating is contingent upon the presence of the proper courier at the designated transfer location within the designated time period, and said unique, single-use authorization code is only generated following confirmation of the presence of the proper courier at the designated transfer location within the designated time period, said generating being performed by a processor that is part of a network comprising a server;

providing the proper courier with said unique, single-use authorization code specific for the proper courier and specific for the designated transfer location and the designated time period, wherein said providing is at the designated transfer location, said providing being performed following the arrival of the proper courier at the designated transfer location within the designated time period, said providing being contingent upon the presence of the proper courier at the designated transfer location within the designated time period, and being by electronic communication link to a network comprising a computer server;

placing a biological material in a storage container of the proper courier, wherein said storage container comprises an interior space, a portal providing access to said interior space, a lid configured to cover said portal in a first configuration effective to block access to said interior space, said lid configured to open effective to allow access to said interior space by way of said portal in a second configuration, a light sensor within said storage container configured to sense a light level within said interior space, and a communication link for communicating a light level sensed by said light sensor;

sensing a light level within said storage container; and communicating said sensed light level;

said storage container further comprising:
a memory element configured to record a sensed light level;
and said method further comprising
recording said sensed light level in said memory.

4. The method of claim 3, wherein said recording comprises recording each of a plurality of light levels at a corresponding plurality of recording times.

5. The method of claim 4, wherein said communicating comprises communicating a plurality of said recorded light levels.

6. The method of claim 4, wherein said communicating comprises communicating a value derived from a recorded light level or from a plurality of said recorded light levels.

7. The method of claim 4, further comprising monitoring said communication by an operator.

8. The method of claim 7, wherein said monitoring is selected from continuous monitoring and intermittent monitoring.

9. The method of claim 7, wherein said monitoring comprises intermittent monitoring of said recorded light levels comprising monitoring at a first time and at least at a second time, said first and second times separated by a period of time, wherein said recorded light levels provide an effective record of light levels within said storage container over said period of time between said first and second times.

10. The method of claim 3, wherein said light level is communicated to an operator, wherein said operator is selected from a local operator and a remote operator.

11. The method of claim 10, wherein said communicating said sensed light level comprises communicating an alert when said light level is outside a desired range.

12. A method for the storage of a biological material, comprising:

generating a unique, single-use authorization code specific for a proper courier and specific for a designated transfer location and a designated time period, wherein said generating is contingent upon the presence of the proper courier at the designated transfer location within the designated time period, and said unique, single-use authorization code is only generated following confirmation of the presence of the proper courier at the designated transfer location within the designated time period, said generating being performed by a processor that is part of a network comprising a server;

providing the proper courier with said unique, single-use authorization code specific for the proper courier and specific for the designated transfer location and the designated time period, wherein said providing is at the designated transfer location, said providing being performed following the arrival of the proper courier at the designated transfer location within the designated time period, said providing being contingent upon the presence of the proper courier at the designated transfer location within the designated time period, and being by electronic communication link to a network comprising a computer server;

placing a biological material in a storage container of the proper courier, wherein said storage container comprises an interior space, a portal providing access to said interior space, a lid configured to cover said portal in a first configuration effective to block access to said interior space, said lid configured to open effective to allow access to said interior space by way of said portal in a second configuration, a light sensor within said storage container configured to sense a light level within said interior space, and a communication link for communicating a light level sensed by said light sensor;

sensing a light level within said storage container; and communicating said sensed light level;

wherein said communicating said sensed light level comprises communicating an alert when said light level is outside a desired range.

* * * * *